(12) United States Patent
Shirakawa et al.

(10) Patent No.: US 8,152,640 B2
(45) Date of Patent: Apr. 10, 2012

(54) INFORMATION PROCESSING APPARATUS AND COMPUTER READABLE STORAGE MEDIUM

(75) Inventors: Mari Shirakawa, Kyoto (JP); Giles Goddard, Kyoto (JP)

(73) Assignees: Nintendo Co., Ltd., Kyoto (JP); Vitei Inc., Kyoto (JP)

( * ) Notice: Subject to any disclaimer, the term of this patent is extended or adjusted under 35 U.S.C. 154(b) by 447 days.

(21) Appl. No.: 12/419,639

(22) Filed: Apr. 7, 2009

(65) Prior Publication Data

US 2010/0137063 A1 Jun. 3, 2010

(30) Foreign Application Priority Data

Nov. 28, 2008 (JP) ................... 2008-304822

(51) Int. Cl.
*G06F 17/00* (2006.01)
(52) U.S. Cl. ............... 463/36; 463/31; 463/43
(58) Field of Classification Search .............. 463/36, 463/37
See application file for complete search history.

(56) References Cited

U.S. PATENT DOCUMENTS

| | | |
|---|---|---|
| 588,172 A | 8/1897 | Peters |
| 688,076 A | 12/1901 | Ensign |
| D188,376 S | 7/1960 | Hotkins et al. |
| 3,217,536 A | 11/1965 | Motsinger et al. |
| 3,424,005 A | 1/1969 | Brown |
| 3,428,312 A | 2/1969 | Machen |
| 3,712,294 A | 1/1973 | Muller |
| 3,752,144 A | 8/1973 | Weigle, Jr. |
| 3,780,817 A | 12/1973 | Videon |
| 3,826,145 A | 7/1974 | McFarland |
| 3,869,007 A | 3/1975 | Haggstrom et al. |
| 4,058,178 A | 11/1977 | Shinohara et al. |
| 4,104,119 A | 8/1978 | Schilling |
| 4,136,682 A | 1/1979 | Pedotti |
| 4,246,783 A | 1/1981 | Steven et al. |
| 4,296,931 A | 10/1981 | Yokoi |
| 4,337,050 A | 6/1982 | Engalitcheff, Jr. |
| 4,404,854 A | 9/1983 | Krempl et al. |
| 4,488,017 A | 12/1984 | Lee |
| 4,494,754 A | 1/1985 | Wagner, Jr. |
| 4,558,757 A | 12/1985 | Mori et al. |

(Continued)

FOREIGN PATENT DOCUMENTS

DE 40 04 554 8/1991

(Continued)

OTHER PUBLICATIONS

Addlesee, M.D., et al., "The ORL Active Floor," IEEE—Personal Communications, Oct. 1997.

(Continued)

*Primary Examiner* — Fernando L Toledo
*Assistant Examiner* — Robert Carpenter
(74) *Attorney, Agent, or Firm* — Nixon & Vanderhye P.C.

(57) ABSTRACT

A player can change the direction of the right hand of a character object, or extend and retract the right arm of the character object, by changing the direction of the core unit 70. The player can change the direction of the left hand of the character object, or extend and retract the left arm of the character object by changing the direction of the subunit 76. The player can retract and extend a leg of the character object, by shifting the center of gravity in the front-back direction when the player is standing on the load controller 36.

17 Claims, 23 Drawing Sheets

U.S. PATENT DOCUMENTS

| | | | |
|---|---|---|---|
| 4,569,519 A | 2/1986 | Mattox et al. |
| 4,574,899 A | 3/1986 | Griffin |
| 4,577,868 A | 3/1986 | Kiyonaga |
| 4,598,717 A | 7/1986 | Pedotti |
| 4,607,841 A | 8/1986 | Gala |
| 4,630,817 A | 12/1986 | Buckleu |
| 4,660,828 A | 4/1987 | Weiss |
| 4,680,577 A | 7/1987 | Straayer et al. |
| 4,688,444 A | 8/1987 | Nordstrom |
| 4,691,694 A | 9/1987 | Boyd et al. |
| 4,711,447 A | 12/1987 | Mansfield |
| 4,726,435 A | 2/1988 | Kitagawa et al. |
| 4,739,848 A | 4/1988 | Tulloch |
| 4,742,832 A | 5/1988 | Kauffmann et al. |
| 4,742,932 A | 5/1988 | Pedragosa |
| 4,800,973 A | 1/1989 | Angel |
| 4,838,173 A | 6/1989 | Schroeder et al. |
| 4,855,704 A | 8/1989 | Betz |
| 4,880,069 A | 11/1989 | Bradley |
| 4,882,677 A | 11/1989 | Curran |
| 4,893,514 A | 1/1990 | Gronert et al. |
| 4,907,797 A | 3/1990 | Gezari et al. |
| 4,927,138 A | 5/1990 | Ferrari |
| 4,970,486 A | 11/1990 | Gray et al. |
| 4,982,613 A | 1/1991 | Becker |
| D318,073 S | 7/1991 | Jang |
| 5,044,956 A | 9/1991 | Behensky et al. |
| 5,049,079 A | 9/1991 | Furtado et al. |
| 5,052,406 A | 10/1991 | Nashner |
| 5,054,771 A | 10/1991 | Mansfield |
| 5,065,631 A | 11/1991 | Ashpitel et al. |
| 5,089,960 A | 2/1992 | Sweeney, Jr. |
| 5,103,207 A | 4/1992 | Kerr et al. |
| 5,104,119 A | 4/1992 | Lynch |
| 5,116,296 A | 5/1992 | Watkins et al. |
| 5,118,112 A | 6/1992 | Bregman et al. |
| 5,151,071 A | 9/1992 | Jain et al. |
| 5,195,746 A | 3/1993 | Boyd et al. |
| 5,197,003 A | 3/1993 | Moncrief et al. |
| 5,199,875 A | 4/1993 | Trumbull |
| 5,203,563 A | 4/1993 | Loper, III |
| 5,207,426 A | 5/1993 | Inoue et al. |
| 5,259,252 A | 11/1993 | Kruse et al. |
| 5,269,318 A | 12/1993 | Nashner |
| 5,299,810 A | 4/1994 | Pierce et al. |
| 5,303,715 A | 4/1994 | Nashner et al. |
| 5,360,383 A | 11/1994 | Boren |
| 5,362,298 A | 11/1994 | Brown et al. |
| 5,368,546 A | 11/1994 | Stark et al. |
| 5,405,152 A | 4/1995 | Katanics et al. |
| 5,431,569 A | 7/1995 | Simpkins et al. |
| 5,462,503 A | 10/1995 | Benjamin et al. |
| 5,466,200 A | 11/1995 | Ulrich et al. |
| 5,469,740 A | 11/1995 | French et al. |
| 5,474,087 A | 12/1995 | Nashner |
| 5,476,103 A | 12/1995 | Nahsner |
| 5,507,708 A | 4/1996 | Ma |
| 5,541,621 A | 7/1996 | Nmngani |
| 5,541,622 A | 7/1996 | Engle et al. |
| 5,547,439 A | 8/1996 | Rawls et al. |
| 5,551,445 A | 9/1996 | Nashner |
| 5,551,693 A | 9/1996 | Goto et al. |
| 5,577,981 A | 11/1996 | Jarvik |
| D376,826 S | 12/1996 | Ashida |
| 5,584,700 A | 12/1996 | Feldman et al. |
| 5,584,779 A | 12/1996 | Knecht et al. |
| 5,591,104 A | 1/1997 | Andrus et al. |
| 5,613,690 A | 3/1997 | McShane et al. |
| 5,623,944 A | 4/1997 | Nashner |
| 5,627,327 A | 5/1997 | Zanakis |
| D384,115 S | 9/1997 | Wilkinson et al. |
| 5,669,773 A | 9/1997 | Gluck |
| 5,689,285 A | 11/1997 | Asher |
| 5,690,582 A | 11/1997 | Ulrich et al. |
| 5,697,791 A | 12/1997 | Nasher et al. |
| 5,713,794 A | 2/1998 | Shimojima et al. |
| 5,721,566 A | 2/1998 | Rosenberg et al. |
| 5,746,684 A | 5/1998 | Jordan |
| 5,785,630 A | 7/1998 | Bobick et al. |
| D397,164 S | 8/1998 | Goto |
| 5,788,618 A | 8/1998 | Joutras |
| 5,792,031 A | 8/1998 | Alton |
| 5,800,314 A | 9/1998 | Sakakibara et al. |
| 5,805,138 A | 9/1998 | Brawne et al. |
| 5,813,958 A | 9/1998 | Tomita |
| 5,814,740 A | 9/1998 | Cook et al. |
| 5,820,462 A | 10/1998 | Yokoi et al. |
| 5,825,308 A | 10/1998 | Rosenberg |
| 5,837,952 A | 11/1998 | Oshiro et al. |
| D402,317 S | 12/1998 | Goto |
| 5,846,086 A | 12/1998 | Bizzi et al. |
| 5,853,326 A | 12/1998 | Goto et al. |
| 5,854,622 A | 12/1998 | Brannon |
| 5,860,861 A | 1/1999 | Lipps et al. |
| 5,864,333 A | 1/1999 | O'Heir |
| 5,872,438 A | 2/1999 | Roston |
| 5,886,302 A | 3/1999 | Germanton et al. |
| 5,888,172 A | 3/1999 | Andrus et al. |
| 5,889,507 A | 3/1999 | Engle et al. |
| D407,758 S | 4/1999 | Isetani et al. |
| 5,890,995 A | 4/1999 | Bobick et al. |
| 5,897,457 A | 4/1999 | Mackovjak |
| 5,897,469 A | 4/1999 | Yalch |
| 5,901,612 A | 5/1999 | Letovsky |
| 5,902,214 A | 5/1999 | Makikawa et al. |
| 5,904,639 A | 5/1999 | Smyser et al. |
| D411,258 S | 6/1999 | Isetani et al. |
| 5,912,659 A | 6/1999 | Rutledge et al. |
| 5,913,727 A * | 6/1999 | Ahdoot ........................ 463/39 |
| 5,919,092 A | 7/1999 | Yokoi et al. |
| 5,921,780 A | 7/1999 | Myers |
| 5,921,899 A | 7/1999 | Rose |
| 5,929,782 A | 7/1999 | Stark et al. |
| 5,947,824 A | 9/1999 | Minami et al. |
| 5,976,063 A | 11/1999 | Joutras et al. |
| 5,980,256 A | 11/1999 | Carmein |
| 5,980,429 A | 11/1999 | Nashner |
| 5,984,785 A | 11/1999 | Takeda et al. |
| 5,987,982 A | 11/1999 | Wenman et al. |
| 5,989,157 A | 11/1999 | Walton |
| 5,993,356 A | 11/1999 | Houston et al. |
| 5,997,439 A | 12/1999 | Ohsuga et al. |
| 6,001,015 A | 12/1999 | Nishiumi et al. |
| 6,007,428 A | 12/1999 | Nishiumi et al. |
| 6,010,465 A | 1/2000 | Nashner |
| D421,070 S | 2/2000 | Jang et al. |
| 6,037,927 A | 3/2000 | Rosenberg |
| 6,038,488 A | 3/2000 | Barnes et al. |
| 6,044,772 A | 4/2000 | Gaudette et al. |
| 6,063,046 A | 5/2000 | Allum |
| 6,086,518 A | 7/2000 | MacCready, Jr. |
| 6,102,803 A | 8/2000 | Takeda et al. |
| 6,102,832 A | 8/2000 | Tani |
| D431,051 S | 9/2000 | Goto |
| 6,113,237 A | 9/2000 | Ober et al. |
| 6,147,674 A | 11/2000 | Rosenberg et al. |
| 6,152,564 A | 11/2000 | Ober et al. |
| D434,769 S | 12/2000 | Goto |
| D434,770 S | 12/2000 | Goto |
| 6,155,926 A | 12/2000 | Miyamoto et al. |
| 6,162,189 A | 12/2000 | Girone et al. |
| 6,167,299 A | 12/2000 | Galchenkov et al. |
| 6,190,287 B1 | 2/2001 | Nashner |
| 6,200,253 B1 | 3/2001 | Nishiumi et al. |
| 6,203,432 B1 | 3/2001 | Roberts et al. |
| 6,216,542 B1 | 4/2001 | Stockli et al. |
| 6,216,547 B1 | 4/2001 | Lehtovaara |
| 6,220,865 B1 | 4/2001 | Macri et al. |
| D441,369 S | 5/2001 | Goto |
| 6,225,977 B1 | 5/2001 | Li |
| 6,227,968 B1 | 5/2001 | Suzuki et al. |
| 6,228,000 B1 | 5/2001 | Jones |
| 6,231,444 B1 | 5/2001 | Goto |
| 6,239,806 B1 | 5/2001 | Nishiumi et al. |
| 6,241,611 B1 | 6/2001 | Takeda et al. |
| 6,244,987 B1 | 6/2001 | Ohsuga et al. |
| D444,469 S | 7/2001 | Goto |

| | | |
|---|---|---|
| 6,264,558 B1 | 7/2001 | Nishiumi et al. |
| 6,280,361 B1 | 8/2001 | Harvey et al. |
| D447,968 S | 9/2001 | Pagnacco et al. |
| 6,295,878 B1 | 10/2001 | Berme |
| 6,296,595 B1 | 10/2001 | Stark et al. |
| 6,325,718 B1 | 12/2001 | Nishiumi et al. |
| 6,330,837 B1 | 12/2001 | Charles et al. |
| 6,336,891 B1 | 1/2002 | Fedrigon et al. |
| 6,353,427 B1 | 3/2002 | Rosenberg |
| 6,354,155 B1 | 3/2002 | Berme |
| 6,357,827 B1 | 3/2002 | Brightbill et al. |
| 6,359,613 B1 | 3/2002 | Poole |
| D456,410 S | 4/2002 | Ashida |
| D456,854 S | 5/2002 | Ashida |
| D457,570 S | 5/2002 | Brinson |
| 6,387,061 B1 | 5/2002 | Nitto |
| 6,388,655 B1 | 5/2002 | Leung |
| 6,389,883 B1 | 5/2002 | Berme et al. |
| 6,394,905 B1 | 5/2002 | Takeda et al. |
| 6,402,635 B1 | 6/2002 | Nesbit et al. |
| D459,727 S | 7/2002 | Ashida |
| D460,506 S | 7/2002 | Tamminga et al. |
| 6,421,056 B1 | 7/2002 | Nishiumi et al. |
| 6,436,058 B1 | 8/2002 | Krahner et al. |
| D462,683 S | 9/2002 | Ashida |
| 6,454,679 B1 | 9/2002 | Radow |
| 6,461,297 B1 | 10/2002 | Pagnacco et al. |
| 6,470,302 B1 | 10/2002 | Cunningham et al. |
| 6,482,010 B1 | 11/2002 | Marcus et al. |
| 6,510,749 B1 | 1/2003 | Pagnacco et al. |
| 6,514,145 B1 | 2/2003 | Kawabata et al. |
| 6,515,593 B1 | 2/2003 | Stark et al. |
| D471,594 S | 3/2003 | Nojo |
| 6,543,769 B1 | 4/2003 | Podoloff et al. |
| 6,563,059 B2 | 5/2003 | Lee |
| 6,568,334 B1 | 5/2003 | Gaudette et al. |
| 6,616,579 B1 | 9/2003 | Reinbold et al. |
| 6,624,802 B1 | 9/2003 | Klein et al. |
| 6,632,158 B1 | 10/2003 | Nashner |
| 6,636,161 B2 | 10/2003 | Rosenberg |
| 6,636,197 B1 | 10/2003 | Goldenberg et al. |
| 6,638,175 B2 | 10/2003 | Lee et al. |
| 6,663,058 B1 | 12/2003 | Peterson et al. |
| 6,676,520 B2 | 1/2004 | Nishiumi et al. |
| 6,676,569 B1 | 1/2004 | Radow |
| 6,679,776 B1 | 1/2004 | Nishiumi et al. |
| 6,697,049 B2 | 2/2004 | Lu |
| 6,719,667 B2 | 4/2004 | Wong et al. |
| 6,726,566 B2 | 4/2004 | Komata |
| 6,764,429 B1 | 7/2004 | Michalow |
| 6,797,894 B2 | 9/2004 | Montagnino et al. |
| 6,811,489 B1 | 11/2004 | Shimizu et al. |
| 6,813,966 B2 | 11/2004 | Dukart |
| 6,817,973 B2 | 11/2004 | Merril et al. |
| D500,100 S | 12/2004 | Van Der Meer |
| 6,846,270 B1 | 1/2005 | Etnyre |
| 6,859,198 B2 | 2/2005 | Onodera et al. |
| 6,872,139 B2 | 3/2005 | Sato et al. |
| 6,872,187 B1 | 3/2005 | Stark et al. |
| 6,888,076 B2 | 5/2005 | Hetherington |
| 6,913,559 B2 | 7/2005 | Smith |
| 6,924,787 B2 * | 8/2005 | Kramer et al. ............... 345/156 |
| 6,936,016 B2 | 8/2005 | Berme et al. |
| D510,391 S | 10/2005 | Merril et al. |
| 6,975,302 B1 | 12/2005 | Ausbeck, Jr. |
| 6,978,684 B2 | 12/2005 | Nurse |
| 6,991,483 B1 | 1/2006 | Milan et al. |
| D514,627 S | 2/2006 | Merril et al. |
| 7,004,787 B2 | 2/2006 | Milan |
| D517,124 S | 3/2006 | Merril et al. |
| 7,011,605 B2 | 3/2006 | Shields |
| 7,033,176 B2 | 4/2006 | Feldman et al. |
| 7,038,855 B2 | 5/2006 | French et al. |
| 7,040,986 B2 | 5/2006 | Koshima et al. |
| 7,070,542 B2 | 7/2006 | Reyes et al. |
| 7,083,546 B2 | 8/2006 | Zillig et al. |
| 7,100,439 B2 | 9/2006 | Carlucci |
| 7,121,982 B2 | 10/2006 | Feldman |
| 7,126,584 B1 | 10/2006 | Nishiumi et al. |

| | | | |
|---|---|---|---|
| 7,127,376 B2 | 10/2006 | Nashner | |
| 7,163,516 B1 | 1/2007 | Pagnacco et al. | |
| 7,179,234 B2 | 2/2007 | Nashner | |
| 7,195,355 B2 | 3/2007 | Nashner | |
| 7,202,424 B2 | 4/2007 | Carlucci | |
| 7,202,851 B2 | 4/2007 | Cunningham et al. | |
| 7,270,630 B1 | 9/2007 | Patterson | |
| 7,307,619 B2 | 12/2007 | Cunningham et al. | |
| 7,308,831 B2 | 12/2007 | Cunningham et al. | |
| 7,331,226 B2 | 2/2008 | Feldman et al. | |
| 7,335,134 B1 | 2/2008 | LaVelle | |
| RE40,427 E | 7/2008 | Nashner | |
| 7,416,537 B1 | 8/2008 | Stark et al. | |
| 7,530,929 B2 | 5/2009 | Feldman et al. | |
| 7,722,501 B2 | 5/2010 | Nicolas et al. | |
| 7,938,751 B2 | 5/2011 | Nicolas et al. | |
| 2001/0001303 A1 | 5/2001 | Ohsuga et al. | |
| 2001/0018363 A1 | 8/2001 | Goto et al. | |
| 2002/0055383 A1 * | 5/2002 | Onda et al. ...................... 463/36 |
| 2002/0055422 A1 | 5/2002 | Airmet et al. | |
| 2002/0080115 A1 | 6/2002 | Onodera et al. | |
| 2002/0185041 A1 | 12/2002 | Herbst | |
| 2003/0054327 A1 | 3/2003 | Evensen | |
| 2003/0069108 A1 | 4/2003 | Kaiserman et al. | |
| 2003/0107502 A1 | 6/2003 | Alexander | |
| 2003/0176770 A1 | 9/2003 | Merril et al. | |
| 2003/0193416 A1 | 10/2003 | Ogata et al. | |
| 2004/0038786 A1 | 2/2004 | Kuo et al. | |
| 2004/0041787 A1 | 3/2004 | Graves | |
| 2004/0077464 A1 | 4/2004 | Feldman et al. | |
| 2004/0099513 A1 | 5/2004 | Hetherington | |
| 2004/0110602 A1 | 6/2004 | Feldman | |
| 2004/0163855 A1 | 8/2004 | Carlucci | |
| 2004/0180719 A1 | 9/2004 | Feldman et al. | |
| 2004/0259688 A1 | 12/2004 | Stabile | |
| 2005/0070154 A1 | 3/2005 | Milan | |
| 2005/0076161 A1 | 4/2005 | Albanna et al. | |
| 2005/0130742 A1 | 6/2005 | Feldman et al. | |
| 2005/0202384 A1 | 9/2005 | DiCuccio et al. | |
| 2005/0282633 A1 * | 12/2005 | Nicolas et al. ................... 463/36 |
| 2006/0097453 A1 | 5/2006 | Feldman et al. | |
| 2006/0161045 A1 | 7/2006 | Merril et al. | |
| 2006/0205565 A1 | 9/2006 | Feldman et al. | |
| 2006/0211543 A1 | 9/2006 | Feldman et al. | |
| 2006/0217243 A1 | 9/2006 | Feldman et al. | |
| 2006/0223634 A1 | 10/2006 | Feldman et al. | |
| 2006/0258512 A1 | 11/2006 | Nicolas et al. | |
| 2006/0287089 A1 * | 12/2006 | Addington et al. ............. 463/37 |
| 2007/0021279 A1 | 1/2007 | Jones | |
| 2007/0027369 A1 | 2/2007 | Pagnacco et al. | |
| 2007/0155589 A1 | 7/2007 | Feldman et al. | |
| 2007/0219050 A1 | 9/2007 | Merril | |
| 2008/0012826 A1 | 1/2008 | Cunningham et al. | |
| 2008/0207325 A1 * | 8/2008 | Hsu .............................. 463/39 |
| 2008/0228110 A1 | 9/2008 | Berme | |
| 2008/0261696 A1 | 10/2008 | Yamazaki et al. | |
| 2009/0093315 A1 | 4/2009 | Matsunaga et al. | |
| 2010/0009752 A1 * | 1/2010 | Rubin et al. .................... 463/36 |

FOREIGN PATENT DOCUMENTS

| | | |
|---|---|---|
| DE | 195 02 918 | 8/1996 |
| DE | 297 12 785 | 1/1998 |
| DE | 20 2004 021 792 U1 | 5/2011 |
| DE | 20 2004 021 793 U1 | 5/2011 |
| EP | 0 275 665 | 7/1988 |
| EP | 0 299 738 | 1/1989 |
| EP | 0 335 045 | 10/1989 |
| EP | 0 519 836 | 12/1992 |
| EP | 1 043 746 A1 | 10/2000 |
| EP | 1 120 083 A2 | 8/2001 |
| EP | 1 127 599 A2 | 8/2001 |
| EP | 1 870 141 | 12/2007 |
| FR | 2 472 929 | 7/1981 |
| FR | 2 587 611 | 3/1987 |
| FR | 2 604 910 | 4/1988 |
| FR | 2 647 331 | 11/1990 |
| FR | 2 792 182 | 10/2000 |
| FR | 2 801 490 | 6/2001 |
| FR | 2 811 753 | 1/2002 |

| | | |
|---|---|---|
| FR | 2 906 365 | 3/2008 |
| GB | 1 209 954 | 10/1970 |
| GB | 2 288 550 | 10/1995 |
| JP | 44-23551 | 10/1969 |
| JP | 55-95758 | 12/1978 |
| JP | 54-73689 | 6/1979 |
| JP | 55-113472 | 9/1980 |
| JP | 55-113473 | 9/1980 |
| JP | 55-125369 | 9/1980 |
| JP | 55-149822 | 11/1980 |
| JP | 55-152431 | 11/1980 |
| JP | 60-79460 | 6/1985 |
| JP | 60-153159 | 10/1985 |
| JP | 61-154689 | 7/1986 |
| JP | 62-34016 | 2/1987 |
| JP | 62-034016 | 2/1987 |
| JP | 63-158311 | 10/1988 |
| JP | 63-163855 | 10/1988 |
| JP | 63-193003 | 12/1988 |
| JP | 02-102651 | 4/1990 |
| JP | 2-238327 | 9/1990 |
| JP | 3-25325 | 2/1991 |
| JP | 3-103272 | 4/1991 |
| JP | 03-107959 | 11/1991 |
| JP | 6-063198 | 3/1994 |
| JP | 6-282373 | 10/1994 |
| JP | 7-213741 | 8/1995 |
| JP | 7-213745 | 8/1995 |
| JP | 7-241281 | 9/1995 |
| JP | 7-241282 | 9/1995 |
| JP | 7-275307 | 10/1995 |
| JP | 7-302161 | 11/1995 |
| JP | 8-43182 | 2/1996 |
| JP | 08-131594 | 5/1996 |
| JP | 8-182774 | 7/1996 |
| JP | 8-184474 | 7/1996 |
| JP | 8-215176 | 8/1996 |
| JP | 08-244691 | 9/1996 |
| JP | 2576247 | 1/1997 |
| JP | 9-120464 | 5/1997 |
| JP | 9-168529 | 6/1997 |
| JP | 9-197951 | 7/1997 |
| JP | 9-305099 | 11/1997 |
| JP | 11-309270 | 11/1999 |
| JP | 2000-146679 | 5/2000 |
| JP | U3068681 | 5/2000 |
| JP | U3069287 | 6/2000 |
| JP | 2000-254348 | 9/2000 |
| JP | 3172738 | 6/2001 |
| JP | 2001-178845 | 7/2001 |
| JP | 2001-286451 | 10/2001 |
| JP | 2002-112984 | 4/2002 |
| JP | 2002-157081 | 5/2002 |
| JP | 2002-253534 | 9/2002 |
| JP | 2003-79599 | 3/2003 |
| JP | 2003-235834 | 8/2003 |
| JP | 3722678 | 11/2005 |
| JP | 2005-334083 | 12/2005 |
| JP | 3773455 | 5/2006 |
| JP | 2006-167094 | 6/2006 |
| JP | 3818488 | 9/2006 |
| JP | 2006-284539 | 10/2006 |
| JP | U3128216 | 12/2006 |
| JP | 2008-49117 | 3/2008 |
| WO | WO 91/11221 | 8/1991 |
| WO | WO 92/12768 | 8/1992 |
| WO | WO 98/40843 | 9/1998 |
| WO | WO 00/12041 | 3/2000 |
| WO | WO 00/57387 | 9/2000 |
| WO | WO 00/69523 | 11/2000 |
| WO | WO 02/29375 | 4/2002 |
| WO | WO 02/057885 | 7/2002 |
| WO | WO 2004/051201 | 6/2004 |
| WO | WO 2004/053629 | 6/2004 |
| WO | WO 2005/043322 | 5/2005 |
| WO | WO 2008/099582 | 8/2008 |

OTHER PUBLICATIONS

Baek, Seongmin, et al., "Motion Evaluation for VR-based Motion Training," Eurographics 2001, vol. 20, No. 3, 2001.

Biodex Medical Systems, Inc.—Balance System SD Product Information—http://www.biodex.com/rehab/balance/balance_300feat.htm.

Chen, I-Chun, et al., "Effects of Balance Training on Hemiplegic Stroke Patients," Chang Gung Medical Journal, vol. 25, No. 9, pp. 583-590, Sep. 2002.

Dingwell, Jonathan, et al., "A Rehabilitation Treadmill with Software for Providing Real-Time Gait Analysis and Visual Feedback," Transactions of the ASME, Journal of Biomechanical Engineering, 118 (2), pp. 253-255, 1996.

Geiger, Ruth Ann, et al., "Balance and Mobility Following Stroke: Effects of Physical Therapy Interventions With and Without Biofeedback/Forceplate Training," Physical Therapy, vol. 81, No. 4, pp. 995-1005, Apr. 2001.

Harikae, Miho, "Visualization of Common People's Behavior in the Barrier Free Environment," Graduate Thesis—Master of Computer Science and Engineering in the Graduate School of the University of Aizu, Mar. 1999.

Hodgins, J.K., "Three-Dimensional Human Running," Proceedings: 1996 IEEE International Conference on Robotics and Automation, vol. 4, Apr. 1996.

Kim, Jong Yun, et al., "Abstract—A New VR Bike System for Balance Rehabilitation Training," Proceedings: 2001 IEEE Seventh International Conference on Virtual Systems and Multimedia, Oct. 2001.

McComas, Joan, et al., "Virtual Reality Applications for Prevention, Disability Awareness, and Physical Therapy Rehabilitation in Neurology: Our Recent Work," School of Rehabilitation Sciences, University of Ottawa—Neurology Report, vol. 26, No. 2, pp. 55-61, 2002.

NeuroCom International, Inc.—Balance Manager Systems/Products—http://resourcesonbalance.com/neurocom/products/index.aspx.

NeuroCom International, Inc.—Neurogames—http://resourcesonbalance.com/neurocom/products/NeuroGames.aspx.

Nicholas, Deborah S, "Balance Retraining After Stroke Using Force Platform Feedback," Physical Therapy, vol. 77, No. 5, pp. 553-558, May 1997.

Redfern, Mark, et al., "Visual Influences of Balance," Journal of Anxiety Disorders, vol. 15, pp. 81-94, 2001.

Sackley, Catherine, "Single Blind Randomized Controlled Trial of Visual Feedback After Stroke: Effects on Stance Symmetry and Function," Disavility and Rehabilitation, vol. 19, No. 12, pp. 536-546, 1997.

Tossavainen, Timo, et al., "Postural Control as Assessed with Virtual Reality," Acta Otolaryngol, Suppl 545, pp. 53-56, 2001.

Tossavainen, Timo, et al., "Towards Virtual Reality Simulation in Force Platform Posturography," MEDINFO, pp. 854-857, 2001.

Tsutsuguchi, Ken, et al., "Human Walking Animation Based on Foot Reaction Force in the Three-Dimensional Virtual World," The Journal of Visualization and Computer Animation, vol. 11, pp. 3-16, 2000.

Wong, Alice, et al., "The Devlopment and Clinical Evaluation of a Standing Biofeedback Trainer," Journal of Rehabilitation Research and Development, vol. 34, No. 3, pp. 322-327, Jul. 1997.

Yang, Ungyeon, et al., "Implementation and Evaluation of 'Just Follow Me': An Immersive, VR-Based, Motion-Training System," Presence, vol. 11, No. 3, pp. 304-323, 2002.

Nintendo Co., Ltd., "Aerobic Exercise Rhythm Boxing", Oct. 27, 2008, Internet URL: www.nintendo.co.jp/wii/rfnj/training/aerobics/aerobics07.html.

Interface, Inc.—Advanced Force Measurement—SM Calibration Certificate Installation Information, 1984.

Hugh Stewart, "Isometric Joystick: A Study of Control by Adolescents and Young Adults with Cerebral Palsy," The Australian Occupational Therapy Journal, Mar. 1992, vol. 39, No. 1, pp. 33-39.

Raghavendra S. Rao, et al., "Evaluation of an Isometric and a Position Joystick in a Target Acquisition Task for Individuals with Cerebral Palsy," IEEE Transactions on Rehabilitation Engineering, vol, 8, No. 1, Mar. 2000, pp. 118-125.

D. Sengupta, et al., "Comparative Evaluation of Control Surfaces for Disabled Patients,"Proceedings of the 27th Annual Conference on Engineering in Medicine and Biology, vol. 16, Oct. 6-10, 1974, p. 356.

Ian Bogost, "The Rhetoric of Exergaming,"The Georgia Institute of Technology, 9 pages (date unknown).

Ludonauts, "Body Movin'," May 24, 2004, http://web.archive.org/web/20040611131903/http:/www.ludonauts.com; retrieved Aug. 31, 2010, 4 pages.

Atari Gaming Headquarters—AGH's Atari Project Puffer Page, http://www.atarihq.com/othersec/puffer/index.html, retrieved Sep. 19, 2002, 4 pages.

Michael Antonoff, "Real estate is cheap here, but the places you'd most want to visit are still under construction," Popular Science, Jun. 1993, pp. 33-34.

Steve Aukstakalnis and David Blatner, "The Art and Science of Virtual Reality—Silicon Mirage," 1992, pp. 197-207.

Electronics, edited by Michael Antonoff, "Video Games—Virtual Violence: Boxing Without Bruises," Popular Science, Apr. 1993, p. 60.

Stuart F. Brown, "Video cycle race," Popular Science, May 1989, p. 73.

Scanning the Field for Ideas, "Chair puts Player on the Joystick," Machine Design, No. 21, Oct. 24, 1991, XP 000255214, 1 page.

Francis Hamit, "Virtual Reality and the Exploration of Cyberspace," University of MD Baltimore County, 1993, 4 pages.

Innovation in Action—Biofeed back Motor Control, Active Leg Press—Iso LegPress, 2 pages (date unknown).

Ric Manning, "Videogame players get a workout with the Exertainment," The Gizmo Page from the Courier Journal Sep. 25, 1994, 1 page.

Tech Lines, Military—Arcade aces and Aviation—Winging it, Popular Mechanics, Mar. 1982. page 163.

Sarju Shah, "Mad Catz Universal MC2 Racing Wheel: Mad Catz MC2 Universal," Game Spot, posted Feb. 18, 2005, 3 pages.

Joe Skorupa, "Virtual Fitness," Sports Science, Popular Mechanics, Oct. 1994, 3 pages.

AGH Musuem—Suncom Aerobics Joystick; http://atarihq.com/museum/2678/hardware/aerobics.html, (retrieved date unknown) 1 page.

Nintendo Zone—The History of Nintendo (1889-1997), retrieved Aug. 24, 1998 pp. 1, 9-10.

The Legible City, Computergraphic Installation with Dirk Groeneveld, Manhattan version (1989), Amsterdam version (1990), Karlsruhe version (1991), 3 pages.

The New Exertainment System. It's All About Giving Your Members Personal Choices, Life Fitness, Circle Reader Service Card No. 28, 1995, 1 page.

The Race Begins with $85, Randal Windracer, Circle Reader Service Card No. 34, 1990, 1 page.

Universal S-Video/Audio Cable; Product #5015, MSRP 9.99; http://www.madcatz.com/Default.asp?Page=133&CategoryImg=Universal_Cables, retrieved May 12, 2005, 1 page.

Tom Dang, et al., "Interactive Video Exercise System for Pediatric Brain Injury Rehabilitation," Assistive Technology Research Center, Rehabilitation Engineering Service, National Rehabilitation Hospital, Proceedings of the RESNA 20th Annual Conference, Jun. 1998, 3 pages.

Linda S. Miller, "Upper Limb Exerciser," Biometrics Ltd—Unique Solutions for Clinical and Research Applications, 6 pages (date unknown).

Raymond W. McGorry, "A system for the measurement of grip forces and applied moments during hand tool use," Liberty Mutual Research Center for Safety and Health, Applied Ergonomics 32 (2001) 271-279.

NordicTrack's Aerobic Cross Trainer advertisement as shown in "Big Ideas—For a Little Money: Great Places to Invest $1,000 or Less," Kiplinger's Personal Finance Magazine, Jul. 1994, 3 pages.

Maurice R. Masliah, "Measuring the Allocation of Control in 6 Degree of Freedom Human-Computer Interaction Tasks," Graduate Department of Mechanical and Industrial Engineering, University of Toronto, 2001, 177 pages.

Leigh Ann Roman, "Boing! Combines Arcade Fun with Physical Training," Memphis—Health Care News: Monitoring the Pulse of Our Health Care Community, Sep. 20, 1996, One Section, 1 page.

"No More Couch Potato Kids," as shown in Orange Coast, Sep. 1994, p. 16.

Gary L. Downey, et al., "Design of an Exercise Arcade for Children with Disabilities," Resna, Jun. 26-30, 1998, pp. 405-407.

Frank Serpas, et al., "Forward-dynamics Simulation of Anterior Cruciate Ligament Forces Developed During Isokinetic Dynamometry," Computer Methods in Biomechanics and Biomedical Engineering, vol. 5 (1), 2002, pp. 33-43.

Carolyn Cosmos, "An 'Out of Wheelchair Experience'", The Washington Post, May 2, 2000, 3 pages.

"Look Ma! No Hands!", The Joyboard—Power Body Control, (date unknown).

David H. Ahl, "Controller update," Creative Computing, vol. 9, No. 12, Dec. 1983, p. 142.

Ian Bogost, "Water Cooler Games—The Prehistory of Wii Fit," Videogame Theory, Criticism, Design, Jul. 15, 2007, 2 pages.

Jeremy Reimer, "A history of the Amiga, part 2: The birth of Amiga," last updated Aug. 12, 2007, 2 pages.

The Amiga Joyboard (1982) image, Photos: Fun with plastic—peripherals that changed gaming; http://news.cnet.com/2300-27076_3-10001507-2.html (retrieved Jul. 23, 2010), 1 page.

The Amiga Power System Joyboard, Amiga history guide, http://www.amiga.history.co.uk/joyboard.html (retrieved Jul. 23, 2010), 2 pages.

"Joyboard," Wikipedia—the free encyclopedia, http://en.wikipedia.org/wiki/Joyboard (retrieved Jul. 26, 2010), 2 pages.

"Dance Dance Revolution," Wikipedia—the free encyclopedia, http://en.wikipedia.org/wiki/Dance Dance Revolution (retrieved Jul. 23, 2010), 9 pages.

"Cure for the couch potato," Kansas City Star (MO), Jan. 2, 2005, WLNR 22811884, 1 page.

JC Fletcher, "Virtually Overlooked: The Power Pad games," Joystiq, http://www.joystiq.com/2007/09/20/virtually-overlooked-the-power-pad-games/ (retrieved Jul. 26, 2010), 3 pages.

Family Fun Fitness, Nintendo Entertainment System, BANDAI (date unknown).

"Power Pad/Family Fun and Fitness/Family Trainer," http://www.gamersgraveyard.com/repository/nes/peripherals/powerpad.html (retrieved Jul. 26, 2010), 2 pages.

"Power Pad Information," Version 1.0 (Sep. 23, 1999) http://www.gamersgraveyard.com/repository/nes/peripherals/powerpad.txt (retrieved Jul. 26, 2010), 2 pages.

Wii+Power+Pad.jpg (image), http://bp1.blogger.com/_J5LEiGp54I/RpZbNpnLDg1/AAAAAAAAAic/Gum6DD3Umjg/s1600-h/Wii+Power+Pad.jpg (retrieved Jul. 26, 2010), 1 page.

Vs. Slalom—Videogame by Nintendo, KLOV—Killer List of Video Games, http://www.arcade-museum.com/game_detail.php?game_id=10368 (retrieved Jul. 26, 2010), 3 pages.

"Nintendo Vs. System," Wikipedia—the free encyclopedia, http://en.wikipedia.org/wiki/Nintendo_Vs._System (retrieved Jul. 26, 2010), 3 pages.

Vs. Slalom—Step Up to the Challenge, Nintendo, (date unknown).

Vs. Slalom—Live the Thrill, Nintendo, (date unknown).

Vs. Slalom—Operation Manual, MDS(MGS), Nintendo, 4 pages, (date unknown).

HyperspaceArcade.com—Specialists in Arcade Video Game Repair and Restoration, http://www.hyperspacearcade.com/VSTypes.html (retrieved Jul. 3, 2010), 3 pages.

Vs. Slalom—Attachment Pak Manual; For Installation in: VS. UniSystem (UPRIGHT) and VS. DualSystem (UPRIGHT), TM of Nintendo of America Inc., 1986, 15 pages.

Leiterman, "Project Puffer: Jungle River Cruise," Atari, Inc., 1982, 2 pages.

Leiterman, "Project Puffer: Tumbleweeds," Atari, Inc., 1982, 1 page.

Jerry Smith, "Other Input Devices," Human Interface Technology Laboratory, 2 pages, (date unknown).

Trevor Meers, "Virtually There: VR Entertainment Transports Players to Entrancing New Worlds," Smart Computing, vol. 4, Issue 11, Nov. 1993, 6 pages.

"Dance Aerobics," Moby Games, Feb. 12, 2008, 2 pages.

"Hard Drivin'," KLOV—Killer List of Video Games, The International Arcade Museum, http://www.arcade-museum.com, 6 pages, (date unknown).

"The World's First Authentic Driving Simulation Game!", Hard Drivin'—Get Behind the Wheel and Feel the Thrill (image), Atari games Corporation, 1 page, (date unknown).

Electronic Entertainment Expo (E3) Overview, Giant Bomb—E3 2004 (video game concept), http://www.giantbomb.com/e3-2004/92-3436/ (retrieved Sep. 3, 2010), 3 pages.

Guang Yang Amusement, Product Name: Live Boxer, 1 page, (date unknown).

Family Fun Fitness: Basic Set (Control Mat and Athletic World Game Pak), Nintendo Entertainment System, Bandai, (date unknown).

Roll & Rocker (image), 1 page, (date unknown).

Roll & Rocker, Enteractive (image), 2 pages, (date unknown).

Michael Goldstein, "Revolution on Wheels—Thatcher Ulrich," Nov.-Dec. 1994, 3 pages.

"Playboy on the Scene: Ride on!", 1 page, (date unknown).

Candace Putnam, "Software for Hardbodies: A virtual-reality hike machine takes you out on the open road," Design, 1 page, (date unknown).

Rachel, "No-Sweat Exercise—Can you get healthier without really trying?" Fitness, 1 page, (date unknown).

Fitness article, Sep. 1994, p. 402-404.

"Wired Top 10: Best Selling Toys in Jun. 1994," Wired Sep. 1994, 1 page.

"Top Skater," Sega Amusements U.S.A. Inc, 1 page, (date unknown).

Katharine Alter, et al., "Video Games for Lower Extremity Strength Training in Pediatric Brain Injury Rehabilitation," National Rehabilitation Hospital, 18 pages, (date unknown).

Cateye Recumbent GameBike Pro: Latest Technology in Exercise Bikes, beyondmoseying.com High Performance Exercise Equipment, 2 pages (advertisement; no date).

Fitness Fun, while Exercising and Getting FIT for Kids, Teens and Adults, (advertisement, no date).

Warranty Information and Your Joyboard: How it Works, Amiga Corporation, date unknown, 2 pages.

Complaint for Patent Infringement, *IA Labs CA, LLC v. Nintendo Co., Ltd. and Nintendo of America, Inc.*, United States District Court for the District of Maryland Northern Division (Apr. 2, 2010), 317 pages.

Plaintiff IA Labs CA, LLC's Opening Claim Construction Brief, *IA Labs CA, LLC v. Nintendo Co., Ltd. and Nintendo of America, Inc.*, United States District Court for the District of Maryland Southern Division (Dec. 13, 2010), 36 pages.

Nintendo Co., Ltd. and Nintendo of America Inc.'s Opening Claim Construction Brief, *IA Labs CA, LLC v. Nintendo Co., Ltd. and Nintendo of America, Inc.*, United States District Court for the District of Maryland Southern Division (Dec. 13, 2010), 55 pages.

Plaintiff IA Labs CA, LLC's Response Claim Construction Brief, *IA Labs CA, LLC v. Nintendo Co., Ltd. and Nintendo of America, Inc.*, United States District Court for the District of Maryland Southern Division (Jan. 6, 2011), 49 pages.

Nintendo Co., Ltd. and Nintendo of America Inc.'s Closing Claim Construction Brief, *IA Labs CA, LLC v. Nintendo Co., Ltd. and Nintendo of America, Inc.*, United States District Court for the District of Maryland Southern Division (Jan. 6, 2011), 25 pages.

Expert Report of Lee Rawls, Nov. 2 2010, 37 pages (redacted).

Nintendo Co., Ltd. and Nintendo of America'S Opposition to IA Labs CA, LLC's Motion for Partial Summary Judgment, *IA Labs CA, LLC*, (Plaintiff) v. *Nintendo Co., Ltd.* et al., (Defendant), United States District Court for the District of Maryland Southern Division (May 16, 2011), including the Appendix of Exhibits and Exhibits A-R, 405 pages.

Declaration of R. Lee Rawls in Support of Nintendo Co., Ltd. and Nintendo of America Inc.'s Opposition to IA Labs CA. LLC's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), including Exhibits 1, 3-12, 193 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), 7 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Appendix of Exhibits, 2 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 1, 36 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 2, 40 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 3, 85 pages.

Declaration of Tyler C. Peterson Pursuant to Fed. R. Civ.. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 4, 10 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 5, 9 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 6, 17 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 7, 16 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 8, 45 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 9, 4 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 10, 22 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 11, 27 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 12, 3 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 13, 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 14, 22 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 15, 45 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 16, 42 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 17, 19 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 18, 27 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 19, 13 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 20, 29 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 21, 25 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 22, 11 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 23, 20 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 24, 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 25, 80 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd.* et al., (Defendant), United States District Court for the District of Maryland Southern Division (May 16, 2011), Exhibit 26, 32 pages.
U.S. Appl. No. 74/402,755, filed Jun. 14, 1993, 43 pages.
"AccuSway Dual Top: For Balance and Postural Sway Measurement," AMTI: Force and Motion, ISO 9001:2000, 2 pages.
Borzelli G., Cappozzo A., and Papa E., "Inter- and intra-individual variability of ground rejection forces during sit-to-stand with principal component analysis," Medical Engineering & Physics 21 (1999), pp. 235-240.
Chiari L., Cappello A., Lenzi D., and Della Croce U, "An Improved Technique for the Extraction of Stochasitc Parameters from Stabilograms," Gait and Posture 12 (2000), pp. 225-234.
Cutlip R., Hsiao H., Garcia R., Becker E., Mayeux B., "A comparison of different postures for scaffold end-frame disassembly," Applied Ergonomics 31 (2000), pp. 507-513.
Davis K.G., Marras W.S., Waters T.R., "Evaluation of spinal loading during lowering and lifting," The Ohio State University, Biodynamics Laboratory, Clinical Biomechanics vol. 13, No. 3, 1998 pp. 141-152.
Rolf G. Jacob, Mark S. Redfern, Joseph M. Furman, "Optic Flow-induced Sway in Anxiety Disorders Associated with Space and Motion Discomfort," Journal of Anxiety Disorders, vol. 9, No. 5, 1995, pp. 411-425.
Jorgensen M.J., Marras W.S., "The effect of lumbar back support tension on trunk muscle activity," Clinical Biomechanics 15 (2000), pp. 292-294.
Deborah L. King and Vladimir M. Zatsiorsky, "Extracting gravity line displacement from stabilographic recordings," Gait & Posture 6 (1997), pp. 27-38.
Kraemer W.J., Volek J.S., Bush J.A., Gotshalk L.A., Wagner P.R., Gómez A.L., Zatsiorsky V.M., Duzrte M., Ratamess N.A., Mazzetti S.A., Selle B.J., "Influence of compression hosiery on physiological responses to standing fatigue in women," The Human Performance Laboratory, Medical & Science in Sports & Exercise, 2000, pp. 1849-1858.
Papa E. and Cappozzo A., "A telescopic inverted-pendulum model of the musculo-skeletal system and its use for the analysis of the sit-to-stand motor task," Journal of Biomechanics 32 (1999), pp. 1205-1212.
Balance System, BalanceTrak 500, & Quantrem, ZapConnect.com: Medical Device Industry Portal, http://www.zapconnect.com/products/index/cfm/fuseaction/products, 2 pages. (Retrieved Apr. 5, 2011).
BERTEC: Dominate Your Field, Physician's Quick Guide, Version 1.0.0, Feb. 2010, 13 pages.
BERTEC: Dominate Your Field, Balancecheck Screener, Version 1.0.0, Feb. 2010, 35 pages.
BERTEC: Dominate Your Field, Balancecheck Trainer, Version 1.0.0, Feb. 2010, 37 pages.

BERTEC Corporation—Balancecheck Standard Screener Package, http://bertec.com/products/balance-systems/standard-screener.html, 1 page. (Retrieved Apr. 12, 2011).

BERTEC Corporation—Balance Systems: Balancecheck Advanced balance assessment & training products for the balance professional, http://bertec.com/products/balance-systems.html, 1 page. (Retrieved Mar. 31, 2011).

BERTEC Corporation—Balancecheck Mobile Screener Package: Portable balance screening with full functionality, http://bertec.com/products/balance-systems/mobile-screener.html, 1 page. (Retrieved Mar. 31, 2011).

BERTEC Corporation—Balancecheck Standard Screener & Trainer Package: Advanced balance screening and rehabilitation system, http://bertec.com/products/balance-systems/standard-screener-trainer.html, 1 page. (Retrieved Mar. 31, 2011).

U.S. Appl. No. 75/136,330, filed Jul. 19, 1996, 47 pages.

BERTEC: Dominate Your Field, Digital Acquire 4, Version 4.0.10, Mar. 2011, 22 pages.

BERTEC: Dominate Your Field, Bertec Force Plates, Version 1.0.0, Sep. 2009, 31 pages.

BERTEC: Dominate Your Field, Product Information: Force Plate FP4060-08:Product Details and Specifications, 4 pages.

BERTEC: Dominate Your Field, Product Information: Force Plate FP4060-10:Product Details and Specifications, 2 pages.

U.S. Appl. No. 73/542,230, filed Jun. 10, 1985, 52 pages.

Brent L. Arnold and Randy J. Schmitz, "Examination of Balance Measures Produced by the Biodex Stability System," Journal of Athletic Training, vol. 33(4), 1998, pp. 323-327.

Trademark Registration No. 1,974,115 filed Mar. 28, 1994, 8 pages.

ICS Balance Platform, Fall Prevention: Hearing Assessment, Fitting Systems, Balance Assessment, Otometrics: Madsen, Aurical, ICS, 2 pages.

U.S. Appl. No. 75/471,542, filed Apr. 16, 1998, 102 pages.

VTI Force Platform, Zapconnect.com: Medical Device Industry Portal, http://zapconnect.com/products/index.cfm/fuseaction/products, 2 pages. (Retrieved Apr. 5, 2011).

Amin M., Girardi M., Konrad H.R., Hughes L., "A Comparison of Electronystagmorgraphy Results with Posturography Findings from the BalanceTrak 500," Otology Neurotology, 23(4), 2002, pp. 488-493.

Girardi M., Konrad H.R., Amin M., Hughes L.F., "Predicting Fall Risks in an Elderly Population: Computer Dynamic Posturography Versus Electronystagmography Test Results," Laryngoscope, 111(9), 2001, 1528-32.

Dr. Guido Pagnacco, Publications, 1997-2008, 3 pages.

College of Engineering and Applied Science: Electrical and Computer Engineering, University of Wyoming, Faculty: Guido Pagnacco, http://wwweng.uwyo.edu/electrical/faculty/Pagnacco.html, 2 pages. (Retrieved Apr. 20, 2011).

EyeTracker, IDEAS, DIFRA, 501(k) Summary: premarket notification, Jul. 5, 2007, 7 pages.

Vestibular technologies, copyright 2000-2004, 1 page.

Scopus preview—Scopus—Author details (Pagnacco, Guido), http:www.scopus.com/authid/detail.url?authorId=6603709393, 2 pages. (Retrieved Apr. 20, 2011).

Vestibular Technologies Company Page, "Vestibular technologies: Helping People Regain their Balance for Life," http:www.vestibtech.com/AboutUs.html, 2 pages. (Retrieved Apr. 20, 2011).

GN Otometrics Launces ICS Balance Platform: Portable system for measuring postural sway, http://audiologyonline.com/news/pf_news_detail.asp?news_id=3196, 1 page. (Retrieved Mar. 31, 2011).

U.S. Appl. No. 75/508,272, filed Jun. 25, 1998, 36 pages.

U.S. Appl. No. 75/756,991, filed Jul. 21, 1999, 9 pages.

U.S. Appl. No. 76/148,037, filed Oct. 17, 2000, 78 pages.

Vestibular technologies, VTI Products: BalanceTRAK User's Guide, Preliminary Version 0.1, 2005, 34 pages.

U.S. Appl. No. 76/148,037, filed Oct. 17, 2000, 57 pages.

Vestibular Technologies, Waybackmachine, http://vestibtech.com/balancetrak500.html, 7 pages. (Retrieved Mar. 30, 2011).

Vestibular Technologies, 2004 Catalog, 32 pages.

The Balance Trak 500—Normative Data, 8 pages.

State of Delaware: The Official Website of the First State, Division of Corporations—Online Services, http://delecorp.delaware.gov/tin/controller, 2 pages. (Retrieved Mar. 21, 2011).

Memorandum in Support of Plaintiff IA Labs' Motion for Partial Summary Judgment on Defendants' Affirmative Defense and Counterclaim That U.S. Patent No. 7,121,982 is Invalid Under 35 U.S.C. §§ 102 and 103, *IA Labs CA, LLC*, (Plaintiff) v. *Nintendo Co., Ltd.* et al., (Defendant), United States District Court for the District of Maryland Southern Division (Apr. 27, 2011), 17 pages.

Search Report (2 pgs.) dated May 27, 2011 issued in German Application No. 20 2004 021 793.7.

* cited by examiner

F I G. 2 0
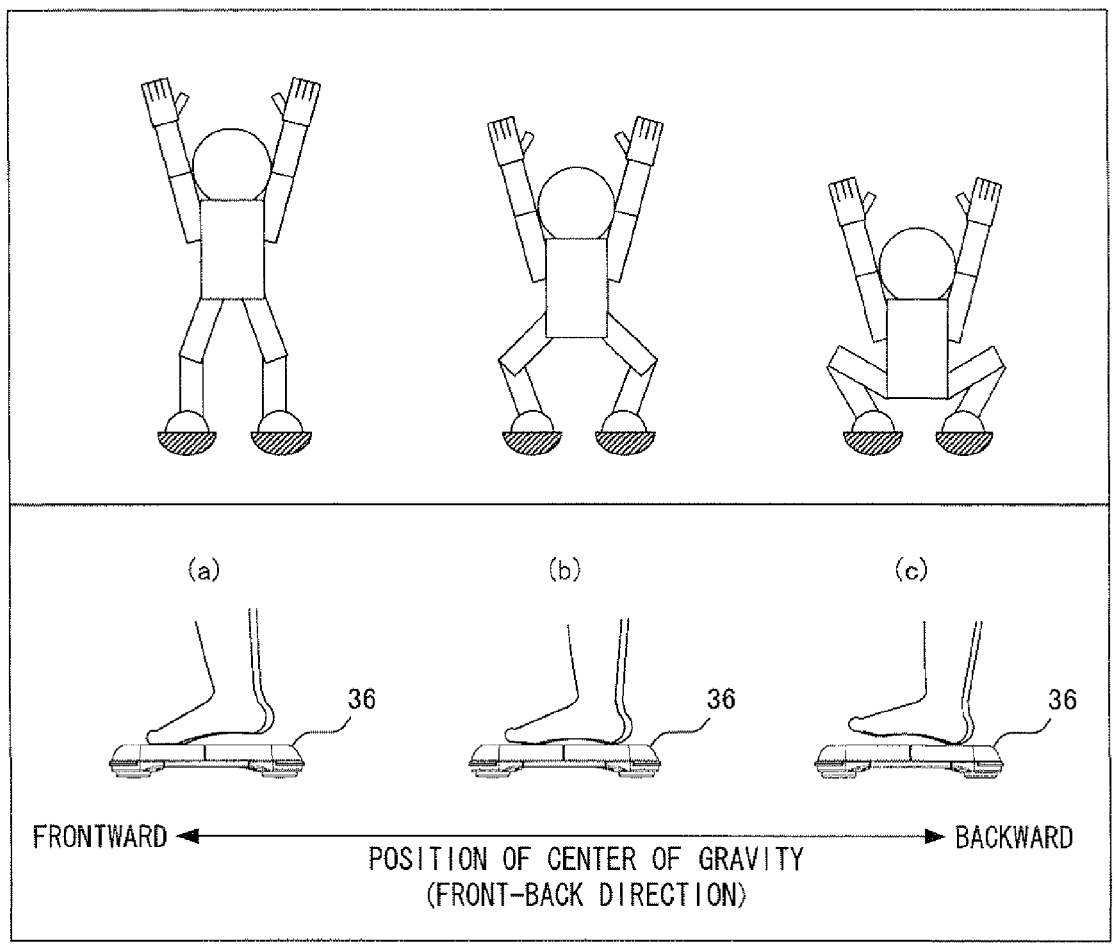

F I G. 2 7
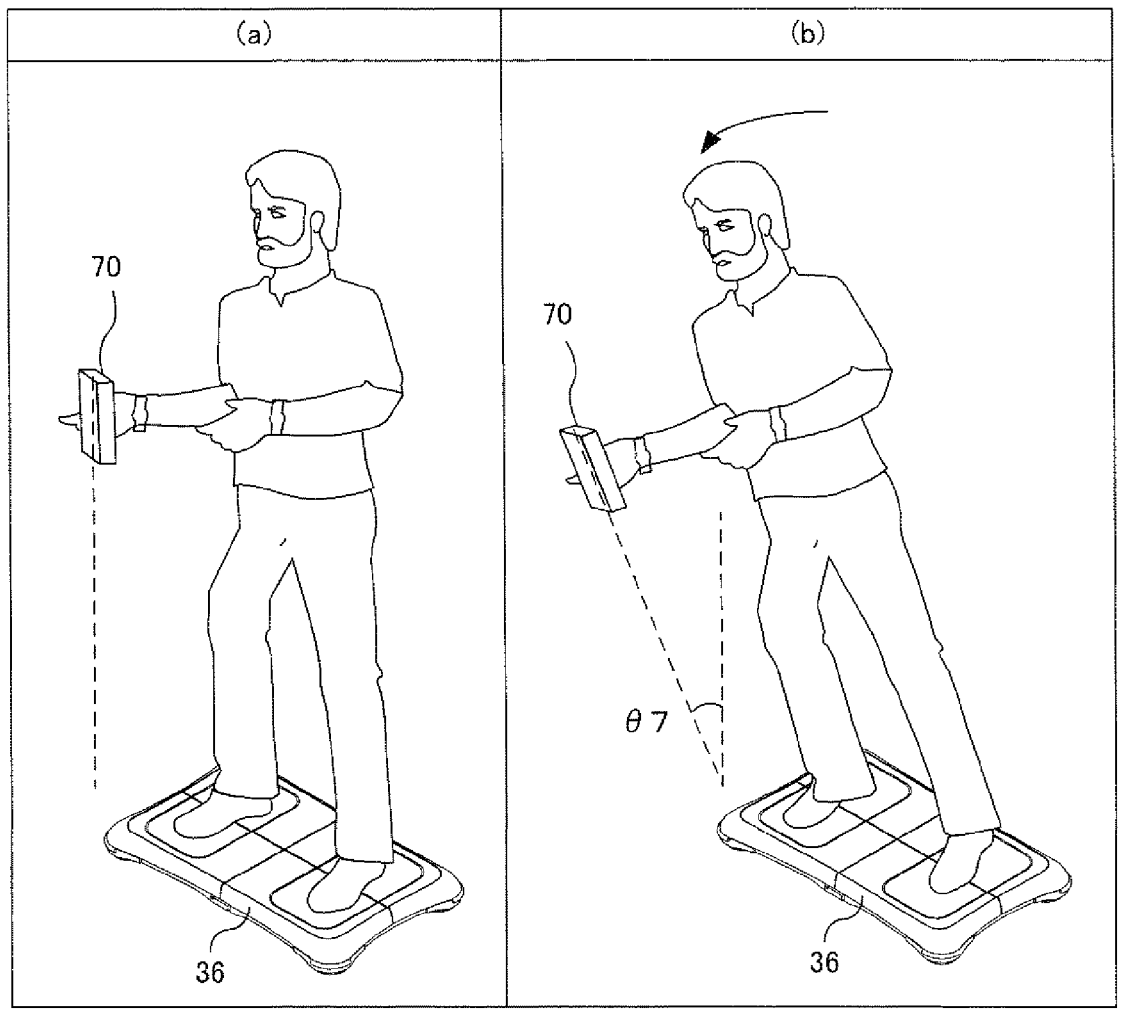

`US 8,152,640 B2`

INFORMATION PROCESSING APPARATUS AND COMPUTER READABLE STORAGE MEDIUM

CROSS REFERENCE TO RELATED APPLICATION

The disclosure of Japanese Patent Application No. 2008-304822, filed Nov. 28, 2008, is incorporated herein by reference.

FIELD

The technology herein relates to an information processing apparatus and a computer readable storage medium; and more specifically to an information processing apparatus and a computer readable storage medium which are capable of causing a character object displayed on a display apparatus to move in response to a user operation.

BACKGROUND AND SUMMARY

Conventionally, a game that uses a combination of input means operated by hand and input means operated by foot has been known.

For example, patent document 1 (Japanese Laid-Open Patent Publication No. 2008-49117) discloses an information processing apparatus that includes a hand input unit having an inclination sensor, and mat unit having a foot switch. According to this information processing apparatus, the hand input unit is operated by hand and the mat unit is operated by a foot stepping motion.

Furthermore, non-patent document 1 (Nintendo Co., Ltd. "Aerobic exercise: Rhythm boxing", search result of Oct. 27, 2008, internet URL: www.nintendo.co.jp/wii/rfnj/training/aerobics/aerobics07.html) discloses a game apparatus that includes a controller with a built-in acceleration sensor, and a board having a built-in load sensor. According to this game apparatus, the controller is operated by being held in hand, and the board is operated by placing a foot thereon.

However, according to the invention in patent document 1, a way of holding the hand input unit by a player is judged whether it is identical to a way of holding the hand input unit by a motion instructing character displayed on a screen, based on inclination information from the inclination sensor. And if the hand input unit is held by the player in a wrong direction, an instruction is given to the player to correct the way of holding. As a result, there is a problem in which only an operation instructed in the screen is allowed, and there is a small degree of freedom for operation. Furthermore, patent document 1 discloses, for the operation of a foot switch provided within the mat unit using the left and the right foot placed on the mat unit, a disposition of two foot-switches ([0026]), or four foot-switches in a straight line ([0162], FIG. 31). However, only on or off of the foot switches is detected, and there is a small range of detectable values. The invention in patent document 1 does not provide a sensor that detects a load, and does not cause the character to conduct a variety of motions in response to a large range of load values detected by the sensor.

Furthermore, according to the invention in non-patent document 1, a player moves the hand-held controller in a predetermined direction as if throwing a punch, following a motion by a trainer displayed on a screen, thus, only the predetermined operation instructed on the screen is allowed and cannot cause the character to conduct a variety of motions in response to motions of the controller, therefore, the invention in non-patent document 1 has a small degree of freedom. Additionally, the foot operation on the board is one that moves a predetermined foot off the board following a motion by the trainer displayed on the screen, thus, only the predetermined operation is allowed, therefore the invention in non-patent document 1 has a small degree of freedom.

Hence, an objective of certain example embodiments is to provide an information processing apparatus and a computer readable storage medium, which are capable of achieving a diverse and complicated operation intuitively, by having operating means that detects motion and operating means that detects load.

Furthermore, another objective of certain example embodiments is to provide a game apparatus and a computer readable storage medium, which are highly entertaining when played.

In order to achieve at least one of the above objectives, the following configuration is adopted in certain example embodiments. Reference numerals in parenthesis and supplementary explanations merely describe one instance of a correspondence relationship with later-described embodiments, in order to help in their understanding and do not limit the scope of the current invention in any way.

In certain example embodiments, an information processing apparatus includes: a display apparatus (34), first operating means (70), second operating means (76), third operating means (36), display control means (40), first attitude calculation means (40, S27), second attitude calculation means (40, S47), load detection means (36b), first motion instructing means (40, S11), second motion instructing means (40, S12), and third motion instructing means (40, S13). The display control means displays a character object on the display apparatus. The first attitude calculation means calculates the attitude of the first operating means. The second attitude calculation means calculates the attitude of the second operating means. The load detection means detects a load applied to the third operating means. The first motion instructing means causes the character object to conduct one or more motions among a plurality of motions, in response to the attitude of the first operating means calculated by the first attitude calculation means. The second motion instructing means causes the character object to conduct one or more motions among a plurality of motions, in response to the attitude of the second operating means calculated by the second attitude calculation means. The third motion instructing means causes the character object to conduct one or more motions among a plurality of motions, in response to a load applied to the third operating means and detected by the load detection means.

With this, it is possible for a user (operator) to cause the character object to conduct a variety of motions intuitively, by having the user (operator) incline the first operating means and the second operating means, and apply a load to the third operating means.

The first attitude calculation means may calculate an inclination direction of the first operating means based on a value obtained from an acceleration sensor (701) built into the first operating means. The second attitude calculation means may calculate an inclination direction of the second operating means based on a value obtained from an acceleration sensor (761) built into the second operating means. The first motion instructing means may cause the character object to conduct two different motions in each of the following cases: when the inclination direction of the first operating means is an inclination direction about a first axis, and when the inclination direction is about a second axis which is different from the inclination direction about the first axis. The second motion instructing means may cause the character object to conduct two different motions in each of the following cases: when the inclination direction of the second operating means is an inclination direction about a third axis, and when the inclination direction is about a fourth axis which is different from the inclination direction about the third axis.

With this, it is possible for the user to cause the character object to conduct a variety of motions intuitively.

The load detection means may have at least three load sensors (36b), and the third motion instructing means may cause the character object to conduct two different motions in each of the cases, when a load value detected by the load sensor is in a first state and when the load value detected by the load sensor is in a second state.

With this, it is possible for the user to cause the character object to conduct a variety of motions intuitively.

The load detection means: may have at least three load sensors (36b), and the third motion instructing means may select at least one group that includes at least one load sensor among the at least three load sensors (e.g. a group that consists of two load sensors positioned on the right side of the player, or a group that consists of two load sensors positioned on the left side of the player); may calculate, a sum of load values detected by the load sensors included in each group; and may control a fourth motion of the character object (S65, S69) based on at least one sum of load values of a group. The third motion instructing means may further select, among the at least three load sensors, at least one other group which is different from the above described group (e.g. a group that consists of two load sensors positioned in front of the player, or a group that consists of two load sensors positioned in the back of the player); may calculate each sum of load values detected by the load sensors included in each of the selected groups; and may control a fifth motion of the character object (S76), which is a motion different from the fourth motion, based on at least one sum of a selected groups.

With this, it is possible for the user to cause the character object to conduct a variety of motions intuitively. Especially, by using the third operating means, at least two types of motion instructions can be inputted simultaneously.

At least one among the first attitude calculation means, the second attitude calculation means, or the load detection means may cause the character object to conduct another additional motion as a result of a combination of operation buttons (B button of FIG. 14, Z button of FIG. 17).

With this, the user can conduct further diverse and complicated operations.

A motion conducted by the first motion instructing means may be a motion associated with a first part (right hand) of the character object, a motion conducted by the second motion instructing means may be a motion associated with a second part (left hand) of the character object, and a motion conducted by the third motion instructing means may be a motion associated with a third part (foot) of the character object.

With this, the user can control a complicated motion of the character object easily and intuitively by using the first operating means, the second operating means, and the third operating means.

The first operating means may be operated by the right hand of the player, the second operating means may be operated by the left hand of the player, and the third operating means may be operated by a foot of the player. Furthermore, the first motion instructing means may be associated with a motion of the right hand of the character object, the second motion instructing means may be associated with a motion of the left hand of the character object, and the third motion instructing means may be associated with a motion of a foot of the character object.

With this, the user can operate the character object intuitively since the character object moves in coordination with an actual movement by the user.

The information processing apparatus may further include: first compensation means for compensating the attitude of the first operating means calculated by the first attitude calculation means, in response to a load applied to the third operating means and detected by the load detection means; and second compensation means for compensating the attitude of the second operating means calculated by the second attitude calculation means, in response to a load applied to the third operating means and detected by the load detection means.

With this, it is possible for an input operation to be as intended by the user, by taking into consideration the body position of the user.

The information processing apparatus may further include third compensation means for compensating a load applied to the third operating means and detected in a detection result of the load detection means, in response to an attitude calculated by the first attitude calculation means and/or the second attitude calculation means.

With this, it is possible for an input operation intended by the user, by taking into consideration of the body position of the user.

In certain example embodiments, an information processing apparatus includes the display apparatus (34), the first operating means (70), the second operating means (76), and the third operating means (36). In certain example embodiments, a computer readable storage medium is a storage medium that stores a computer program, and the computer program causes a computer (40) that is a part of the information processing apparatus to function as the display control means (40), the first attitude calculation means (40, S27), the second attitude calculation means (40, S47), the load detection means (40, S60), the first motion instructing means (40, S11), the second motion instructing means (40, S12), and the third motion instructing means (40, S13).

The display control means (40) displays the character object on the display apparatus. The first attitude calculation means calculates the attitude of the first operating means. The second attitude calculation means calculates the attitude of the second operating means. The load detection means detects a load applied to the third operating means. The first motion instructing means causes the character object to conduct at least one motion among a plurality of motions, in response to the attitude of the first operating means calculated by the first attitude calculation means. The second motion instructing means causes the character object to conduct at least one motion among a plurality of motions, in response to the attitude of the second operating means calculated by the second attitude calculation means. The third motion instructing means causes the character object to conduct at least one motion among a plurality of motions, in response to a load applied to the third operating means and detected by the load detection means.

With this, the user can cause the character object to conduct a variety of motions intuitively, by inclining the first operating means and the second operating means, and by applying load to the third operating means.

In certain example embodiments, the user can cause the character object to conduct a variety of motions intuitively.

The objective described above, other objectives, characteristics, and advantages, of certain example embodiments may become known when taken in conjuction with the following detailed description and drawings.

BRIEF DESCRIPTION OF THE DRAWINGS

These and other features and advantages may be better and more completely understood by reference to the following detailed description of exemplary illustrative embodiments in conjunction with the drawings, of which:

FIG. 20 shows a character object operation method using the load controller 36;

FIG. 27 shows a general outline of a compensation process according to alternate embodiment 1.

DETAILED DESCRIPTION

Figure 1:
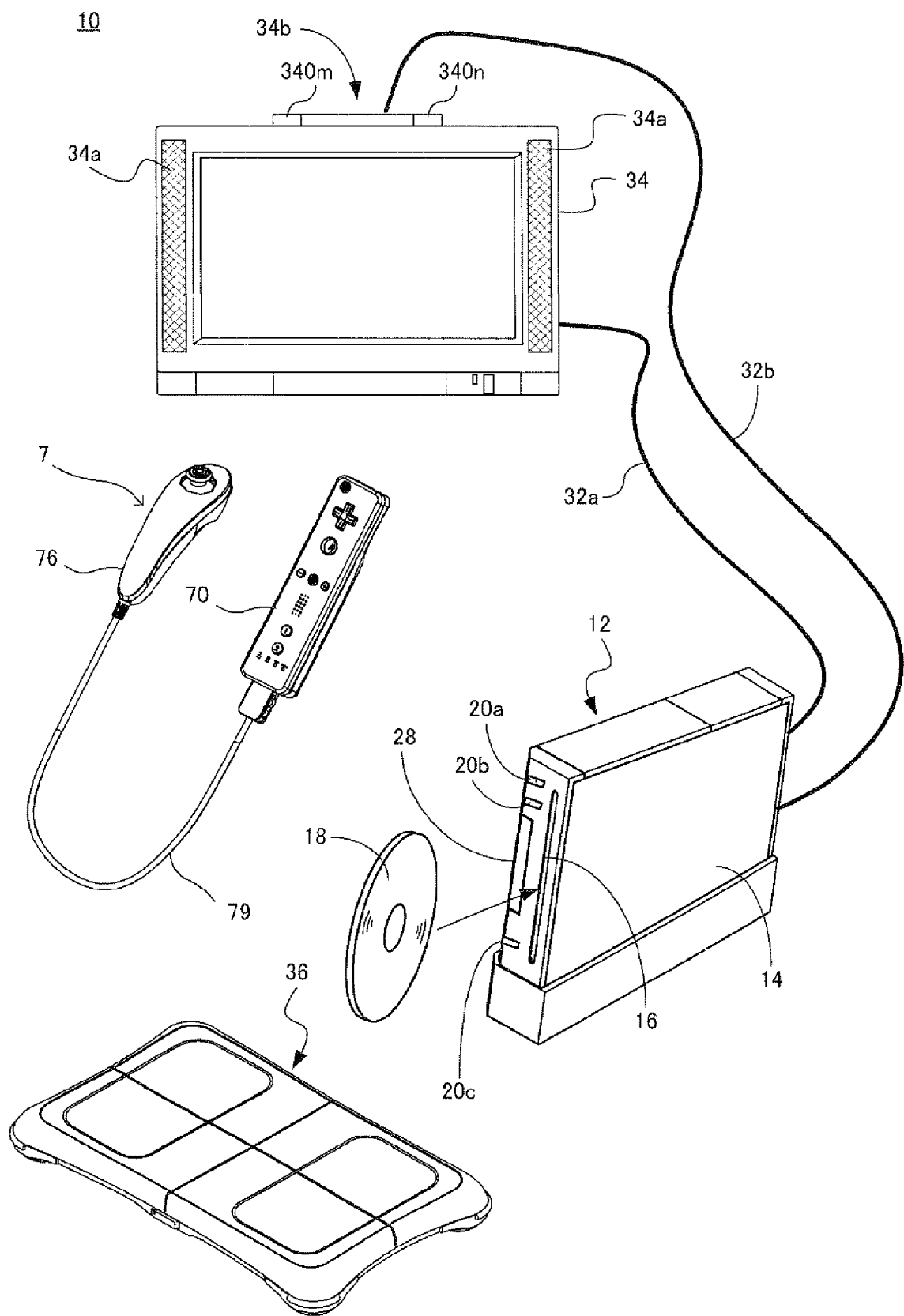
FIG. 1 is an exterior view of a game system 10 according to certain example embodiments.

As shown in FIG. 1, a game system 10 that is an embodiment includes: a video game apparatus 12 (hereinafter, simply referred as "game apparatus"), a controller 7, and a load controller 36. Although a diagrammatic representation is omitted, the game apparatus 12 of this embodiment is designed such that it can communicate with a maximum of four controllers (7, 36). Furthermore, the game apparatus 12 and each of the controllers (7,36) are connected via wireless communication. For example, the wireless communication is executed in accordance with Bluetooth (registered trademark) standard, however, wireless communication may also be executed in accordance with other specifications such as infrared light and wireless LAN.

The game apparatus 12 includes a housing 14 which is parallelepiped shaped, and a disk slot 16 is provided on the front surface of the housing 14. An optical disc 18, which is one example of an information storage medium that stores a game program and the like, is inserted through the disk slot 16, and the optical disc 18 is mounted on a disk drive 54 (refer FIG. 2) disposed within the housing 14. An LED and a light guide plate are disposed in the surrounding area of the disk slot 16, and the LED may be lit up in response to a variety of processes.

Furthermore, on the front surface of the housing 14 of the game apparatus 12, a power button 20a and a reset button 20b are provided on the upper section, and an eject button 20c is provided on the lower section. Moreover, an external memory card connector cover 28 is provided in between the reset button 20b and the eject button 20c in proximity of the disk slot 16. An external memory card connector 62 (refer FIG. 2) is provided inside the external memory card connector cover 28, and an external memory card (hereinafter, simply referred to as "memory card"), which is not diagrammatically represented, is inserted in the external memory card connector 62. The memory card is used for loading and temporarily storing a game program or the like which is read out from the optical disc 18, or for saving a game data of a game played on this game system 10 (a result data or a progress data of the game). However, instead of saving the game data on the memory card, an internal memory, such as a flash memory 44 (refer FIG. 2) provided inside of the game apparatus 12, may be used to save the game data. Furthermore, the memory card may be used as a back-up memory of the internal memory.

A generic SD memory card may be used as the memory card, however, other generic memory cards such as a memory stick and a multimedia card (registered trademark) may also be used.

An AV connector 58 (refer FIG. 2) is provided on the rear surface of the housing 14 of the game apparatus 12, and the AV connector 58 is used for connecting the game apparatus 12 to a monitor 34 and a speaker 34a via an AV cable 32a. The monitor 34 and the speaker 34a are typically a part of a color television receiver, and the AV cable 32a allows a video signal that originated from the game apparatus 12 to be inputted into a video input terminal of the color television, and allows an audio signal to be inputted into an audio input terminal of the color television. Therefore, a game image of, for example, a three dimensional (3D) video game is displayed on a screen of the color television (monitor) 34, and a stereo game audio, such as a game music or a sound effect, is outputted from right and left speakers 34a. Furthermore, a marker section 34b, which includes two infrared LEDs (markers) 340m and 340n, is provided in the periphery of the monitor 34 (in this embodiment, on the upper side of the monitor 34). This marker section 34b is connected to the game apparatus 12 via a power cable 32b. Therefore, power is provided from the game apparatus 12 to the marker section 34b. By this, the markers 340m and 340n produce luminescence, and infrared lights are outputted from each of the markers toward the front of the monitor 34.

Power for the game apparatus 12 is provided from a general AC adaptor (not shown). The AC adaptor is plugged into a standard household wall socket, and the game apparatus 12 converts the household power (commercial power) into a low DC voltage signal suitable for driving the game apparatus 12. A battery may be used as a power source in another embodiment.

With regard to this game system 10, the user first turns on the power of the game apparatus 12 in order for the user or the player to play a game (or other applications instead of a game); and then the user selects, as appropriate, an optical disc 18 in which a video game program is recorded (or another application desired to be played), resulting in the loading of the optical disc 18 onto the disk drive 54 of the game apparatus 12. Consequently, the game apparatus 12 starts executing the video game or another application based on a program recorded on the optical disc 18. The user operates a controller 7 in order to provide input to the game apparatus 12. The controller 7 includes a core unit 70, a subunit 76, and a connection cable 79, and the core unit 70 and the subunit 76 are connected to each other with the connection cable 79. For example, the user can start a game or another application by operating a specific operation button provided on the core unit 70. Furthermore, other than by operating the operation button, the user can cause an animated object (player object) to move in a different direction, or change the user's viewpoint (camera position) within the 3D game world, by moving the core unit 70 or the subunit 76 themselves.

Figure 2:
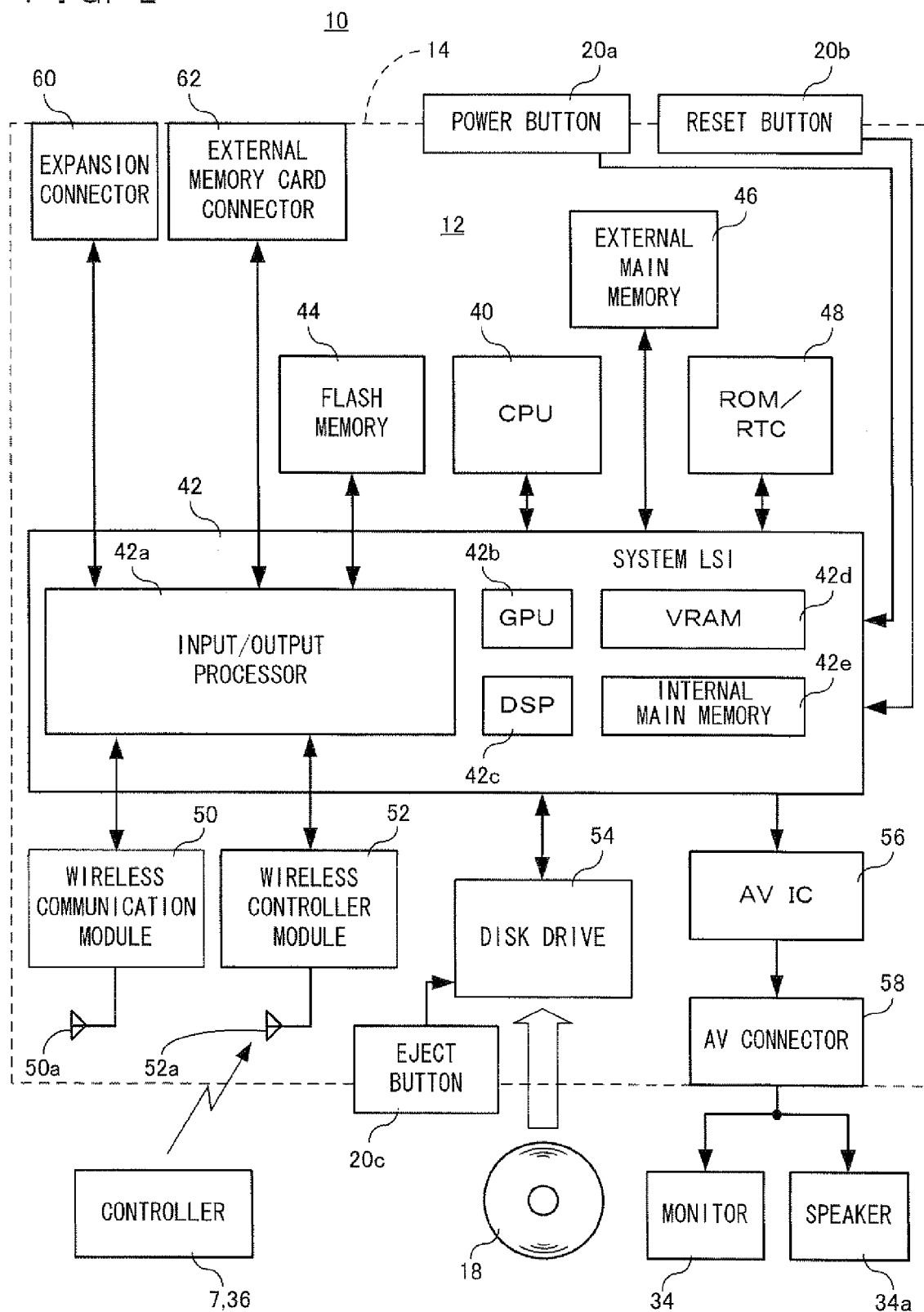
FIG. 2 is a functional block diagram of the game system 10.

FIG. 2 is a block diagram showing an electrical configuration of the video game system 10 of this embodiment. Although not shown, each component within the housing 14 is mounted on a printed-circuit board. As shown in FIG. 2, a CPU 40 is provided to the game apparatus 12. This CPU 40 functions as a game processor. A system LSI 42 is connected to the CPU 40. An external main memory 46, a ROM/RTC 48, the disk drive 54, and an AV IC 56 are connected to the system LSI 42.

The external main memory 46 is used: for storing programs such as a game program and the like; for storing various data; and as a work area and a buffer area of the CPU 40. The ROM/RTC 48, which is a so-called boot ROM, is incorporated with a program in order to start up the game apparatus 12. The ROM/RTC 48 is also provided with a clock circuit for counting time. The disk drive 54 reads out a program data, a texture data, or the like from the optical disc 18; and writes these data onto a later described internal main memory 42e or an external main memory 46, under a control of the CPU 40.

An input/output processor 42a, a GPU (Graphics Processor Unit) 42b, a DSP (Digital Signal Processor) 42c, a VRAM 42d, and the internal main memory 42e, are provided to the system LSI 42. Although not shown, these components are connected to each other by an internal bus.

The input/output processor (I/O processor) 42a executes transmission and reception of a data, and also executes download of a data. Transmission and reception, and download of data are described in detail below.

The GPU 42b forms a part of drawing means, and upon receiving a graphics command (drawing generation order) from the CPU 40, follows the command and generates a game image data. In addition to the graphics command, the CPU 40 also provides the GPU 42b with an image-generating program necessary for generating the game image data.

Although not shown, the VRAM 42d is connected to the GPU 42b as described above. The GPU 42b accesses the VRAM 42d in order to acquire a data (an image data which is a data such as a polygon data and a texture data) necessary for the GPU 42b to execute the drawing generation order. The CPU 40 writes the image data necessary for drawing onto the VRAM 42d via the GPU 42b. The GPU 42b forms a game image data by accessing the VRAM 42d.

In this embodiment, a case is described in which the GPU 42b generates the game image data. However, in a case in which an arbitrary application other than a game application is executed, the GPU 42b generates an image data for the arbitrary application.

Furthermore, the DSP 42c functions as an audio processor, and generates an audio data that corresponds to a sound, an audio, and a music, which are then to be outputted from the speaker 34a. The generation of the audio data by the DSP 42c is conducted by using a sound data and a sound waveform (tone) data, which are stored in the internal main memory 42e and the external main memory 46.

As described above, the generated game image data and audio data are read by the AV IC 56, and are outputted from the monitor 34 and the speaker 34a via the AV connector 58. Therefore, a game screen is displayed on the monitor 34, and a sound (music) necessary for the game is outputted from the speaker 34a.

Furthermore, connected to the input/output processor 42a are: the flash memory 44, a wireless communication module 50, and a wireless controller module 52. Additionally, an expansion connector 60 and the external memory card connector 62 are also connected to the input/output processor 42a. Moreover, an antenna 50a is connected to the wireless communication module 50, and the antenna 52a is connected to the wireless controller module 52.

The input/output processor 42a can communicate, via the wireless communication module 50, with other game apparatuses and various servers connected to a network. However, the input/output processor 42a can also communicate directly with other game apparatuses without going through the network. The input/output processor 42a periodically accesses the flash memory 44, and detects whether a data (transmission data) that needs to be transmitted to the network exists or not, and if there is such a transmission data, this transmission data is transmitted to the network via the wireless communication module 50 and the antenna 50a. Furthermore, the input/output processor 42a receives a data (received data) transmitted from other game apparatuses via, the network, the antenna 50a, and the wireless communication module 50; and stores the received data onto the flash memory 44. However, there are cases in which the received data is discarded without being stored. Furthermore, the input/output processor 42a receives data (download data) downloaded from a download server via the network, the antenna 50a, and the wireless communication module 50; and stores the download data onto the flash memory 44.

Moreover, the input/output processor 42a receives an input data transmitted from the controller 7 and the load controller 36 via the antenna 52a and the wireless controller module 52; and (temporary) stores the input data onto a buffer area of the internal main memory 42e or the external main memory 46. The input data is erased from the buffer area after being used by a game process of the CPU 40.

As described above, in this embodiment, the wireless controller module 52 communicates with the controller 7 and the load controller 36 in accordance with Bluetooth (registered trademark) standard.

Furthermore, for convenience of the drawings, the controller 7 and the load controller 36 are both drawn in FIG. 2.

Moreover, the expansion connector 60 and the external memory card connector 62 are connected to the input/output processor 42a. The expansion connector 60 is a connector for an interface, such as USB or SCSI, and can connect to a medium such as an external storage medium, and can also connect to peripheral devices such as other controllers. Furthermore, a LAN cable adaptor may be connected to the expansion connector 60, and this LAN cable adaptor may be used instead of the wireless communication module 50. An external storage medium such as a memory card may be connected to the external memory card connector 62. Therefore, for example, the input/output processor 42a can access the external storage medium via the expansion connector 60 and the external memory card connector 62; and can save data to, or read data from the external storage medium.

Although not described in detail, the power button 20a, the reset button 20b, and the eject button 20c, are disposed on the game apparatus 12 (housing 14) as shown in FIG. 1. The power button 20a is connected to the system LSI 42. When this power button 20a is turned on, power is provided through the AC adaptor which is not diagrammatically represented, to each component of the game apparatus 12, and the system LSI 42 is set to a normal electricity conducting state mode (normal mode). On the other hand, when the power button 20a is turned off, power is provided only to a part of the components of the game apparatus 12, and the system LSI 42 is set to a mode that suppresses electricity consumption to a minimum necessary level (hereinafter, referred to as "stand-by mode"). In this embodiment, when set to the stand-by mode, the system LSI 42 instructs termination of power supply for components other than the input/output processor 42a, the flash memory 44, the external main memory 46, the ROM/RTC 48, the wireless communication module 50, and the wireless controller module 52. Therefore, this stand-by mode is a mode in which execution of an application by the CPU 40 is not conducted.

Although power is provided to the system LSI 42 even in the stand-by mode; electricity consumption is reduced by not providing a clock signal to the GPU 42b, the DSP 42c, and the VRAM 42d, and by preventing these components from driving.

Although not shown, a fan is provided inside the housing 14 of the game apparatus 12, in order to discharge heat generated from ICs such as the CPU 40 and the system LSI 42. The fan is also stopped in the stand-by mode.

However, when the user does not intend to use the stand-by mode, by applying a setting that does not use the stand-by mode, supply of power to all circuit components is completely terminated when the power button 20a is turned off.

Furthermore, switching between the normal mode and the stand-by mode can also be conducted through remote operation by switching on/off a power switch 72h (refer FIG. 3) provided to the controller 7. When the remote operation is not conducted, a setting that does not supply power to the wireless controller module 52 in the stand-by mode may be applied.

The reset button 20b is also connected to the system LSI 42. When the reset button 20b is pressed, the system LSI 42 restarts a start-up program of the game apparatus 12. The eject button 20c is connected to the disk drive 54. When the eject button 20c is pressed, the optical disc 18 is discharged from the disk drive 54.

<Controller 7>

Figure 3:
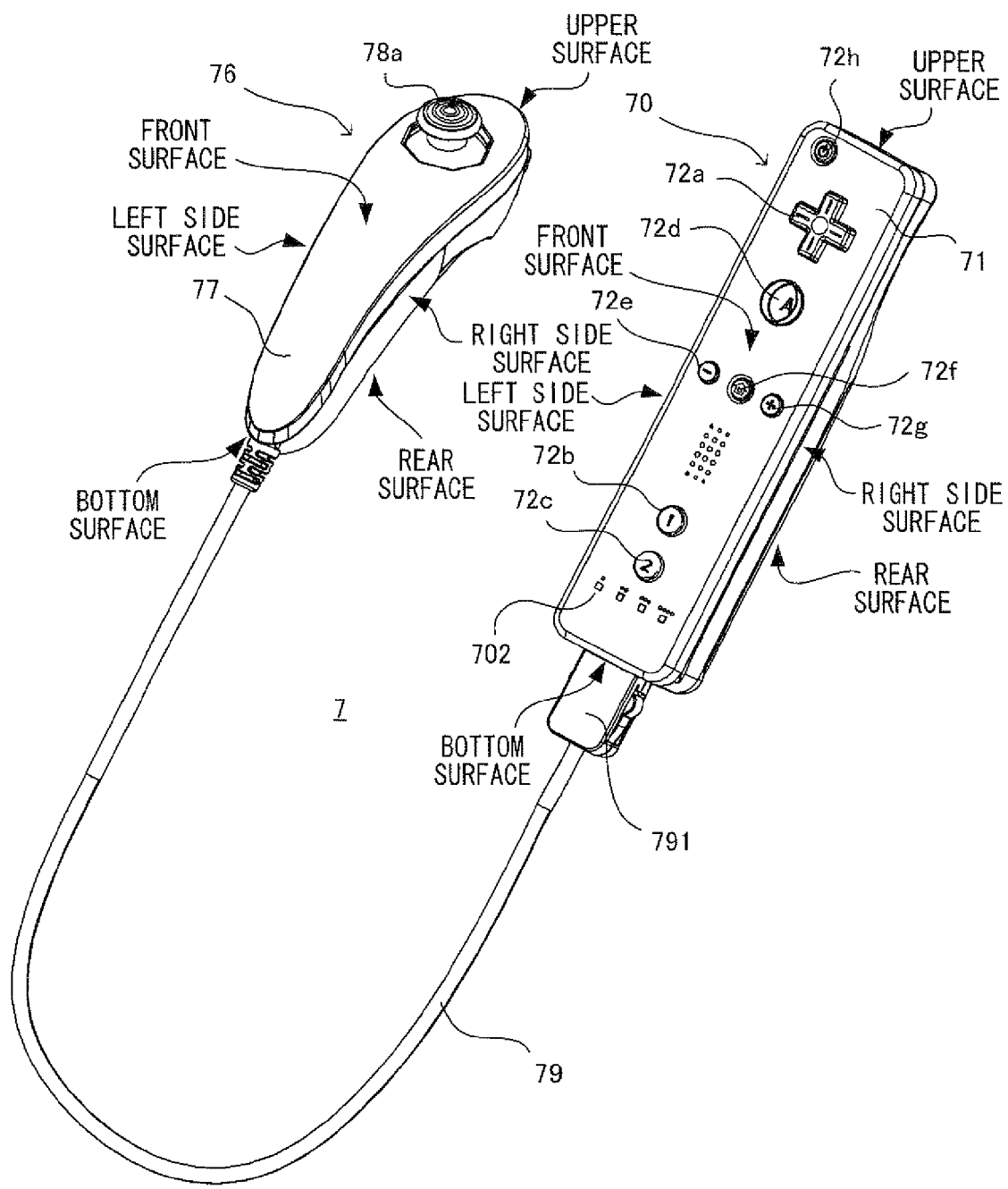
FIG. 3 is an exterior view of a controller 7.

The controller 7 will be described below with reference to FIG. 3 to FIG. 6. FIG. 3 is a perspective view showing the external configuration of the controller 7.

As shown in FIG. 3, the controller 7 includes the core unit 70, the subunit 76, and the connection cable 79; and the core unit 70 and the subunit 76 are connect to each other with the connection cable 79. The core unit 70 includes a housing 71, and the housing 71 is provided with a plurality of operation sections 72. On the other hand, the subunit 76 includes a housing 77, and the housing 77 is provided with a plurality of operation sections 78.

A connector 791 provided at one end of the connection cable 79, and the other end of the connection cable 79 is statically connected to the subunit 76. The connector 791 of the connection cable 79 is engaged with the connector 73 (refer FIG. 4) provided on the bottom surface of the core unit 70, hence, the core unit 70 and the subunit 76 are connected via the connection cable 79.

The core unit 70 includes a housing 71 formed, for example, by plastic molding. The housing 71 has a parallelepiped shape, and has an overall size small enough for being held by one hand of an adult or a child.

A cross key 72a, which is direction instructing means, is provided on the front surface of the housing 71. This cross key 72a is a cross-shaped four-directional push switch. Operation sections are disposed on each of the four projecting portions of the cross-shape at 90° intervals, and each of the four operation sections corresponds to four directions (up, down, right, and left). By having the player hold down one operation section of the cross key 72a, either one direction of, up, down, right, or left, is selected. For example, by operating the cross key 72a, the player can give an instruction about a moving direction of a player character or the like that appears in a virtual game world, or give an instruction about a moving direction of a cursor. A joystick, which is capable of giving instructions in a 360° range direction, may be provided instead of the cross key 72a.

A plurality of operation buttons 72b to 72g are provided on the side toward the bottom surface from the cross key 72a, on the front surface of the housing 71. The operation buttons 72b to 72g are operation sections that output operation signals assigned to each of the operation buttons 72b to 72g, by having the player hold down a button head section. For example, functions such as a No. 1 button, a No. 2 button, and an A button, are assigned to operation buttons 72b to 72d, respectively. Furthermore, functions such as a minus button, a home button, and a plus button, are assigned to operation buttons 72e to 72g, respectively. Various functions are assigned to these operation buttons 72b to 72g depending on a game program executed by the game apparatus 12.

Furthermore, the power switch 72h is provided on the side toward the upper surface from the cross key 72a, on the front surface of the housing 71. The power switch 72h is an operation section for turning on/off the power of the game apparatus 12 by remote control.

Moreover, a plurality of LEDs 702 are provided on the side toward the bottom surface from the operation button 72c, on the front surface of the housing 71. Here, a controller 7 is provided with a controller type (number) in order to be distinguished from other controllers 7. In one instance, the LEDs 702 are used to notify the player about the above described controller type currently assigned to a controller 7. Specifically, among the plurality of LEDs 702, an LED that corresponds to the controller type lights up, when a transmission data is transmitted from the core unit 70 to the game apparatus 12.

Furthermore, sound holes are formed on the front surface of the housing 71 in between the operation button 72b and the operation button 72f, in order to release outwards a sound that originated from a later described speaker 706 (refer FIG. 4).

Additionally, an operation button (not shown) is provided on the rear surface of the housing 71 in a position where an index finger or a middle finger of the player is positioned when the core unit 70 is held by the player. This operation button is an operation section that functions as, for example, a B button; and used, for example, as a trigger switch in a shooting game.

Furthermore, an image pickup device 743 (refer FIG. 6) that consists a part of an imaging information calculation section 74 (refer FIG. 6) is provided on the upper surface of the housing 71. The imaging information calculation section 74 is a system that analyzes an image data that have been taken by the core unit 70, determines a location that has the highest brightness from this analysis, and detects the center of gravity, size, and the like of this location. For example, since the imaging information calculation section 74 analyzes an image data sampled at a sampling cycle of about a maximum of 200 frame/second, the imaging information calculation section 74 is capable of tracking and analyzing a relatively high-speed motion of the core unit 70. The detailed configuration of this imaging information calculation section 74 is described later. Furthermore, the connector 73 (refer FIG. 4) is provided on the bottom surface of the housing 71. The connector 73 is, for example, a 32-pin edge connector, and is used for engaging and connecting to the connector 791 of the connection cable 79.

An internal structure of the core unit 70 will be described below with reference to FIG. 4. FIG. 4 is a perspective view of a state in which an upper case of the core unit 70 (a part of housing 71) is removed.

Figure 4:
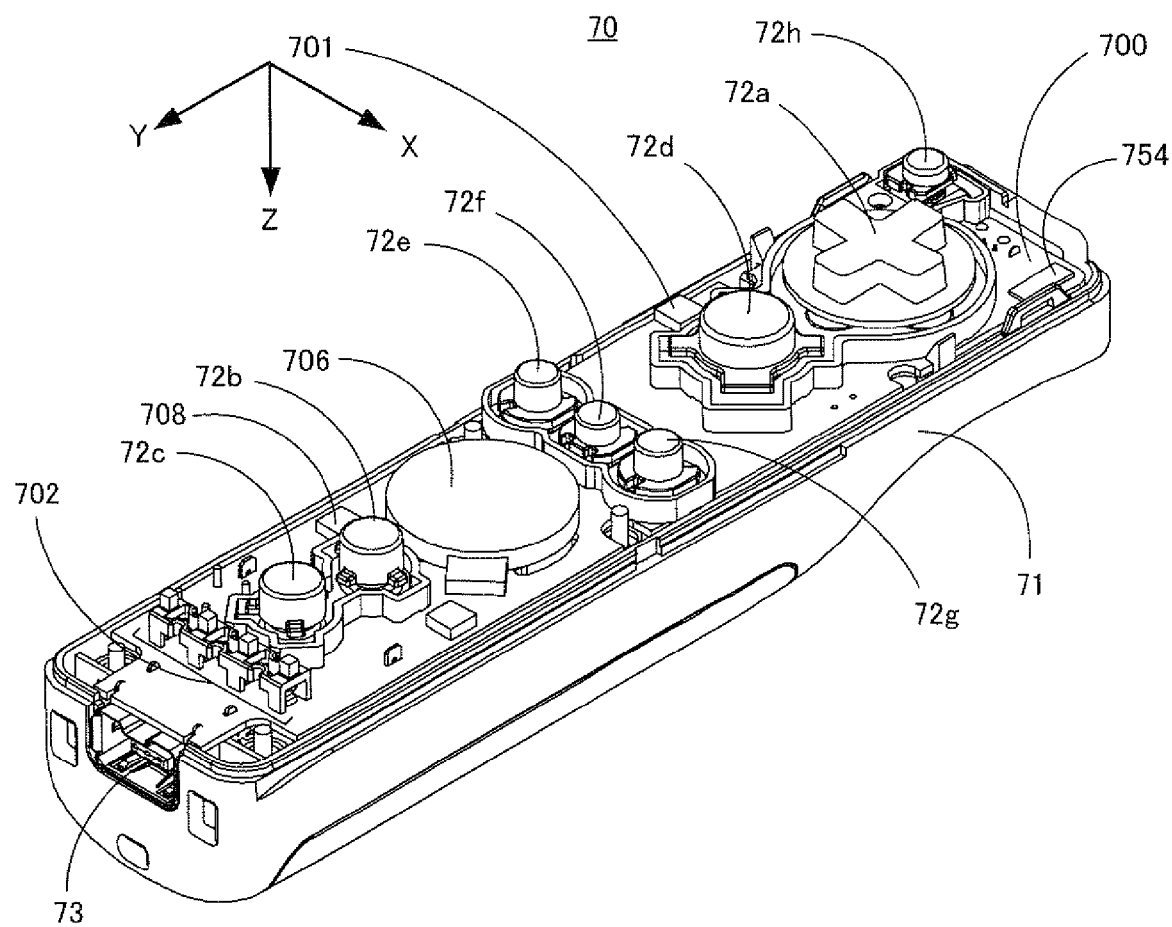
FIG. 4 is a perspective view showing an internal configuration of a core unit 70.

As shown in FIG. 4, a substrate 700 is fixed inside the housing 71; and the operation buttons 72*a* to 72*h*, an acceleration sensor 701, the LEDs 702, the speaker 706, an antenna 754, and the like are provided on an upper main surface of the substrate 700. These components are connected to a microcomputer 751 (refer FIG. 6) and the like by wirings (not shown) formed on the substrate 700 and the like. By providing the acceleration sensor 701 at a peripheral section of the substrate 700 rather than at a central section, a rotation of the core unit 70 can be decided with an excellent sensitivity from a detected acceleration data by a predetermined calculation, since an acceleration included in a centrifugal force component is detected together with a directional change of a gravitational acceleration in response to a rotation about a longitudinal direction axis of the core unit 70.

On the other hand, the imaging information calculation section 74 and the connector 73 are attached to a lower main surface of the substrate 700.

Figure 5:
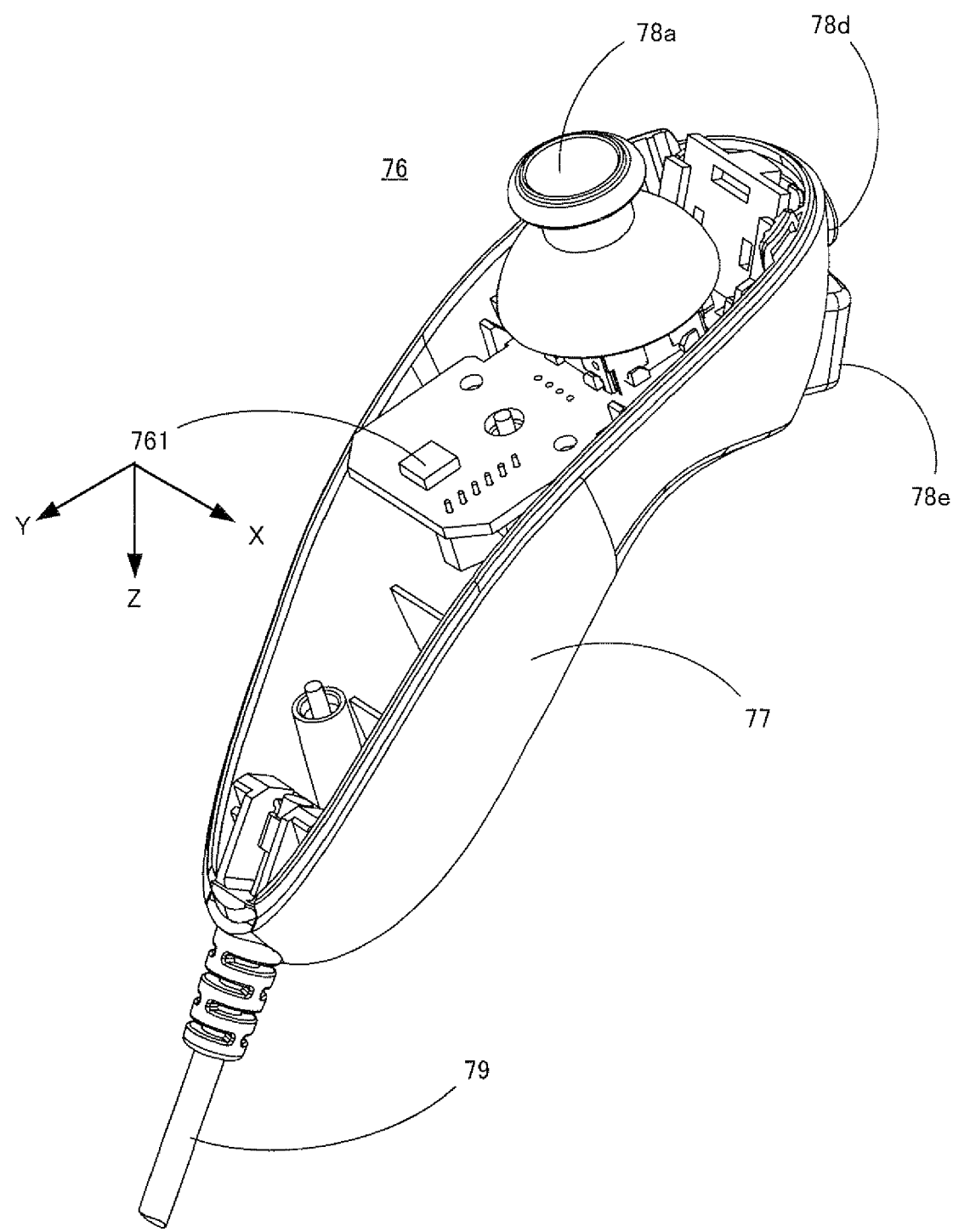
FIG. 5 is a perspective view of an internal configuration of a subunit 76.

The subunit 76 will be described below with reference to FIG. 3 and FIG. 5. FIG. 5 is a perspective view showing a state in which an upper case of the subunit 76 (a part of the housing 77) is removed.

As shown in FIG. 3, the subunit 76 has the housing 77 formed, for example, by plastic molding. The housing 77 has an overall size small enough for being held by one hand of an adult or a child.

A stick 78*a*, which is direction instructing means, is provided on the front surface of the housing 77. The stick 78*a* is an operation section, and by tilting down the stick which projects out from the front surface of the housing 77 and is capable of being tilted down, the stick outputs an operation signal in response to the direction where the stick is tilted down. For example, by tilting down the stick tip to an arbitrary direction chosen from a 360° range, the player can point to an arbitrary direction or position; and can give an instruction about a moving direction of a player character or the like that appears in a virtual game world, or give instructions about a moving direction of a cursor. A cross key may be provided instead of the stick 78*a*.

Operation buttons 78*d* and 78*e* are provided on the upper surface of the housing 77 of the subunit 76 (refer FIG. 5). The operation buttons 78*d* and 78*e* are operation sections that output operation signals assigned respectively to each of the operation buttons 78*d* and 78*e*, as a result of the player holding down a button head section. For example, functions such as an X button and a Y button are assigned to operation buttons 78*d* and 78*e* respectively. Depending on a game program executed by the game apparatus 12, various functions are assigned to these operation buttons 78*d* and 78*e*.

As shown in FIG. 5, a substrate is fixed inside the housing 77, and the stick 78*a*, the acceleration sensor 761, and the like are provided on an upper main surface of the substrate. These components are connected to the connection cable 79 via wirings (not shown) formed on the substrate and the like.

Figure 6:
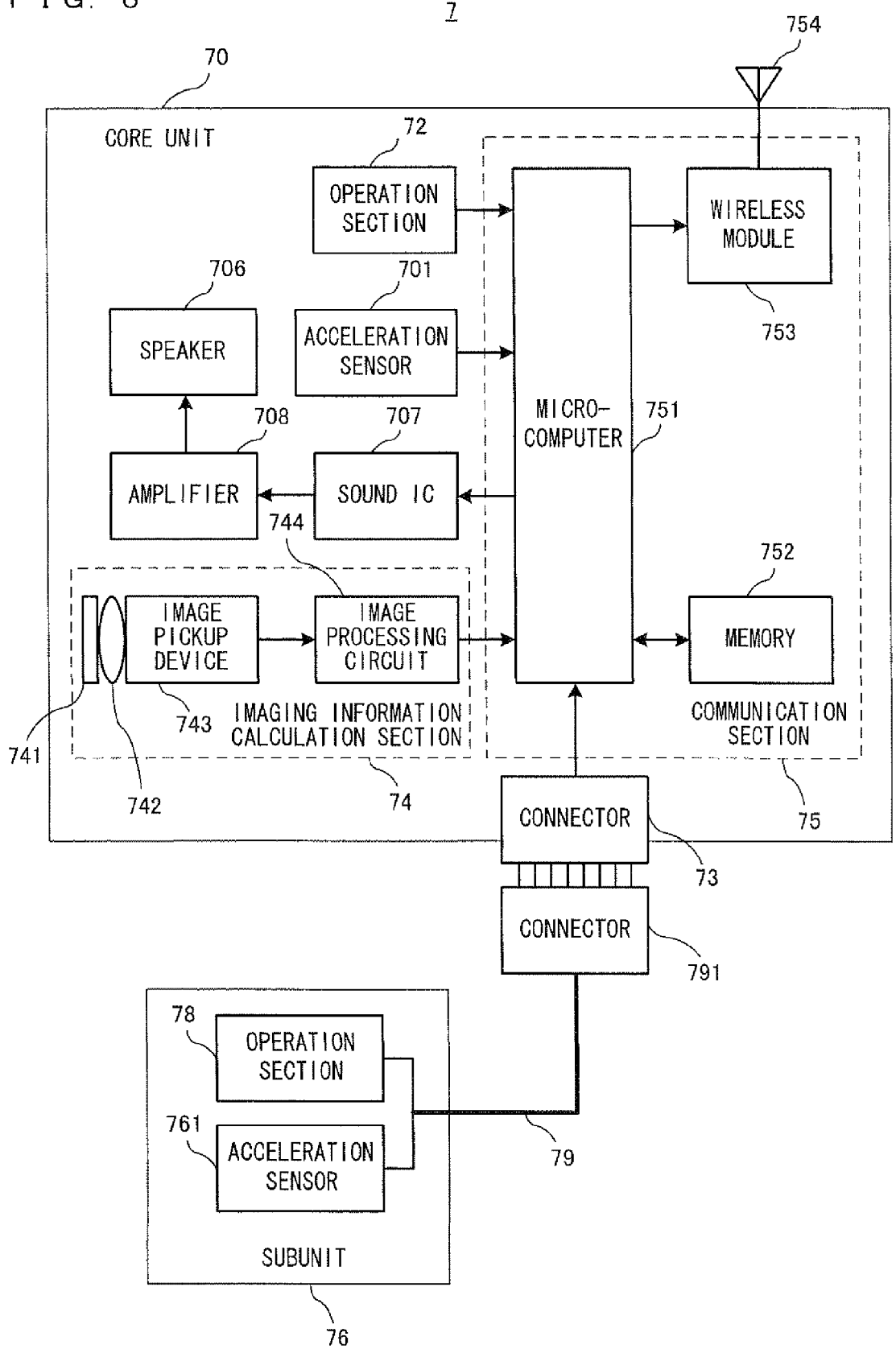
FIG. 6 is a functional block diagram of the controller 7.

An internal configuration of the controller 7 will be described below with reference to FIG. 6. FIG. 6 is a block diagram showing the configuration of the controller 7.

As shown in FIG. 6, the core unit 70 includes: the operation sections 72, the imaging information calculation section 74, the acceleration sensor 701, the speaker 706, a sound IC 707, an amplifier 708, and a communication section 75 that is disposed inside of the core unit 70. Furthermore, the subunit 76 includes the operation sections 78 and the acceleration sensor 761, both of which are described above; and the subunit 76 is connect to the microcomputer 751 via the connection cable 79, the connector 791, and the connector 73.

The imaging information calculation section 74 includes: an infrared filter 741, a lens 742, an image pickup device 743, and an image processing circuit 744.

Among the incoming light from the upper surface of the core unit 70, only infrared light is allowed to pass through the infrared filter 741. The lens 742 converges the infrared light that is transmitted through the infrared filter 741, and outputs the converged infrared light toward the image pickup device 743. The image pickup device 743 is a solid image pickup element, for example, such as a CMOS sensor or a CCD, and takes an image of the infrared light that is converged by the lens 742. Therefore, the image pickup device 743 generates an image data by imaging only the infrared light that passed through the infrared filter 741. The image data generated by the image pickup device 743 is processed by the image processing circuit 744. Specifically, the image processing circuit 744: processes the image data obtained from the image pickup device 743; senses areas of the image which have high brightness; and outputs, a process result data indicating a detection result of positional coordination and area size of such areas, to the communication section 75. The imaging information calculation section 74 is fixed on the housing 71 of the core unit 70, and the imaging direction of the imaging information calculation section 74 can be altered by changing the direction of the housing 71 itself. A signal in response to the position and the motion of the core unit 70 can be obtained based on the process result data outputted from this imaging information calculation section 74.

In the current embodiment, the core unit 70 includes the acceleration sensor 701. Here, the core unit 70 preferably includes an acceleration sensor 701 adapted for three axes orthogonal to each other (X-axis, Y-axis, and Z-axis of FIG. 4). Furthermore, the subunit 76 preferably includes an acceleration sensor 761 adapted for three axes (X-axis, Y-axis, and Z-axis of FIG. 5). The three-axis acceleration sensors 701 and 761 sense linear accelerations in three directions, which are the X-axis direction (direction from the left side surface to the right side surface), the Y-axis direction (direction from the upper surface to the bottom surface), and the Z-axis direction (direction from the front surface to the rear surface). Furthermore, in another embodiment, two-axis acceleration detection means that senses linear accelerations only along each of the X-axis direction and the Y-axis direction (or a direction of other pairs) may be used depending on the type of control signal used in a game process. Moreover, one-axis acceleration detection means that senses a linear acceleration only along an X-axis direction (or along another direction) may be used. For example, the acceleration sensors 701 and 761 of three-axis, two-axis, or one-axis type, may be a type available from Analog Devices, Inc., or STMicroelectronics N.V. The acceleration sensors 701 and 761 may be an electrostatic capacitance type (capacitance-coupling type) based on silicon micro-machined MEMS (Micro Electro Mechanical Systems) technology. Furthermore, the acceleration sensors 701 and 761 of three-axis, two-axis, or one-axis, may be provided from a suitable technology of known acceleration detection means (e.g. piezoelectric method or piezoresistance type method) or from another suitable technology that might be developed in the future.

As understood by anyone skilled in the art, such acceleration detection means that is used in acceleration sensors 701 and 761 can only sense acceleration (linear acceleration) along a straight line which corresponds to each axis of the acceleration sensor. Thus, direct outputs from the acceleration sensors 701 and 761 are signals indicating linear acceleration (static or dynamic) along each axis. Therefore, the acceleration sensors 701 and 761 cannot directly sense physical properties such as a motion along a non-linear (e.g. circular arc shape) pathway, a rotation, a rotational motion, an angular displacement, the inclination, the position, the attitude, and the like.

However, by reading the description in this specification, anyone skilled in the art can easily understand that additional information related to the core unit 70 and the subunit 76 can be presumed or calculated by additionally processing acceleration signals outputted from each of the acceleration sensors 701 and 761. For example, when a static acceleration (gravitational acceleration) is sensed, inclinations against the gravity vector for each of the objects (core unit 70 and subunit 76) can be presumed from a calculation using, an inclination angle and the sensed acceleration, which are both obtained by outputs from the acceleration sensors 701 and 761. As described above, inclinations, attitudes and positions of the core unit 70 and the subunit 76 can be determined by using a combination of the acceleration sensors 701 and 761 and the microcomputer 751 (or another processor). Similarly, when the core unit 70 having the acceleration sensor 701, and the subunit 76 having the acceleration sensor 761, for example, are accelerated dynamically by the user's hands, the core unit 70 and the subunit 76 can calculate or presume their various motions and/or positions, by processing each of the acceleration signals generated by the acceleration sensors 701 and 761. In an alternate embodiment, the acceleration sensors 701 and 761 each may include an embedded signal processing apparatus or another type of process apparatus for, before outputting a signal to the microcomputer 751, conducting a desired process on the acceleration signal outputted from the built-in acceleration detection means. For example, when the acceleration sensor is designed for detecting a static acceleration (e.g. gravitational acceleration), the embedded or dedicated process apparatus may be designed for converting sensed acceleration signals into each corresponding inclination angle. Data that represent accelerations sensed by the acceleration sensors 701 and 761 are outputted to the communication section 75.

The communication section 75 includes: the microcomputer 751, a memory 752, a wireless module 753, and the antenna 754. The microcomputer 751 controls the wireless module 753 which wirelessly transmits a transmission data, by using the memory 752 as a storage area during processing. Furthermore, the microcomputer 751 controls a behavior of the sound IC 707 in response to a data from the game apparatus 12 received by the wireless module 753 via the antenna 754. The sound IC 707 processes a sound data and the like transmitted from the game apparatus 12 via the communication section 75.

Operation signals (core key data) from the operation sections 72 provided in the core unit 70, an acceleration signal (core acceleration data) from the acceleration sensor 701, and a process result data from the imaging information calculation section 74, are outputted to the microcomputer 751. Furthermore, operation signals (sub key data) from the operation sections 78 provided in the subunit 76, and an acceleration signal (sub acceleration data) from the acceleration sensor 761, are outputted to the microcomputer 751 via the connection cable 79. The microcomputer 751 temporarily stores each of the inputted data (core key data, sub key data, core acceleration data, sub acceleration data, and process result data) onto the memory 752 as a transmission data to be transmitted to the game apparatus 12. A wireless transmission from the communication section 75 to the game apparatus 12 is conducted periodically at a predetermined time interval. Since a game process is generally conducted at a cycle unit of 1/60 sec., it is necessary to collect and transmit data in a shorter cycle unit. Specifically, a process unit of the game is 16.7 ms (1/60 sec.), and a transmission interval of the communication section 75 that adopts Bluetooth (registered trademark) is 5 ms. At the time of transmitting to the game apparatus 12, the microcomputer 751 outputs, the transmission data stored in the memory 752 as a series of operation information, to the wireless module 753. Then, the wireless module 753 modulates a carrier wave having a predetermined frequency by using the operation information; and radiates the resultant weak radio signal from the antenna 754; based on, for example, Bluetooth (registered trademark) technology. Thus, the core key data provided to the core unit 70 from the operation sections 72; the sub key data provided to the subunit 76 from the operation sections 78; the core acceleration data provided to the core unit 70 from the acceleration sensor 701; the sub acceleration data provided to the subunit 76 from the acceleration sensor 761; and the process result data provided from the imaging information calculation section 74; are all outputted as a weak radio signal from the core unit 70. Then, the weak radio signal is received by the wireless controller module 52 of the game apparatus 12, and the weak radio signal is demodulated and decoded in the game apparatus 12. This is how the CPU 40 of the game apparatus 12 can acquire the series of operation information (core key data, sub key data, core acceleration data, sub acceleration data, and process result data). Then, the CPU 40 of the game apparatus 12 conducts a game process based on, the acquired operation information and the game program. When Bluetooth (registered trademark) technology is adopted to the communication section 75, the communication section 75 may also include a function for receiving a transmission data that is wirelessly transmitted from other devices.

<Load Controller 36>

Figure 7:
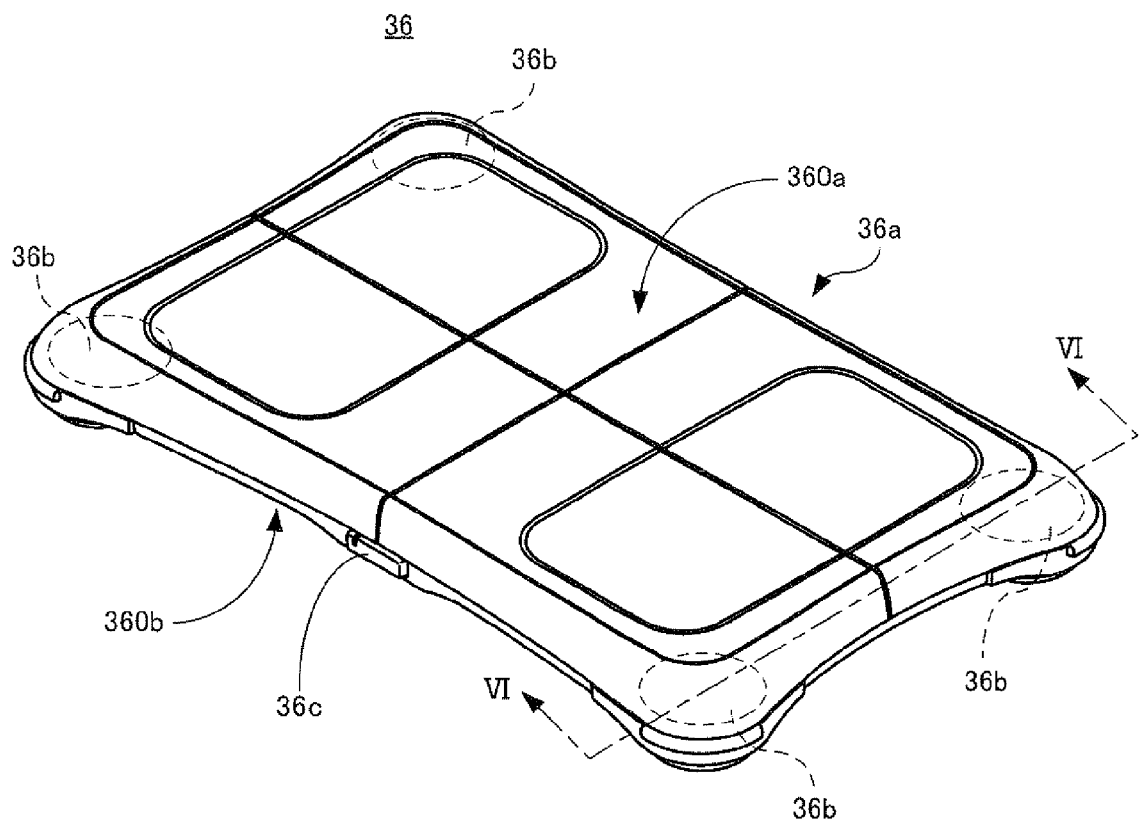
FIG. 7 is a perspective view of a load controller 36.

FIG. 7 is a perspective view showing an exterior view of the load controller 36 shown in FIG. 1. As shown in FIG. 7, the load controller 36 includes: a platform 36a on which the player stands on (the player places his/her foot on); and four load sensors 36b for detecting a load applied to the platform 36a. Each of the load sensors 36b is included in the platform 36a (refer FIG. 8), and the positions where the load sensors 36b are disposed are indicated as dotted lines in FIG. 7.

The platform 36a has a parallelepiped form, and the top-down perspective of the platform 36a is a rectangular shape. For example, the short side of the rectangle is set to be approximately 30 cm, and the long side is set to be approximately 50 cm. The upper surface of the platform 36a where the player stands on is flat. Side surfaces around the four corners of the platform 36a are formed such that they partially extend out cylindrically.

The four load sensors 36b are disposed to this platform 36a with predetermined intervals between each other. In this embodiment, the four load sensors 36b are disposed in marginal sections, more specifically in the four corners, of the platform 36a. The intervals between the load sensors 36b are set to a value that is appropriate for detecting a player's intention for game operation with excellent precision, based on the way the player applies a load against the platform 36a.

Figure 8:
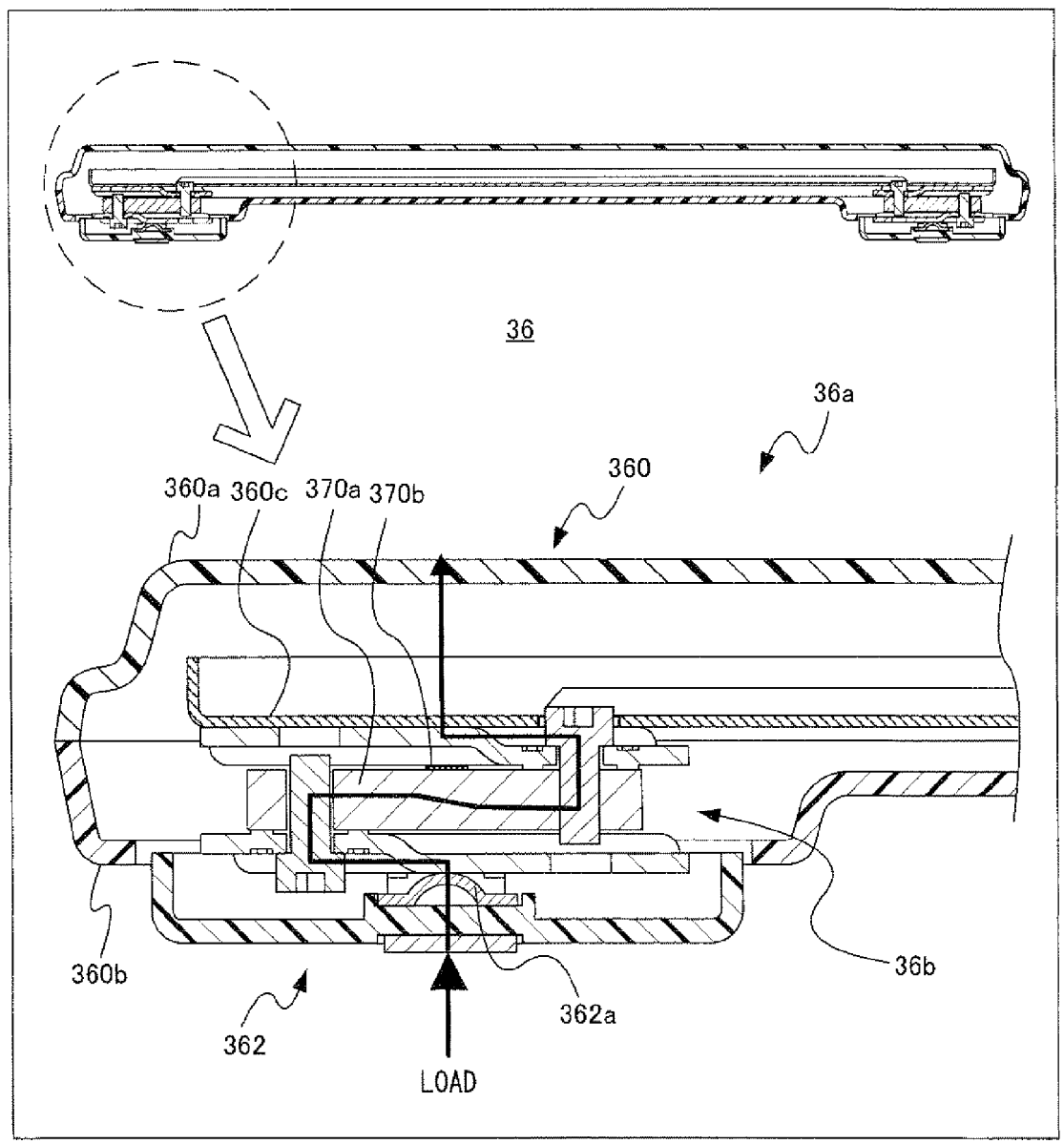
FIG. 8 is a cross sectional view of the load controller 36.

FIG. 8 shows: a cross sectional view along line VI-VI of the load controller 36 shown in FIG. 7, and an enlarged view of a corner part where a load sensor 36b is disposed. As obvious from FIG. 8, the platform 36a includes: a supporting plate 360 for having the player to stand on, and support legs 362. The support legs 362 are provided where the load sensor 36b is disposed. In this embodiment, four support legs 362 are provided to the four corners, since the four load sensors 36b are disposed in the four corners. The support legs 362 are formed to be approximately a bottom-sealed cylindrical shape, for example, by plastic molding; and the load sensor 36b is disposed on a spherical surface component 362a which is provided on a bottom surface within the support legs 362. The supporting plate 360 is supported by the support legs 362 via the load sensors 36b.

The supporting plate 360 includes: an upper-layer plate 360a which forms the upper surface and the upper sections of side surfaces; a lower-layer plate 360b which forms the lower surface and lower sections of side surfaces; a mid-layer plate 360c which is provided in between the upper-layer plate 360a and the lower-layer plate 360b. The upper-layer plate 360a and the lower-layer plate 360b are formed, for example, by plastic molding; and the two are combined into one by adhesion and the like. The mid-layer plate 360c is formed, for example, by press molding a single layer metal plate. This mid-layer plate 360c is fixed on top of the four load sensors 36b. The upper-layer plate 360a includes ribs (not shown) in a grid pattern on its lower surface, and the upper-layer plate 360a is supported by the mid-layer plate 360c via these ribs. Therefore, when the player stands on the platform 36a, the load is transferred to the supporting plate 360, the load sensor 36b, and the support legs 362. As shown in FIG. 8 with an arrow, a counteraction, from the floor and generated by the inputted load, is transferred to the upper-layer plate 360a from the support legs 362 through the spherical surface component 362a, the load sensor 36b, and the mid-layer plate 360c.

The load sensor 36b is, for example, a strain gauge (strain sensor) type load cell, which is a load converter that converts an inputted load into an electrical signal. In the load sensor 36b, in response to a load input, an elastic body 370a deforms and a deformation is generated. This deformation is converted into a change in electrical resistance by a strain sensor 370b attached to the elastic body 370a, and then converted into a change in voltage. As a result, the load sensor 36b outputs, a voltage signal that represents the input load, from an output terminal.

The load sensor 36b may be a load sensor of other types, such as a tuning fork type, a vibrating wire type, an electrostatic capacitance type, a piezoelectric type, a magnetostrictive type, and a gyro type.

As shown in FIG. 7, a power button 36c is further provided to the load controller 36. When this power button 36c is turned on, power is provided to each circuit component (refer FIG. 9) of the load controller 36. However, there are cases in which the load controller 36 is turned on following an instruction by the game apparatus 12. Furthermore, when a state, in which the player has not been standing on the load controller 36, continues for a certain period of time (e.g. 30 sec.) or more; the power is turned off. On the other hand, the power may be turned off, if the power button 36c is pressed when the load controller 36 is active.

Figure 9:
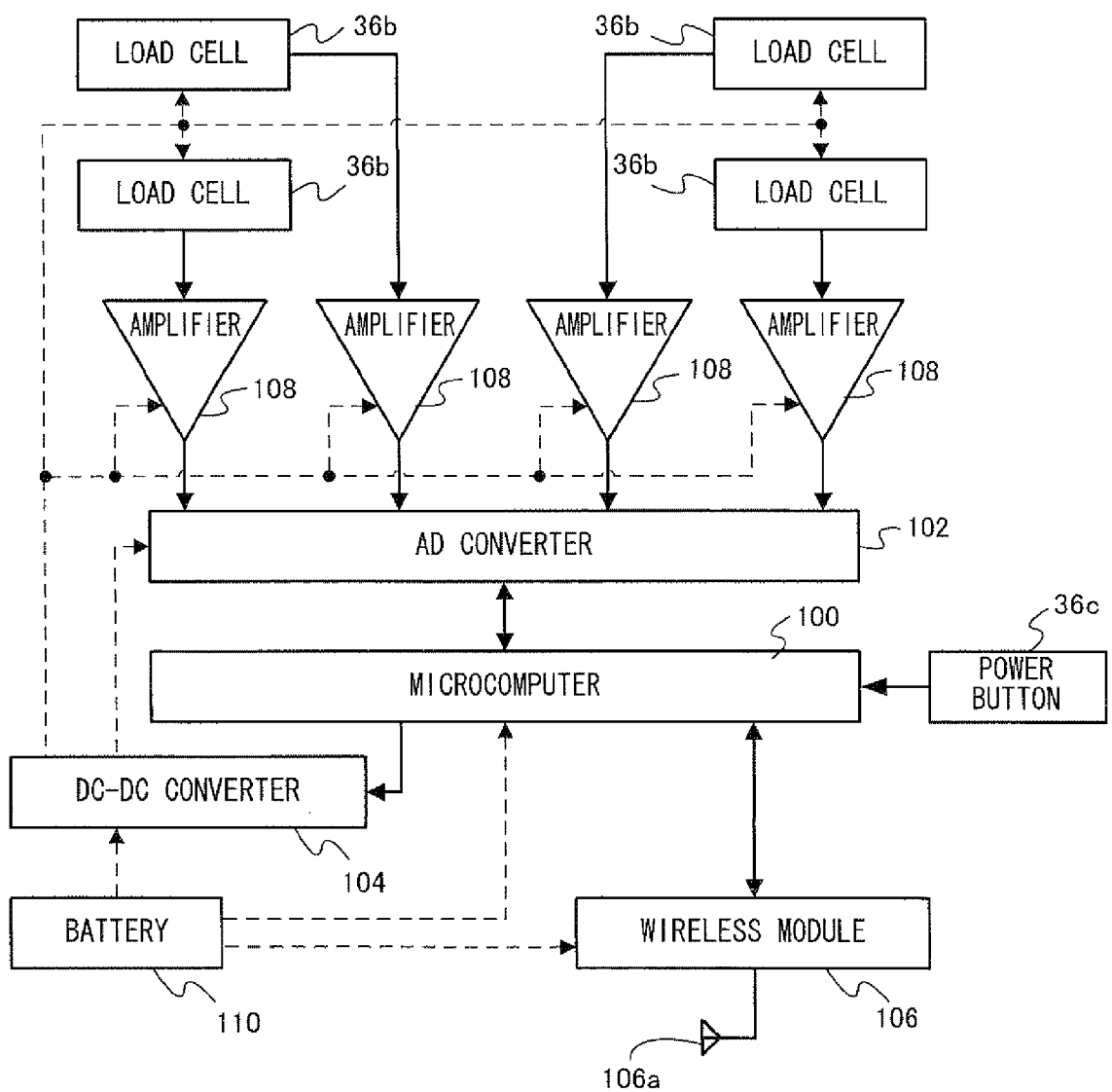
FIG. 9 is a functional block diagram of the load controller 36.

The block diagram in FIG. 9 shows one example of an electrical configuration of the load controller 36. In this FIG. 9, the flow of signals and communications are shown with solid line arrows. Dashed arrows show the supply of power.

The load controller 36 includes a microcomputer 100 for controlling the behavior of the load controller 36. Although not shown, the microcomputer 100 includes a CPU, a ROM, a RAM, and the like; and the CPU controls the behavior of the load controller 36 in accordance with a program stored on the ROM.

The power button 36c, an AD converter 102, a DC-DC converter 104, and a wireless module 106, are connected to the microcomputer 100. Furthermore, an antenna 106a is connected to the wireless module 106. Additionally, the four load sensors 36b (load cells in this embodiment) are connected to the AD converter 102 via an amplifier 108.

Moreover, a battery 110 is contained in the load controller 36 for supplying power. In another embodiment, a commercial power source may be provided by connecting an AC adaptor instead of the battery. In such a case, instead of the DC-DC converter 104, a power circuit, which converts alternating current into direct current, and steps down and rectifies the resulting DC voltage, is required. In this embodiment, supplying power to the microcomputer 100 and the wireless module 106 is conducted directly from the battery 110. Thus, a component (CPU) that is contained inside the microcomputer 100 as a part of it; and the wireless module 106; are constantly supplied with power, and detect whether or not a power button 36c is turned on or a power-on (load detection) command is transmitted from the game apparatus 12. On the other hand, power is supplied from the battery 110 to the load sensor 36b, AD converter 102, and the amplifier 108, via the DC-DC converter 104. The DC-DC converter 104 converts a voltage value of DC electricity supplied from the battery 110 into a different voltage value, and supplies the resulting DC electricity to the load sensor 36b, the AD converter 102, and the amplifier 108.

The supply of power to the load sensor 36b, the AD converter 102, and the amplifier 108, may be conducted if needed, by having the microcomputer 100 controlling the DC-DC converter 104. That means, when it is judged that it is necessary to activate the load sensor 36b in order to detect a load, the microcomputer 100 may control the DC-DC converter 104, and supply power to each load sensor 36b, the AD converter 102, and each amplifier 108.

When power is provided, each load sensor 36b outputs a signal indicating an inputted load. The signal is amplified at each amplifier 108, converted from an analog signal to a digital data by the AD converter 102, and is inputted into the microcomputer 100. Identification information of each load sensor 36b is given to each detected value obtained from each load sensor 36b. As a result, it is possible to identify the load sensor 36b that has produced a certain detected value. In this way, the microcomputer 100 can acquire data representing the detected load values at a certain time point from each of the four load sensors 36b.

On the other hand, when it is judged that it is not necessary to activate the load sensor 36b, which is, when it is not time for load detection, the microcomputer 100 controls the DC-DC converter 104 and terminates the supply of power to the load sensor 36b, the AD converter 102, and the amplifier 108. In this manner, since the load sensor 36b can be activated for load detection only when necessary, in the load controller 36, it is possible to suppress electricity consumption required for load detection.

A time when it is necessary for load detection is typically a time when the game apparatus 12 needs to acquire a load data. For example, when the game apparatus 12 needs load information, the game apparatus 12 transmits a load acquisition order to the load controller 36. When the microcomputer 100 receives the load acquisition order from the game apparatus 12, the microcomputer 100 controls the DC-DC converter 104, supplies power to the load sensor 36b and the like, and detects a load. On the other hand, when the microcomputer 100 is not receiving a load acquisition order from the game apparatus 12, the microcomputer 100 controls the DC-DC converter 104, and terminates the supply of power to the load sensor 36b and the like.

Alternatively, the microcomputer 100 may judge it is time for load detection every certain period of time, and may control the DC-DC converter 104. When such periodical load detection is conducted, a period information may be given from the game apparatus 12 to the microcomputer 100 of the load controller 36 at the beginning and stored, or may be stored in the microcomputer 100 in advance.

A data representing a detected value obtained from the load sensor 36b is transmitted from the microcomputer 100 to the game apparatus 12 via the wireless module 106 and the antenna 106a as an operation data (input data) of the load controller 36. For example, when load detection is conducted after receiving a load acquisition order from the game apparatus 12, after receiving a detected value data of the load sensor 36b from the AD converter 102, the microcomputer 100 transmits the detected value data to the game apparatus 12. Alternatively, the microcomputer 100 may transmit a detected value data to the game apparatus 12 every certain period of time. When a transmission cycle is longer than a detection cycle of a load; data, which includes load values detected at a plurality of detection time points before the next transmission, is transmitted.

The wireless module 106 is capable of communicating with the same wireless standard (Bluetooth (registered trademark), wireless LAN, and the like) as the wireless standard of the wireless controller module 52 of the game apparatus 12. Therefore, the CPU 40 of the game apparatus 12 can transmit a load acquisition order to the load controller 36 via the wireless controller module 52 and the like. The microcomputer 100 in the load controller 36, can receive the load acquisition order from the game apparatus 12 via the wireless module 106 and the antenna 106a, and can also transmit the input data that includes the detected load value (or calculated load value) of each load sensor 36b to the game apparatus 12.

For example, in a case of a game that is executed based on just the summation value of the four load values has detected by the four load sensors 36b, it is not necessary to determine which load sensor 36b detected each of the four load values detected by one of the four load sensors 36b. Therefore, the player can assume any position with regard to the four load sensors 36b of the load controller 36. Hence, the player can stand on the platform 36a and play the game in any position and in any direction. However, depending on the type of the game, it is necessary to identify, with regard to a player, a direction of a load value detected by each load sensor 36b, and conduct a process. Thus, depending on the type of the game, it is necessary for the positional relationship of the four load sensors 36b of the load controller 36 and the player, to be understood. In this case, for example, if the positional relationship of the four load sensors 36b and the player is established in advance, it can be assumed that the player would stand on the platform 36a to obtain the predetermined positional relationship. Typically, an established positional relationship is, a positional relationship in which two load sensors 36b exists in the front, rear, right, and left, of the player standing in the center of the platform 36a; in other words, when the player is standing in the center of the platform 36a of the load controller 36, a load sensor 36b exists in each of, the front right, the front left, the rear right, and the rear left, directions from the player. In this case and in this embodiment, since the platform 36a of the load controller 36 has a rectangular shape in a planar view, and since the power button 36c is provided on one side (long side) of the rectangle; by using this power button 36c as a marker, it can be decided in advance that the player is asked to stand on the platform 36a having the long side that has the power button 36c in a predetermined direction (forward, backward, rightward, or leftward). In this way, a load value detected by each load sensor 36b will be a load value from a predetermined direction (front right, front left, rear right, and rear left) with regard to the player. Therefore, the load controller 36 and the game apparatus 12 can understand the correspondence of each detected load value to the directions with regard to the player, based on an identification information of each load sensor 36b contained in an detected load value data, and a disposition data, which is configured (stored) in advance, indicating the position or the direction of each load sensor 36b with regard to the player. With this, it is possible to understand a player's intention of game operation, such as an operating direction, for example, forward, backward, rightward, and leftward.

The disposition of each load sensor 36b with regard to the player may be established, in an initial setting or configured while a game is being played, by a player input, instead of being established in advance. For example, since the positional relationship of each load sensor 36b with regard to the player can be specified by, displaying a screen instructing the player to stand in a predetermined direction (front left, front right, rear left, and rear right) with regard to the player, and acquiring a load value; a disposition data with this positional relationship may be generated and stored. Alternatively, a screen for selecting the disposition of the load controller 36 may be displayed on the screen of the monitor 34; and the player may be asked to select the direction where the marker (power button 36c) exists with regard to the player, by an input with the controller 7. Then, a disposition data of each load sensor 36b based on this selection may be generated and stored.

<Game Playing Method>

Figure 10:
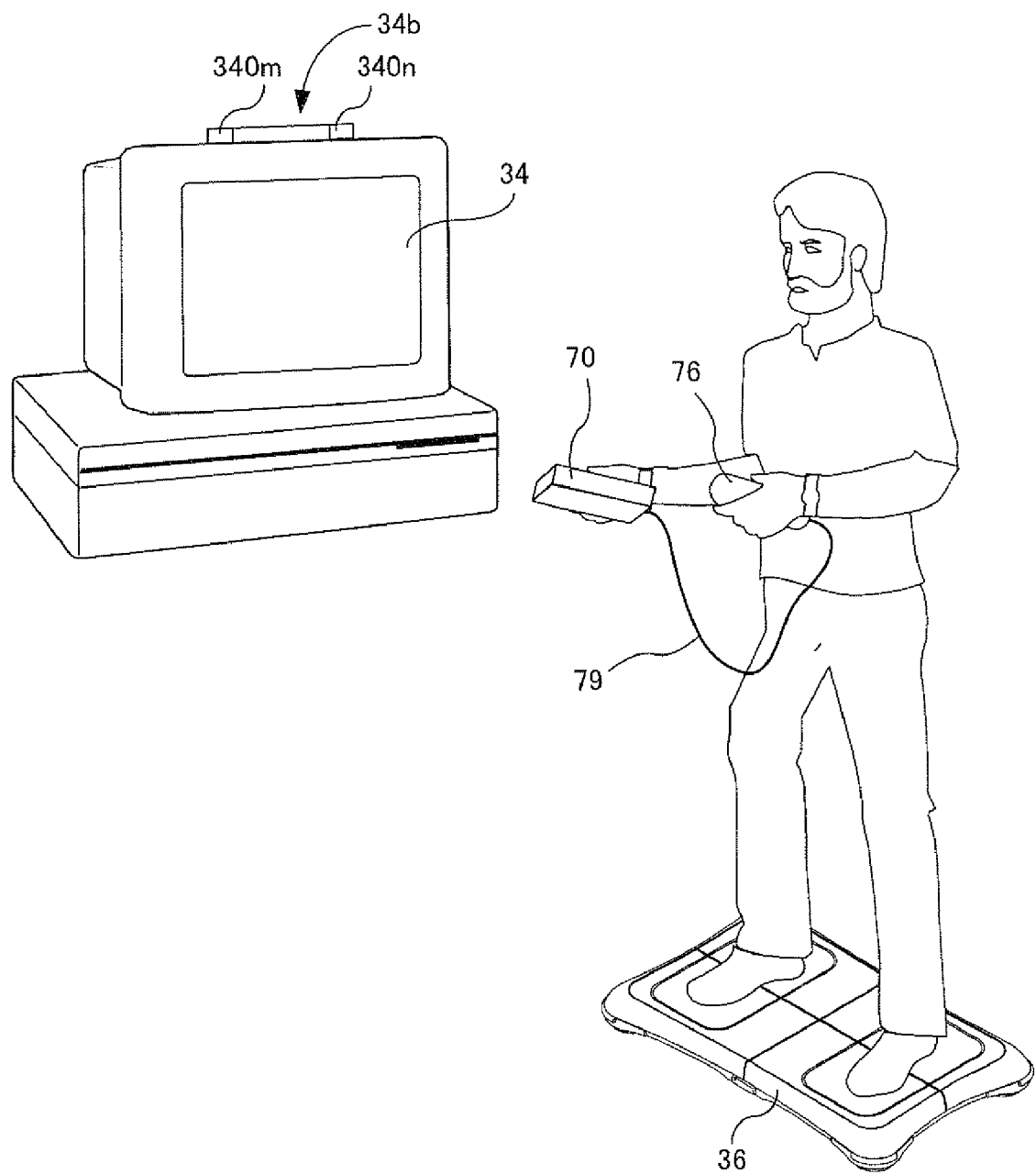
FIG. 10 shows a player when playing a game.

FIG. 10 shows a general outline of how the player plays the game using the controller 7 and the load controller 36. As shown in FIG. 10, when the player plays a game of the video game system 10 using the controller 7 and the load controller 36, the player stands on the load controller 36, holds the core unit 70 in one hand (e.g. right hand), and holds the subunit 76 in the other hand (e.g. left hand).

FIG. 10 shows a case in which the player is facing sideways with regard to the screen by placing the load controller 36 lengthwise (disposed such that a short side of the load controller 36 is parallel to the screen) with regard to the screen of the monitor 34. However, a disposition of the load controller 36 and a facing direction of the player, with regard to the screen, can be altered as appropriate depending on the type of game. For example, the player may face the front surface of the screen by placing the load controller 36 crosswise (disposed such that a long side of the load controller 36 is parallel to the screen) with regard to the screen.

As described above, the inclination, the attitude, the position, and the motion (traveling motion, swinging motion, and the like), of the core unit 70 can be determined by using an output (core acceleration data) from the acceleration sensor 701 provided in the core unit 70. Thus, as a result of the player moving his/her hand that holds the core unit 70, upward, downward, rightward, leftward, and the like; the core unit 70 functions as operation input means that responds to the player's hand motion and direction. Furthermore, as described above, the inclination, the attitude, the position, and the motion (traveling motion, swinging motion, and the like) of the subunit 76 can be determined by using an output (sub acceleration data) from the acceleration sensor 761 provided in the subunit 76. Thus, as a result of the player moving his/her hand that holds the subunit 76 upward, downward, rightward, leftward, and the like; the subunit 76 functions as operation input means that responds to the player's hand motion and direction. Accordingly, motion of both hands can be inputted by having the player hold the two units, one in each hand, and operate the two units by moving both hands.

Furthermore, as described above, a player's motion such as placing or removing a foot on/from the load controller 36, or a position of the center of gravity (a position calculated by a ratio and the like, of the four load value) of a player standing on the load controller 36, can be judged, based on the four load values detected by the four load sensors 36b provided in the load controller 36. Thus, as a result of the player on the load controller 36: moving his/her center of gravity forward, backward, rightward, and leftward; standing on one foot; or tip-toeing; the load controller 36 functions as operation input means that responds to the player's foot motion. Accordingly, motion of the foot can be inputted by having the player stand on the load controller 36, and operate the load controller 36 by moving his/her foot.

A mode, in which the controller 7 and the game apparatus 12 are connected by wireless communication, is described above. However, the controller 7 and the game apparatus 12 may also be electrically connect by a cable. In this case, the cable connected to the core unit 70 is also connected to a connection terminal of the game apparatus 12.

Furthermore, among the core unit 70 and the subunit 76 which are a part of the controller 7, the communication section 75 is provided only to the core unit 70 in the description above. However, a communication section that transmits the transmission data to the game apparatus 12 via wireless transmission (or wired communication) may be provided to the subunit 76. Moreover, communication sections may be provided to both the core unit 70 and the subunit 76. For example, communication sections provided in both the core unit 70 and the subunit 76 may each wirelessly transmit transmission data to the game apparatus 12; or after the communication section 75 of the core unit 70 receives a transmission data from the communication section of the subunit 76 as a wireless transmission for the core unit 70, the communication section 75 of the core unit 70 may wirelessly transmit, the transmission data of the subunit 76 together with the transmission data of the core unit 70, to the game apparatus 12. In this case, there is no need for a connection cable 79 that electrically connect the core unit 70 and the subunit 76.

<General Outline of a Game Process>

A general outline of a game process executed by the game apparatus 12 will be described below.

Figure 11:
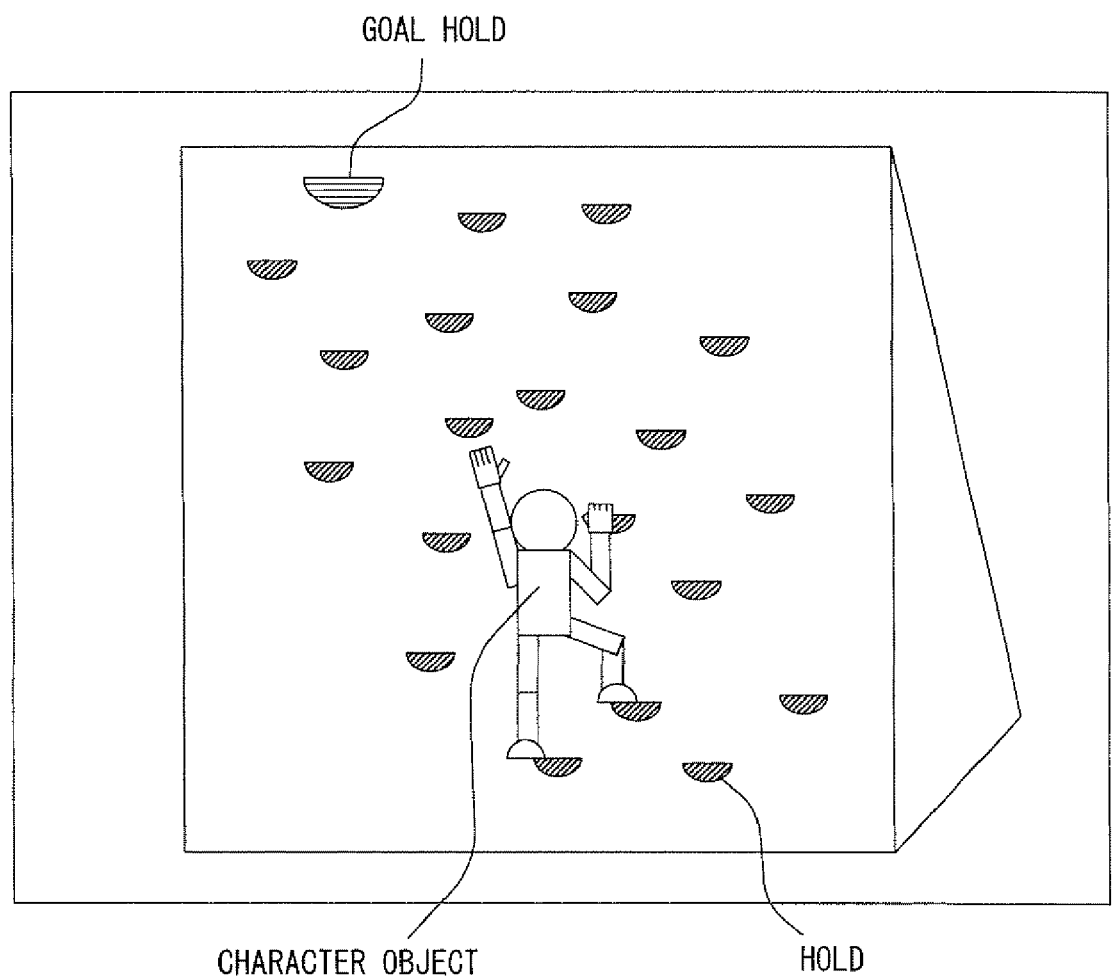
FIG. 11 is one example of a game image displayed on a monitor 34.

FIG. 11 shows one example of a game image generated by the game apparatus 12, and displayed on the screen of the monitor 34. The case described in this embodiment is about an executed game in which, a character conducts rock climbing in a game space in response to an operation by the player. A character object capable of being operated by the player is displayed on the game screen. The objective of this game is to lead the character object to a "goal hold" by using a plurality of protrusions called "holds" that are provided on a cliff. The character object can grab a hold by hand, or place a foot on a hold, based on a player's operation. The player can control motions of the hands and the feet of the character object by using the controller 7 and the load controller 36.

An operation method for each sections of the character object will be described below with reference to FIG. 12 to FIG. 18.

(Rotation of the Right Arm)

Figure 12:
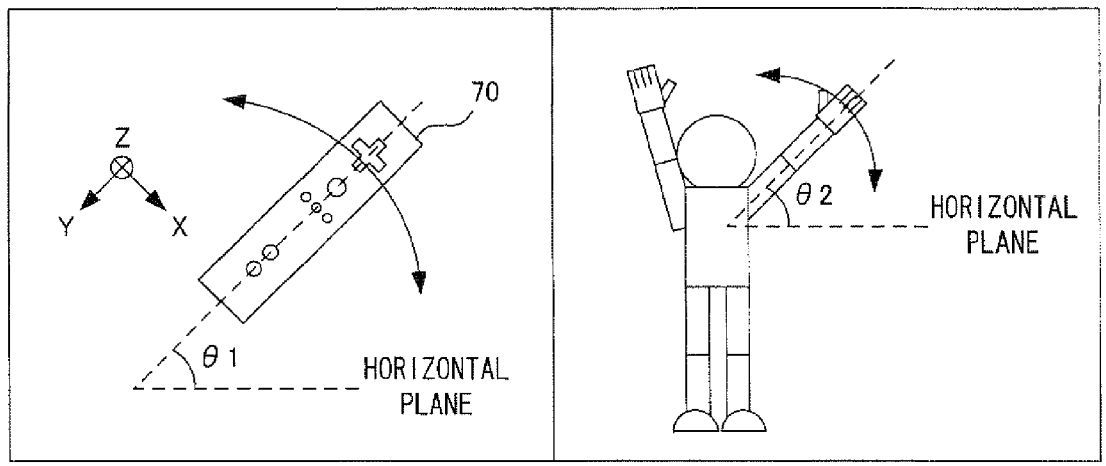
FIG. 12 shows a character object operation method using the core unit 70.

The player is instructed basically to hold the core unit 70 in the right hand such that the longitudinal direction of the core unit 70 is aligned with the vertical direction, and the rear surface (refer FIG. 3) of the core unit 70 faces toward the monitor 34 (i.e. the rear surface of the core unit 70 faces the player's forward direction). Then, by changing the direction of the core unit 70 (in this embodiment, tilt right or left), the player can change the direction of the character object's right hand. For example, as shown in FIG. 12, by changing an angle about the Z-axis of the core unit 70 (e.g. angle $\theta 1$ about the Z-axis between the horizontal plane and a longitudinal direction of the core unit 70), an angle of the character object's right hand (e.g. an angle $\theta 2$ between the horizontal plane in the game space and the direction of the character object's right arm (direction from the right shoulder toward the right hand fingertip)) can be changed. With this, the direction of the character object's right hand changes in coordination with the motion of the player's right hand that holds the core unit 70. As a footnote, $\theta 1$ and $\theta 2$ do not necessary have to be identical, as long as $\theta 2$ is determined uniquely by $\theta 1$.

(Extending and Retracting the Right Arm)

Figure 13:
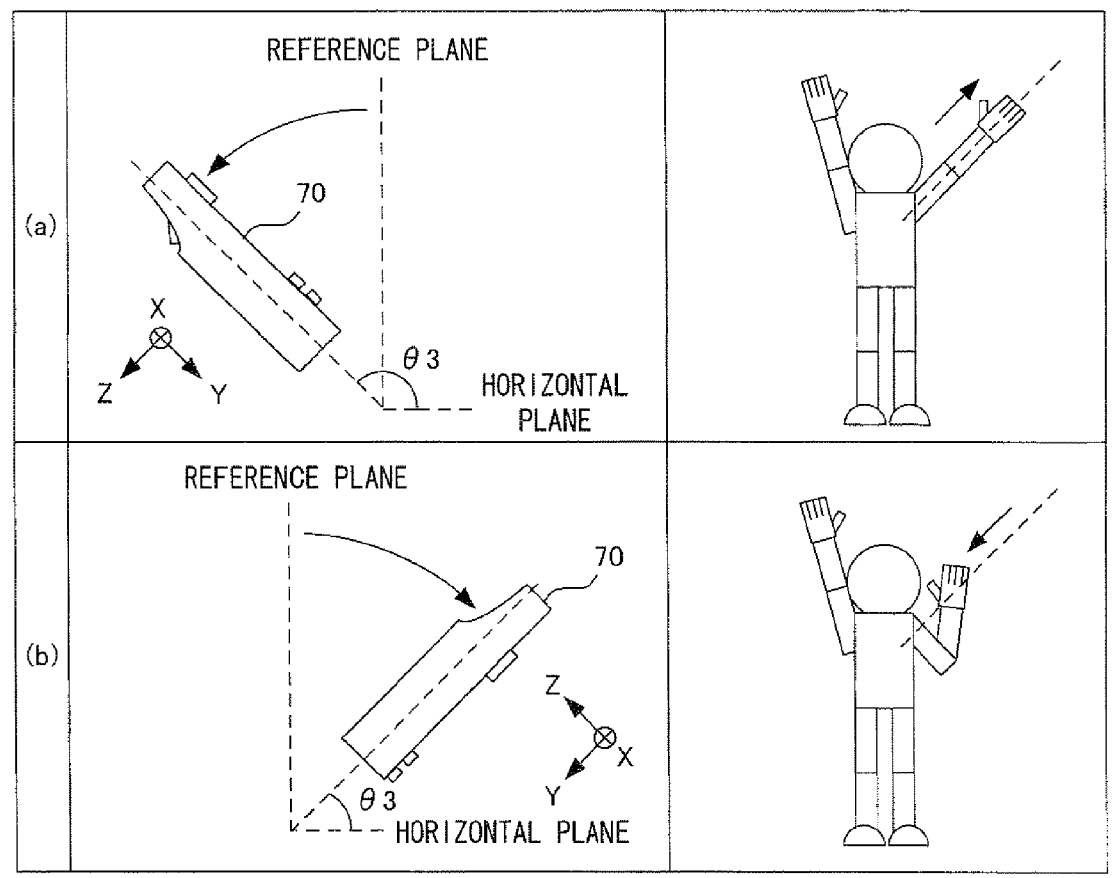
FIG. 13 shows a character object operation method using the core unit 70.

The player can extend and retract the character object's right arm by changing the direction of the core unit 70 (in this embodiment, tilt forward or backward). For example, as shown in FIG. 13, by changing an angle about the X-axis of the core unit 70 (e.g. an angle $\theta 3$ about the X-axis between the horizontal plane and a longitudinal direction of the core unit 70), the character object's right arm can be extended and retracted. Specifically, the character object's right arm is extended when the angle $\theta 3$ of the core unit 70 about the X-axis is larger than a predetermined threshold (e.g. an angle between the horizontal plane and a reference plane (e.g. vertical plane that faces the player)) as shown in (a) of FIG. 13; and the character object's right arm is retracted when the angle $\theta 3$ of the core unit 70 about the X-axis is smaller than a predetermined threshold as shown in (b) of FIG. 13. With this, the character object's right arm is extended and retracted in coordination with the motion of the player's right hand holding the core unit 70. As a footnote, here, the degree of retraction of the character object's right arm is changed between two levels depending on whether $\theta 3$ is larger or smaller than the predetermined threshold. However, it is not limited to this form, and the degree of retraction of the character object's right arm may be changed in multiple levels or continuously depending on $\theta 3$.

(Opening and Closing the Right Palm)

The player can open and close the character object's right palm by operating the operation sections 72 provided to the core unit 70. For example, as shown in (a) of FIG. 14, the character object's right palm opens when the B button provided to the core unit 70 is not pressed; and as shown in (b) of FIG. 14, the character object's right palm closes when the B button provided to the core unit 70 is pressed. With this, the player can cause the character object to grab a hold or release the hold, with its right hand.

(Rotation of the Left Arm)

Figure 15:
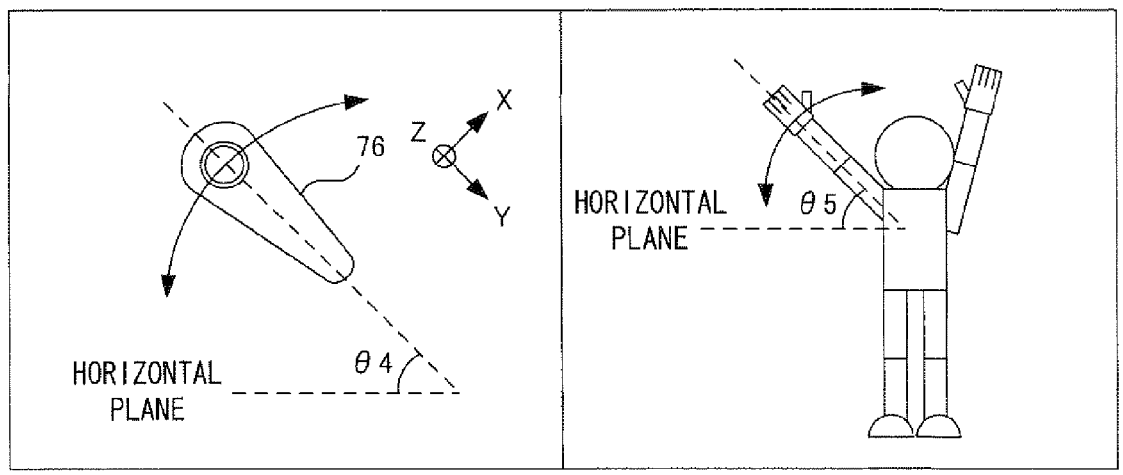
FIG. 15 shows a character object operation method using a subunit 76.

The player is instructed basically to hold the subunit 76 in the left hand such that the longitudinal direction of the subunit 76 is aligned with the vertical direction, and the rear surface (refer FIG. 3) of the subunit 76 faces toward the monitor 34 (i.e. the rear surface of the subunit 76 faces the player's forward direction). Then, by changing the direction of the subunit 76 (in this embodiment, tilt right or left), the player can change the direction of the character object's left arm. For example, as shown in FIG. 15, by changing an angle about the Z-axis of the subunit 76 (e.g. angle θ4 about the Z-axis between the horizontal plane and a longitudinal direction of the subunit 76), an angle of the character object's left arm (e.g. an angle θ5 between the horizontal plane in the game space and the direction of the character object's left arm (direction from the left shoulder toward the left hand fingertip)) can be changed. With this, the direction of the character object's left arm changes in coordination with the motion of the player's left hand that holds the subunit 76. As a footnote, θ4 and θ5 do not necessary have to be identical, as long as θ5 is determined uniquely by θ4.

(Retracting and Extending the Left Arm)

Figure 16:
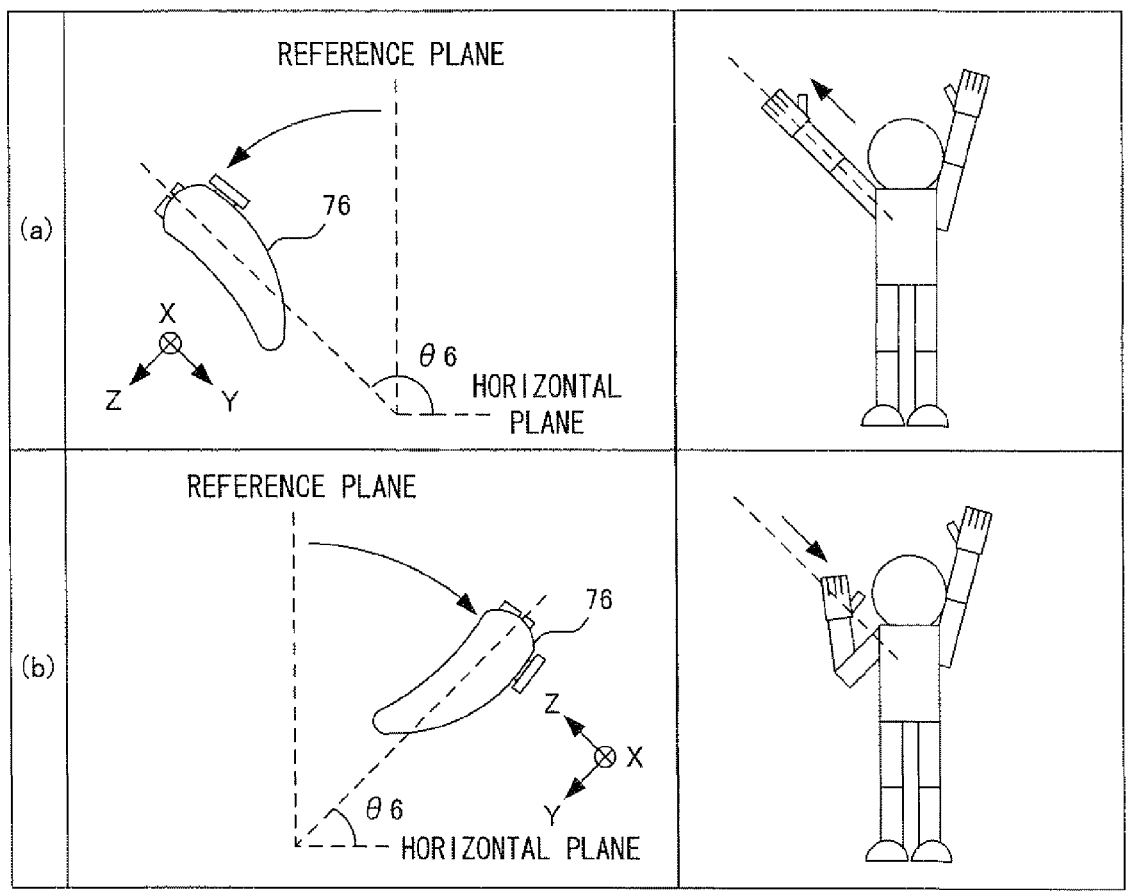
FIG. 16 shows a character object operation method using the subunit 76.

The player can extend and retract the character object's left arm by changing the direction of the subunit 76 (in this embodiment, tilt forward or backward). For example, as shown in FIG. 16, by changing an angle about the X-axis of the subunit 76 (e.g. an angle θ6 about the X-axis between the horizontal plane and a longitudinal direction of the subunit 76), the character object's left arm can be extended and retracted. Specifically, the character object's left arm is extended when the angle θ6 of the subunit 76 about the X-axis is larger than a predetermined threshold (e.g. an angle between the horizontal plane and a reference plane (e.g. vertical plane that faces the player)) as shown in (a) of FIG. 16; and the character object's left arm is retracted when the angle θ6 of the subunit 76 about the X-axis is smaller than a predetermined threshold as shown in (b) of FIG. 16. With this, the character object's left arm is extended and retracted in coordination with the motion of the player's left hand holding the subunit 76. As a footnote, here, the degree of retraction of the character object's left arm is changed between two levels depending on whether θ6 is larger or smaller than the predetermined threshold. However, it is not limited to this form, and the degree of retraction of the character object's left arm may be changed in multiple levels or continuously depending on θ6.

(Opening and Closing the Left Palm)

The player can open and close the character object's left palm by operating the operation sections 78 provided to the subunit 76. For example, as shown in (a) of FIG. 17, the character object's left palm opens when the Z button provided to the subunit 76 is not pressed; and as shown in (b) of FIG. 17, the character object's left palm is closed when the Z button provided to the subunit 76 is pressed. With this, the player can cause the character object to grab a hold with its left hand, or release the hold.

Figure 18:
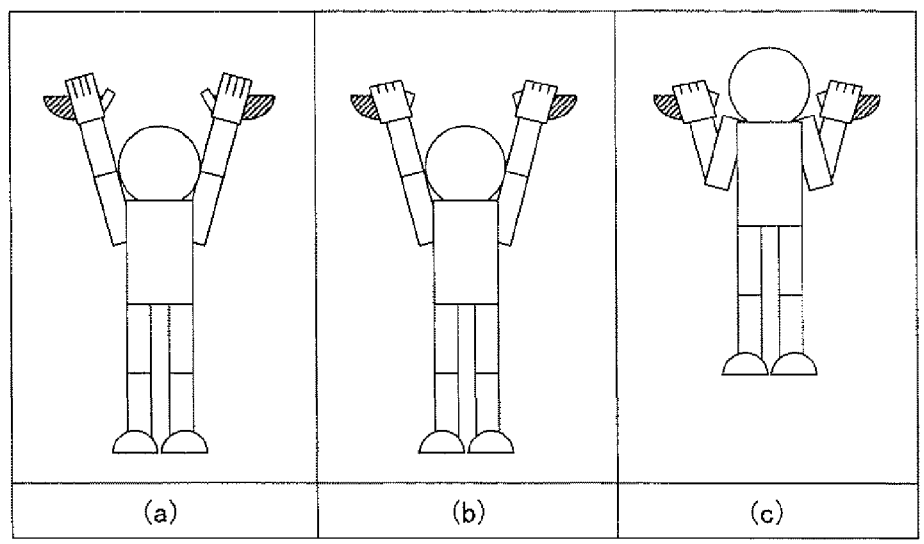
FIG. 18 shows a motion of a character object.

By combining the above-described operations, the player can cause the character object to grab a desired hold, and cause the character object to move upward. For example, as shown in FIG. 18, the player can cause the character object to: extend the right and the left arms of the character object while having the right and the left palms of the character object open, and move the right and the left hands of the character object each toward desired holds ((a) of FIG. 18); grab the holds by closing the right and the left palms of the character object ((b) of FIG. 18); and retract the right and the left arms of the character object while having the right and the left palms of the character object closed, and pull up the character object's body ((c) of FIG. 18).

(Pulling Up and Putting Down a Foot)

The player can place the character object's right foot on a hold and remove the character object's right foot from the hold, by placing his/her right foot on the load controller 36 or removing his/her right foot from the load controller 36. Similarly, the player can place the character object's left foot on a hold or remove the character object's left foot from the hold, by placing his/her left foot on the load controller 36 or removing his/her left foot from the load controller 36. For example, as shown in (a) of FIG. 19, the player can place the character object's both feet on holds by standing on the load controller 36 with both feet. Furthermore, as shown in (b) of FIG. 19, the player can place the character object's right foot on a hold and keep the character object's left foot in midair by standing on the load controller 36 with just the right foot. Additionally, as shown in (c) of FIG. 19, the player can place the character object's left foot on a hold and keep the character object's right foot in midair by standing on the load controller 36 with just the left foot. Furthermore, as shown in (d) of FIG. 19, the player can keep the character object's both feet in midair by removing both feet from the load controller 36 (i.e. a state in which the player has stepped off the load controller 36). In the state in which the character object's both feet are in midair, the character object has to be grabbing a hold with at least one hand. Otherwise, the character object falls and it will be game over.

For example, if the player places his/her right foot on the load controller 36 when the character object's right foot is in midair, the character object places the character object's right foot on a hold that is near the right foot at that point in time.

(Extending and Retracting a Leg)

The player can retract and extend the character object's leg (right leg, left leg, or both legs) which is on a hold, by moving his/her center of gravity in the front-back direction when standing on the load controller 36. For example, as shown in (a) of FIG. 20, when the player is standing on the load controller 36 with both feet, the further the player moves his/her center of gravity forward, the more the character object extends both legs; and as shown in (c) of FIG. 20, when the player is standing on the load controller 36 with both feet, the further the player moves his/her center of gravity backward, the more the character object retracts both legs. Furthermore, for example, as shown in (a) of FIG. 21, when the player is standing on the load controller 36 with only the right foot, the further the player moves his/her center of gravity forward, the more the character object extends the right leg; and as shown in (c) of FIG. 21, when the player is standing on the load controller 36 with just the right foot, the further the player moves his/her center of gravity backward, the more the character object retracts the right leg. With this, the player can move the character object's hand, and the character object's foot which is kept in midair, to a desired height level.

As described above, the player can lead the character object to the goal hold, by using, the controller 7 and the load controller 36, and by properly controlling the hands and feet of the character object.

(Process Details of the Game Apparatus)

Details about processes of the game apparatus 12 for achieving the above-described game will be described next.

Figure 22:
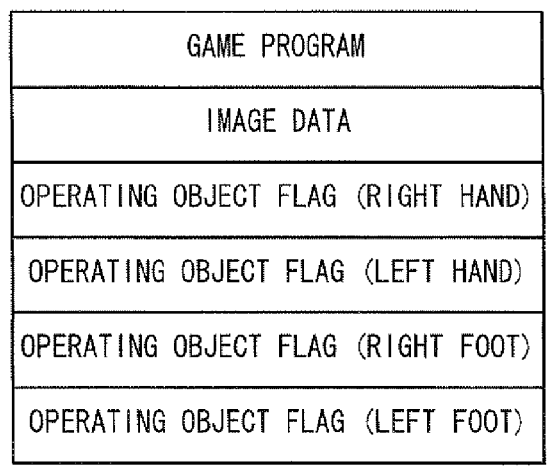
FIG. 22 shows a memory map of an external main memory 46.

FIG. 22 shows a memory map of the external main memory 46. In this embodiment, an example, in which the CPU 40 executes a game process by using the external main memory 46, is described. However, it is not limited to this manner, and the CPU 40 may execute the game process by using the internal main memory 42e. A game program and an image data, stored on the optical disc 18 are loaded on the external main memory 46. The game program and the image data may be provided to the game apparatus 12, not just from the optical disc 18, but also from other arbitrary computer readable storage medium, or a network of wired or wireless communication. The external main memory 46 is also used as a storage area for four operating object flags (operating object flags for the right hand, the left hand, the right foot, and the left foot) used when the game program is executed.

(Main Process)

The processes of the CPU 40 executed based on the above-described game program will be described below with reference to the flowcharts in FIG. 23 to FIG. 26.

Figure 23:
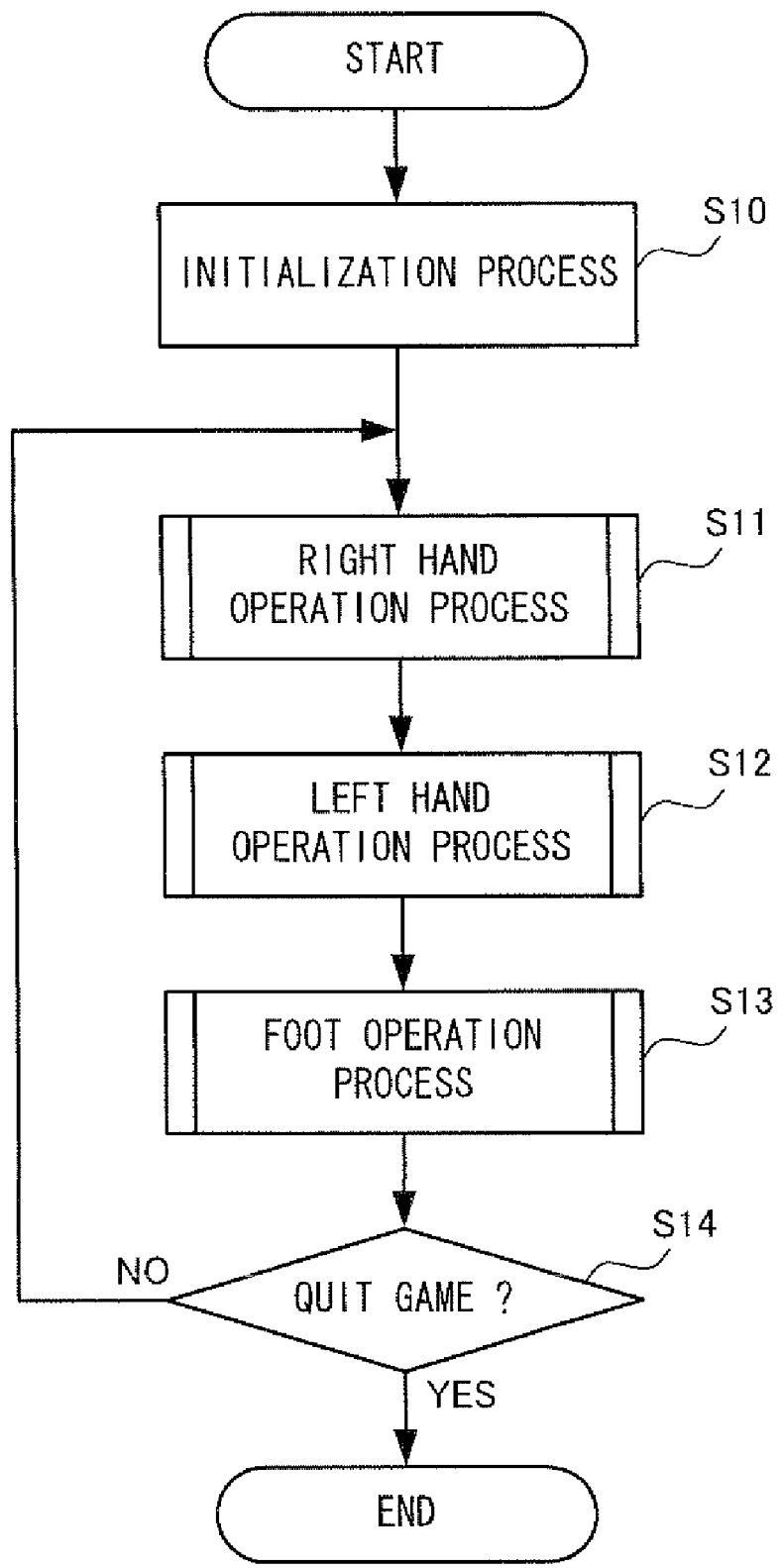
FIG. 23 shows a flowchart of the whole flow of a game process.

As shown in FIG. 23, when the execution of the game program is initiated, the CPU 40 executes an initialization process at step S10. At the initialization process, securement (resetting) of the storage area for the above described operating object flags in the external main memory 46 is conducted.

At step S11, the CPU 40 executes a right hand operation process. The right hand operation process is a process that controls the motion of the character object's right hand. Details of the right hand operation process will be described later.

At step S12, the CPU 40 executes a left hand operation process. The left hand operation process is a process that controls the motion of the character object's left hand. Details of the left hand operation process will be described later.

At step S13, the CPU 40 executes a foot operation process. The foot operation process is a process that controls the motion of the character object's foot. Details of the foot operation process will be described below.

At step S14, the CPU 40 judges whether to quit the game or not. The process goes back to step S11 when continuing the game, and the CPU 40 ceases the execution of the game program when quitting the game. The CPU 40 quits the game, for example, when the character object has grabbed the goal hold, or when the character object has fallen.

Only a process for determining the positions of the character object's hand and foot is shown in FIG. 23, but in reality, a process for moving the character object's torso in response to the character object's hand and foot motion; a process for generating, a game image that includes the character object, the holds, the goal hold, a background, and the like, and for outputting the game image to the monitor 34; and the like are also conducted.

(Right Hand Operation Process)

Figure 24:
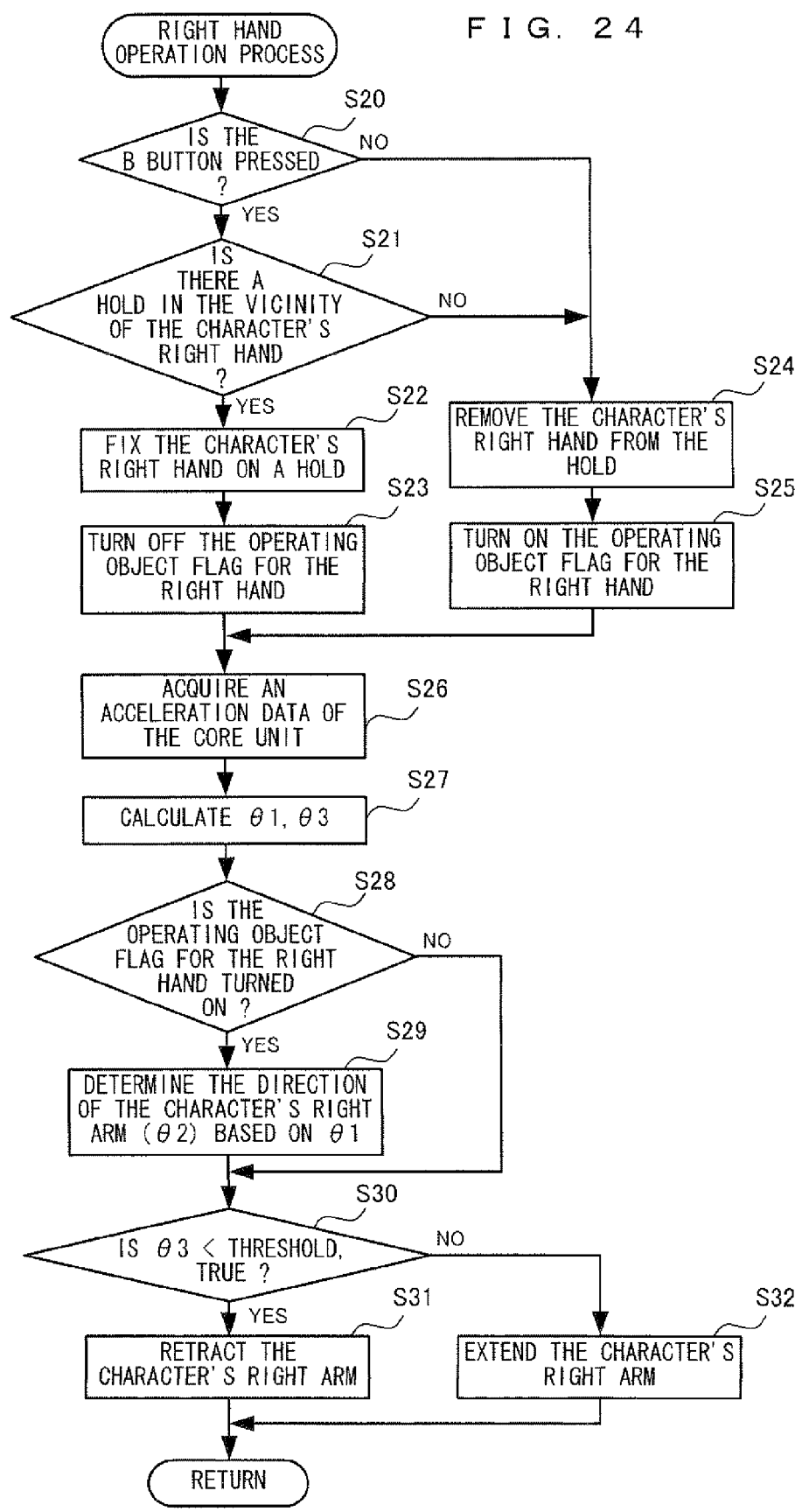
FIG. 24 shows a flowchart of a right hand operation process.

Details of the right hand operation process at step S11 in FIG. 23 will be described below with reference to the flowchart in FIG. 24.

When the right hand operation process is initiated, the CPU 40 judges whether the B button (FIG. 14) provided to the core unit 70 is pressed or not at step S20. The process proceeds to step S21 if the B button is pressed, and if not, the process proceeds to step S24.

At step S21, the CPU 40 judges whether a hold exists in the vicinity of the character object's right hand. The process proceeds to step S22 if there is a hold in the vicinity of the character object's right hand, and if not, the process proceeds to step S24.

Figure 14:
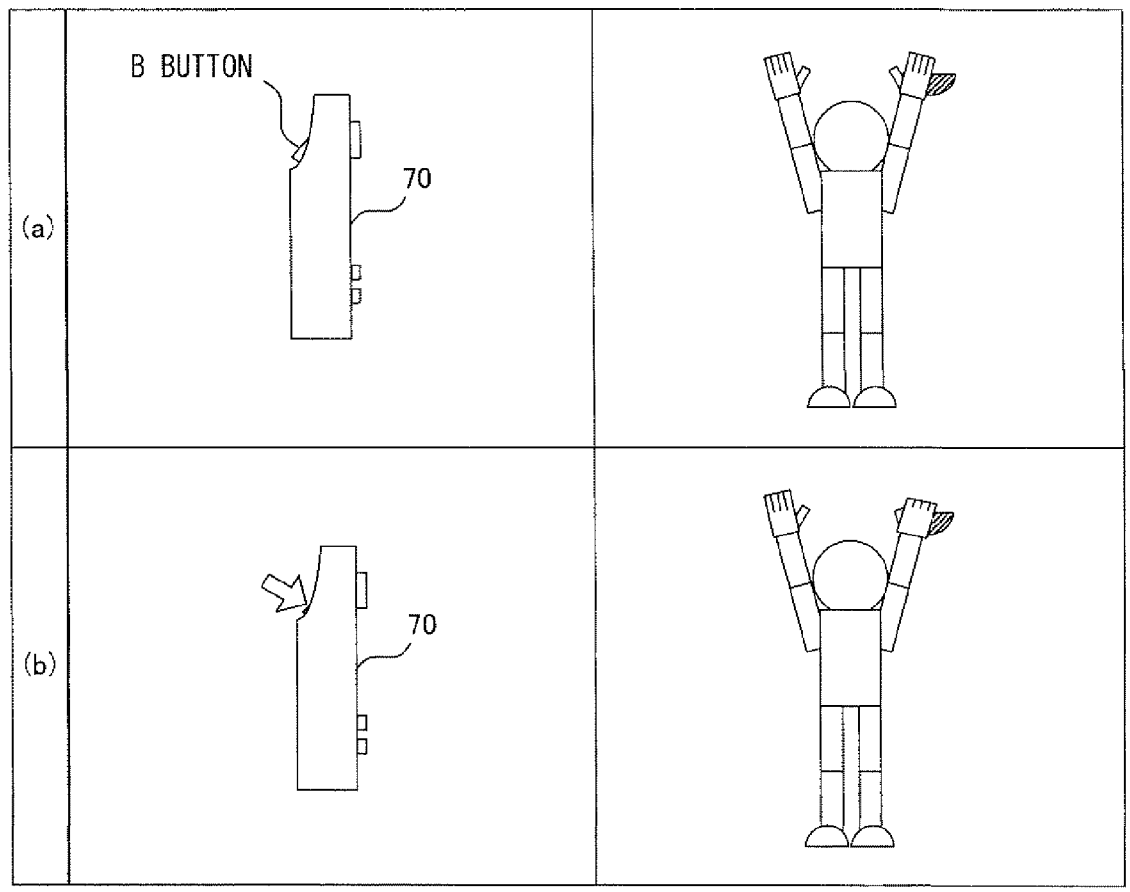
FIG. 14 shows a character object operation method using the core unit 70.

At step S22, the CPU 40 fixes the character object's right hand to the hold that is in the vicinity of the right hand ((b) of FIG. 14). Then, the process proceeds to step S23.

At step S23, the CPU 40 turns off the operating object flag for the right hand. Then, the process proceeds to step S26.

At step S24, the CPU 40 removes the character object's right hand from a hold ((a) of FIG. 14). Then, the process proceeds to step S25.

At step S25, the CPU 40 turns on the operating object flag for the right hand. Then, the process proceeds to step S26.

At step S26, the CPU 40 acquires acceleration data (each acceleration of the X-axis direction, the Y-axis direction, and the Z-axis direction, detected by the acceleration sensor 701) of the core unit 70. Then, the process proceeds to step S27.

At step S27, the CPU 40 calculates θ1 in FIGS. 12, and θ3 in FIG. 13, based on the acceleration data of the core unit 70 acquired at step S26. Then, the process proceeds to step S28. θ1 can be calculated from the accelerations in the X-axis direction and the in Y-axis direction, detected by the acceleration sensor 701. θ3 can be calculated from the accelerations in the Y-axis direction and in the Z-axis direction, detected by the acceleration sensor 701.

At step S28, the CPU 40 judges whether the operating object flag for the right hand is turned on or not. If it is turned on (i.e. when the character object's right hand is not grabbing any holds), the process proceeds to step S29, and if not (i.e. when the character object's right hand is grabbing any one of the holds), the process proceeds to step S30.

At step S29, the CPU 40 determines the direction of the character object's right arm (θ2 in FIG. 12), based on θ1 calculated at step S27. Then, the process proceeds to step S30.

At step S30, the CPU 40 judges whether θ3 calculated at step S27 is smaller than the predetermined threshold. The process proceeds to step S31 if θ3 is smaller than the predetermined threshold ((b) of FIG. 13), and if not ((a) of FIG. 13), the process proceeds to step S32.

At step S31, the CPU 40 retracts the character object's right arm ((b) of FIG. 13). Then, the right hand operation process is ended.

At step S32, the CPU 40 extends the character object's right arm ((a) of FIG. 13). Then, the right hand operation process is ended.

(Left Hand Operation Process)

Figure 25:
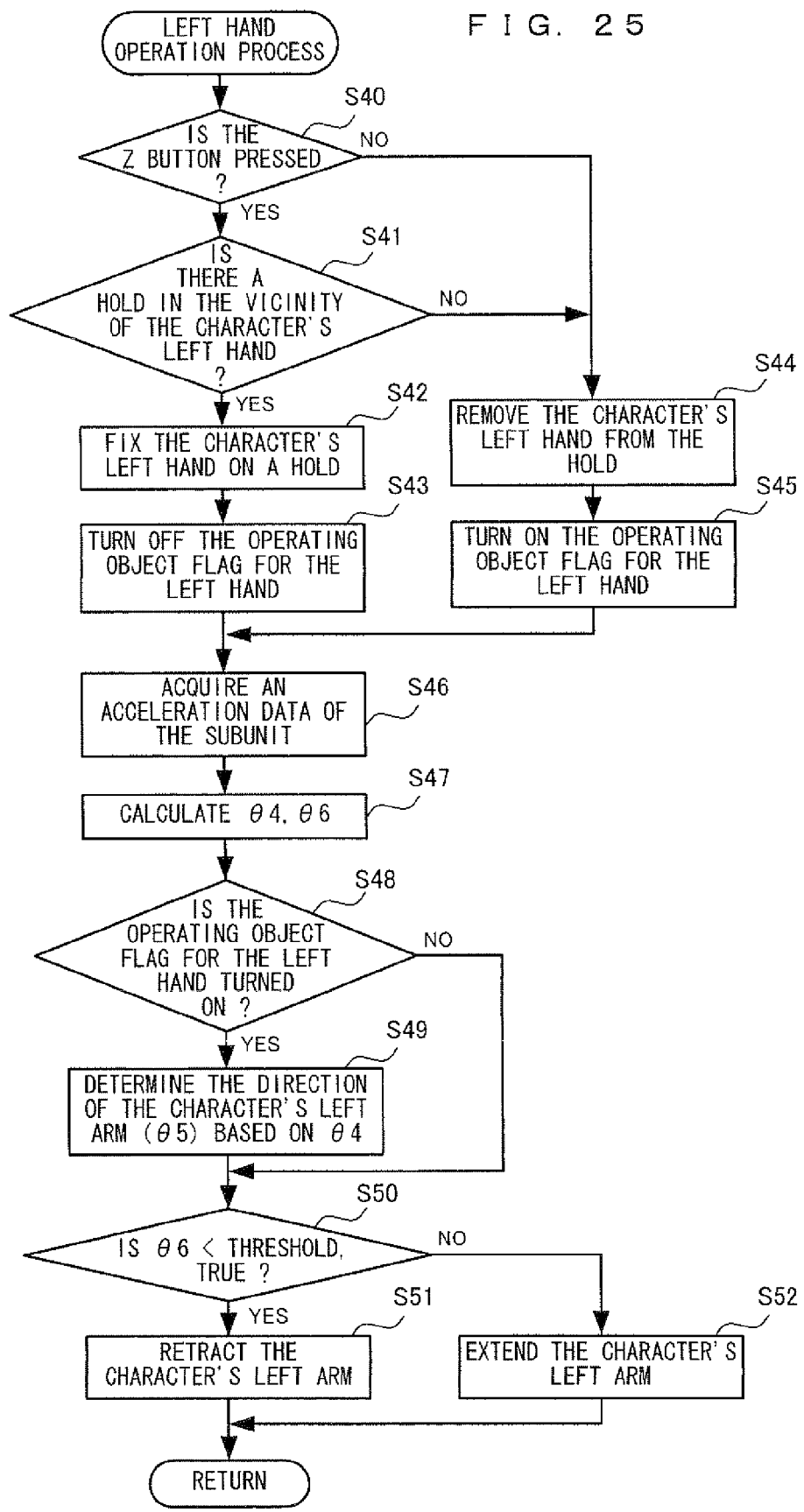
FIG. 25 shows a flowchart of a left hand operation process.

Details of the left hand operation process at step S12 in FIG. 23 will be described below with reference to the flowchart in FIG. 25.

When the left hand operation process is initiated, the CPU 40 judges whether the Z button (FIG. 17) provided to the subunit 76 is pressed or not at step S40. The process proceeds to step S41 if the Z button is pressed, and if not, the process proceeds to step S44.

At step S41, the CPU 40 judges whether a hold exists in the vicinity of the character object's left hand. The process proceeds to step S42 if there is a hold in the vicinity of the character object's left hand, and if not, the process proceeds to step S44.

Figure 17:
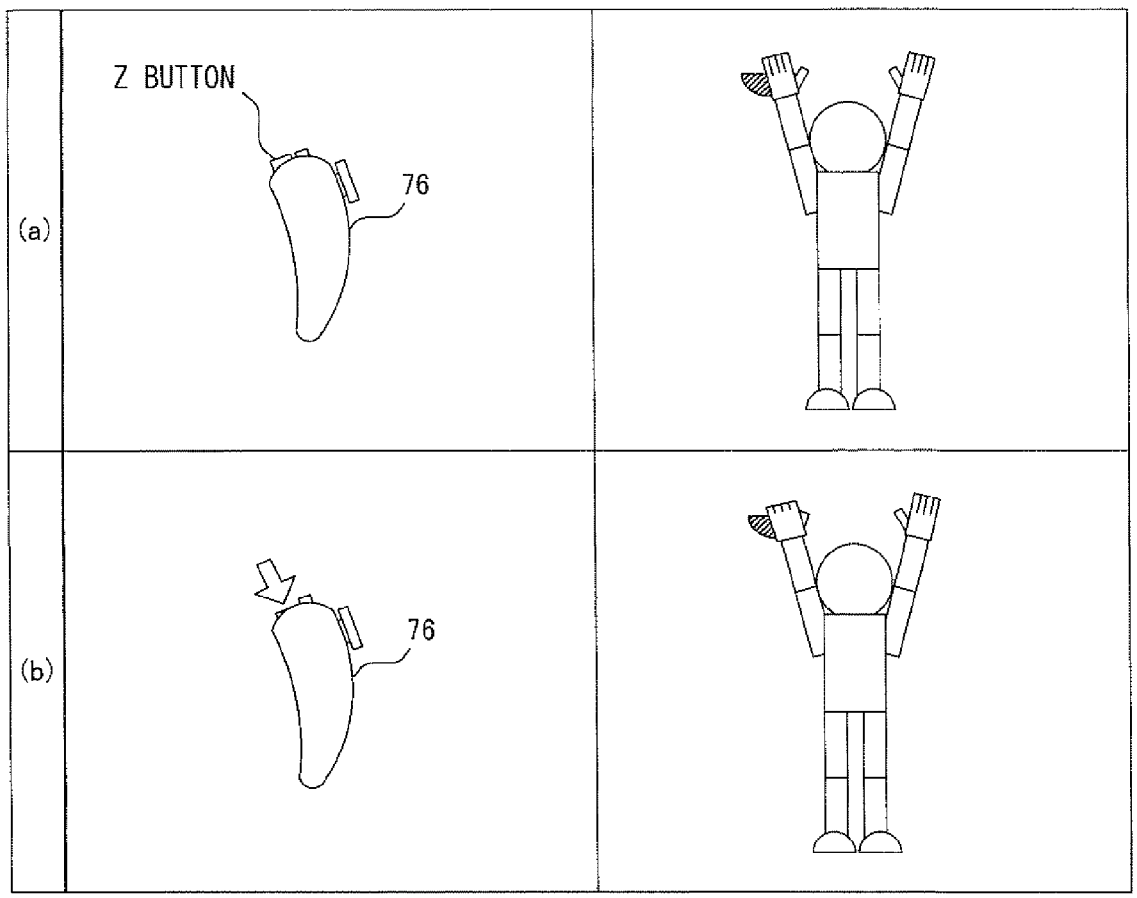
FIG. 17 shows a character object operation method using the subunit 76.

At step S42, the CPU 40 fixes the character object's left hand to the hold that is in the vicinity of the character object's left hand ((b) of FIG. 17). Then, the process proceeds to step S43.

At step S43, the CPU 40 turns off the operating object flag for the left hand. Then, the process proceeds to step S46.

At step S44, the CPU 40 removes the character object's left hand from a hold ((a) of FIG. 17). Then, the process proceeds to step S45.

At step S45, the CPU 40 turns on the operating object flag for the left hand. Then, the process proceeds to step S46.

At step S46, the CPU 40 acquires acceleration data (each acceleration of the X-axis direction, the Y-axis direction, and the Z-axis direction, detected by the acceleration sensor 761) of the subunit 76. Then, the process proceeds to step S47.

At step S47, the CPU 40 calculates θ4 in FIGS. 15, and θ6 in FIG. 16, based on the acceleration data of the subunit 76 acquired at step S46. Then, the process proceeds to step S48. θ4 can be calculated from the accelerations in the X-axis direction and in the Y-axis direction, detected by the acceleration sensor 761. θ6 can be calculated from the accelerations in the Y-axis direction and in the Z-axis direction, detected by the acceleration sensor 761.

At step S48, the CPU 40 judges whether the operating object flag for the left hand is turned on or not. If it is turned on, (i.e. when the character object's left hand is not grabbing any holds), the process proceeds to step S49, and if not, (i.e. when the character object's left hand is grabbing any one of the holds), the process proceeds to step S50.

At step S49, the CPU 40 determines the direction of the character object's left arm (θ5 in FIG. 15), based on θ4 calculated at step S47. Then, the process proceeds to step S50.

At step S50, the CPU 40 judges whether θ6 calculated at step S47 is smaller than the predetermined threshold. The process proceeds to step S51 if θ6 is smaller than the predetermined threshold ((b) of FIG. 16), and if not ((a) of FIG. 16), the process proceeds to step S52.

At step S51, the CPU 40 retracts the character object's left arm ((b) of FIG. 16). Then, the left hand operation process is ended.

At step S52, the CPU 40 extends the character object's left arm ((a) of FIG. 16). Then, the left hand operation process is ended.

(Foot Operation Process)

Figure 26:
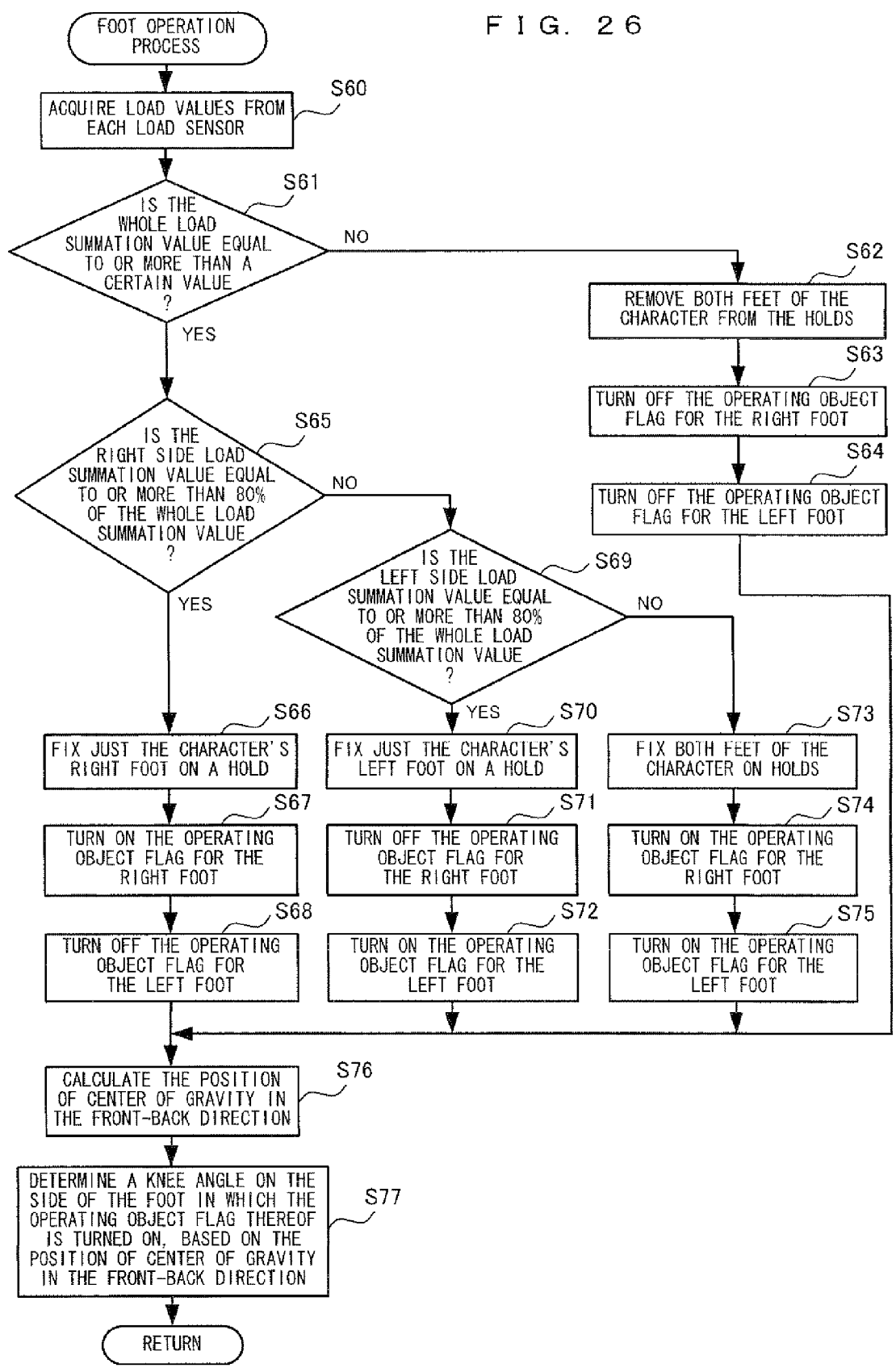
FIG. 26 shows a flowchart of a foot operation process.

Details of the foot operation process at step S13 in FIG. 23 will be described below with reference to the flowchart in FIG. 26.

When the foot operation process is initiated, the CPU 40 acquires, at step S60, load values detected by each of the four load sensors 36b provided to the load controller 36. Then, the process proceeds to step S61.

At step S61, the CPU 40 calculates a "whole load summation value" by adding the load values of the four load sensor 36b acquired at step S60; and judges whether the whole load summation value is equal to or more than a certain value (e.g. 7 kg). Then, the process proceeds to step S65 if the whole load summation value is equal to or more than a certain value, and if not (i.e. when it is assumed that the player has both of his/her feet off the load controller 36), the process proceeds to step S62.

At step S62, the CPU 40 removes the character object's both feet from the holds. Then, the process proceeds to step S63.

At step S63 the CPU 40 turns off the operating object flag for the right foot. Then, the process proceeds to step S64.

At step S64, the CPU 40 turns off the operating object flag for the left foot. Then, the process proceeds to step S76.

At step S65, the CPU 40, calculates a "right side load summation value" by adding the load values of the two load sensors 36b positioned on the right side of the player among the load values of the four load sensor 36b acquired at step S60, and judges whether the right side load summation value is equal to or more than 80% of the whole load summation value (however, "80%" is merely one example). Then, the process proceeds to step S66 if the right side load summation value is equal to or more than 80% of the whole load summation value (i.e. a case in which it is assumed that the player is standing on the load controller 36 with just the right foot), and if not, the process proceeds to step S69.

At step S66, the CPU 40 fixes only the character object's right foot on the hold, and removes the character object's left foot from the hold. Then, the process proceeds to step S67.

At step S67, the CPU 40 turns on the operating object flag for the right foot. Then, the process proceeds to step S68.

At step S68, the CPU 40 turns off the operating object flag for the left foot. Then, the process proceeds to step S76.

At step S69, the CPU 40, calculates a "left side load summation value" by adding the load value of the two load sensors 36b positioned on the left side of the player among the load values of the four load sensors 36b acquired at step S60, and judges whether the left side load summation value is equal to or more than 80% of the whole load summation value (however, "80%" is merely one example). Then, the process proceeds to step S70 if the left side load summation value is equal to or more than 80% of the whole load summation value (i.e. a case in which it is assumed that the player is standing on the load controller 36 with just the left foot), and if not (i.e. a case in which it is assumed that the player is standing on the load controller 36 with both feet), the process proceeds to step S73.

At step S70, the CPU 40 fixes only the character object's left foot on the hold, and removes the character object's right foot from the hold. Then, the process step proceeds to S71.

At step S71, the CPU 40 turns off the operating object flag for the right foot. Then, the process proceeds to step S72.

At step S72, the CPU 40 turns on the operating object flag for the left foot. Then, the process proceeds to the step S76.

At step S73, the CPU 40 fixes character object's both feet on the holds. Then, the process proceeds to step S74.

At step S74, the CPU 40 turns on the operating object flag for the right foot. Then, the process proceeds to step S75.

At step S75, the CPU 40 turns on the operating object flag for the left foot. Then, the process proceeds to step S76.

At step S76, the CPU 40 calculates the player's position of center of gravity on the load controller 36 in the front-back direction. For example, the CPU 40, calculates a "front load summation value" by adding the load values of the two load sensors 36b positioned in front of the player among the load values of the four load sensors 36b acquired at step S60, and utilizes a ratio of the front load summation value to the whole load summation value as the position of center of gravity of the player on the load controller 36 in the front-back direction. Then, the process proceeds to step S77.

Figure 21:
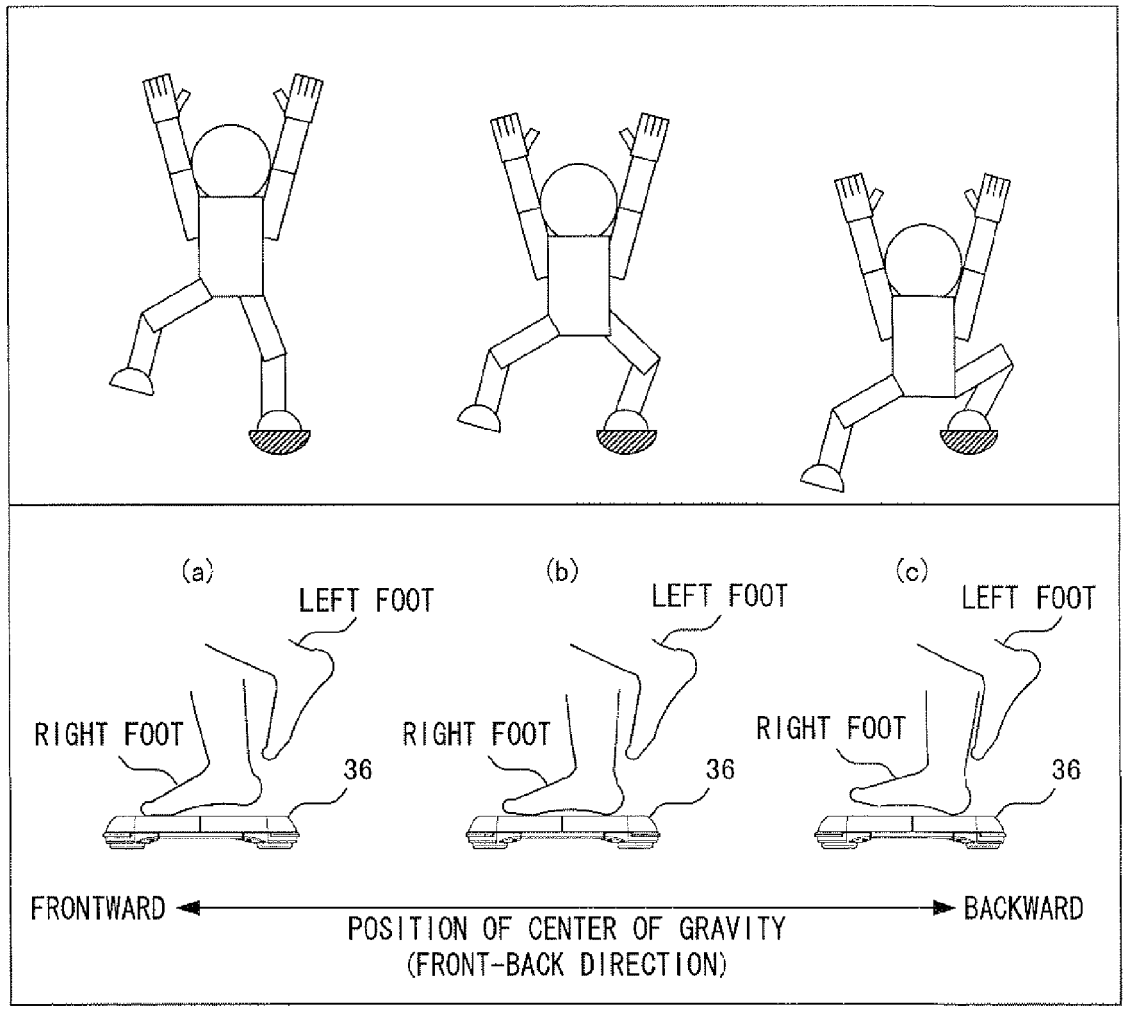
FIG. 21 shows a character object operation method using the load controller 36.

At step S77, the CPU 40 determines a character object's knee angle on the side of the foot where the operating object flag thereof is turned on, based on the position of center of gravity (the position of center of gravity of the player on the load controller 36 in the front-back direction) calculated at step S76 (FIG. 20, FIG. 21). Then, the foot operation process is ended.

As described above, according to this embodiment, the player can control the hands and feet of the character object intuitively and variedly, by operating the controller 7 and the load controller 36.

In this embodiment, the character object's right hand is controlled in response to the inclination about the Z-axis (FIG. 12) and the inclination about the X-axis (FIG. 13), of the core unit 70. However, and other ways of control may be used as long as the character object's right hand is controlled in response to the attitude of the core unit 70.

Furthermore, in this embodiment, the character object's left hand is controlled in response to the inclination about the Z-axis (FIG. 15), and the inclination about the X-axis (FIG. 16), of the subunit 76. However, and other ways of control may be used as long as the character object's left hand is controlled in response to the attitude of the subunit 76.

Still further, in this embodiment, among the four load sensors 36b, a load summation value on one side (sum of load values within one group, as described in claim 4) is calculated by adding the load values of two load sensors 36b; and the character object's foot is controlled by using the ratio of the load summation value on one side to the whole load summation value. However, the character object's foot may be controlled by using the ratio of a load value of one load sensor 36b (sum of load values within one group, as described in claim 4) to the whole load summation value. Moreover, instead of using a ratio of a sum of load values within one group, to the whole load summation value; the character object's foot may be controlled by using a ratio of two sums of load values from two groups, such as the ratio of the "right side load summation value" to the "left side load summation value".

Figure 19:
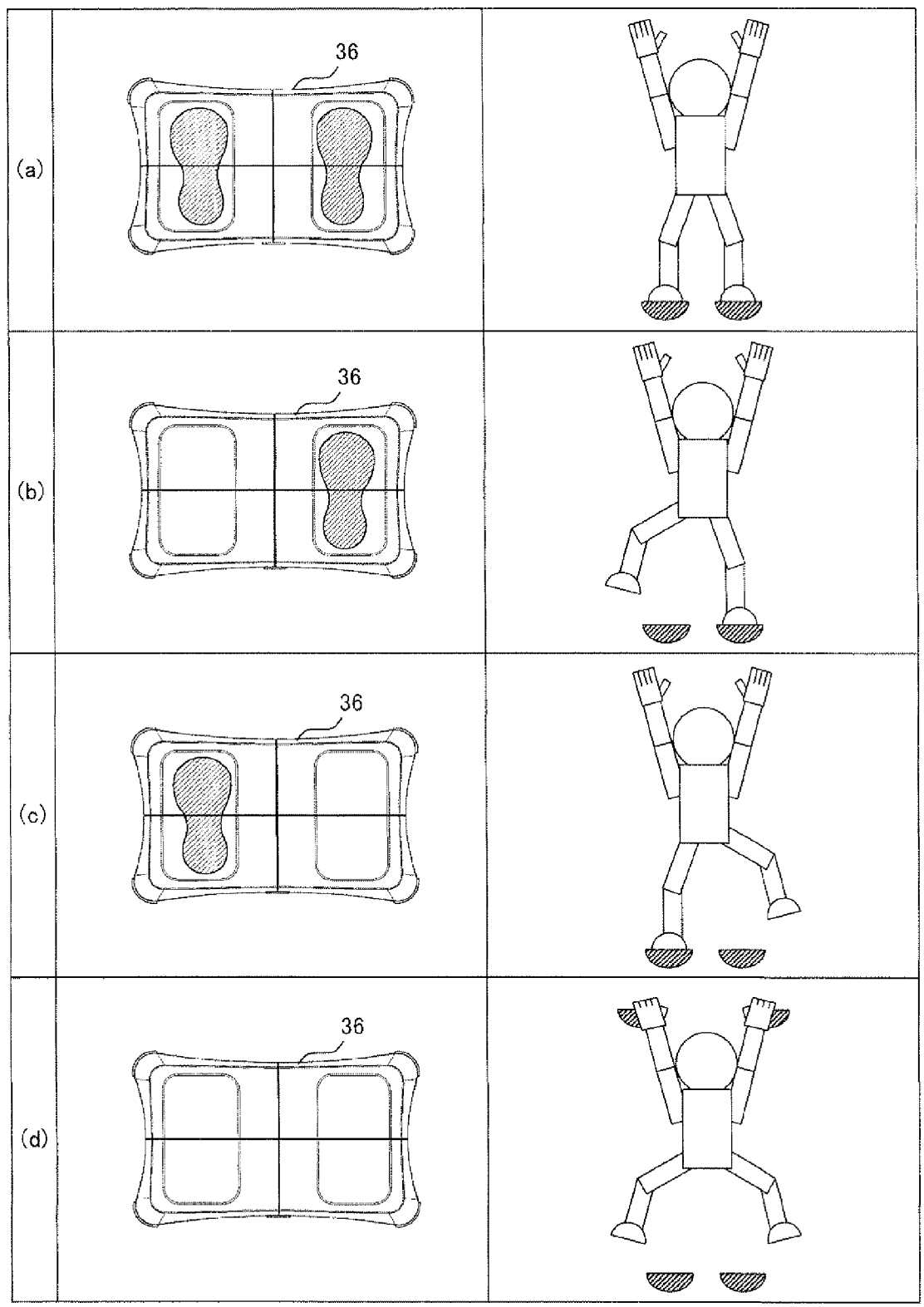
FIG. 19 shows a character object operation method using a load controller 36.

Furthermore, in this embodiment, the motion of the character object is changed in response to, the position of center of gravity in the right-left direction ((b) and (c) of FIG. 19), and the position of center of gravity in the front-back direction (FIG. 20, FIG. 21), of the player on the load controller 36. However, the current invention is not limited to such way of controlling, and the motion of the character object may be changed in response to the player's center of gravity position movement in a slanted direction, such as a diagonal direction of the load controller 36.

Moreover, in this embodiment, the load sensors 36b are provided to the four corners of the load controller 36. However, the current invention is not limited to this configuration, and the installation position of the load sensors 36b may be arbitrarily determined. For example, load sensors 36b may be provided in the vicinity of respective centers of the four sides of the load controller 36.

In this embodiment, four load sensors 36b are provided to the load controller 36. However, the current invention is not limited to this configuration, and two, three, five, or more load sensors 36b may be provided. The position of center of gravity can only be sensed one-dimensionally if only two load sensors 36b are provided. On the other hand, the position of center of gravity can be sensed two-dimensionally if three or more load sensors 36b are provided.

Moreover, in this embodiment, a character object that simulates a human is controlled in response to the user operation. However, the current invention is not limited to such form of a character object, and a character object may be a simulation of other creatures, or other objects (objects from the real world, or from a virtual world). In a case in which a character object that simulates an airplane is controlled in response to a user operation, for example, the right wing of the airplane may be controlled based on the attitude of the core unit 70, the left wing of the airplane may be controlled based on the attitude of the subunit 76, and the tail wing of the airplane may be controlled based on a load applied to the load controller 36.

Alternate Embodiment 1

Depending on the body position of the player, there may be a case in which an input operation intended by the player is not conducted. This case may happen in a game system that includes, as input apparatuses, at least one hand-held type controller that is held by the player, such as the core unit 70 or the subunit 76; and a stand board type controller in which a player holding the hand-held type controller stands on, such as the load controller 36; and when the executed game process detects the inclination direction of the hand-held type controller and the center of gravity of the player standing on the board type controller, and utilizes both detection results. For example, when assuming a situation in which the player holds the core unit 70 such that the longitudinal direction of the core unit 70 is vertical, as shown in (a) of FIG. 27, if the player is standing upright on the load controller 36 (i.e. if the position of center of gravity of the player in the front-back direction on the load controller 36, is almost in the central position of the load controller 36), the longitudinal direction of the core unit 70 becomes a direction intended by the player (i.e. such that the longitudinal direction of the core unit 70 becomes vertical). However, if the player is in a forward leaning attitude on the load controller 36 as shown in (b) of FIG. 27 (i.e. if the position of center of gravity of the player in the front-back direction on the load controller 36 has shifted forward, with regard to the player, when compared to the case in (a) of FIG. 27), even when the player himself/herself is feeling as if he/she is holding the core unit 70 such that the longitudinal direction of the core unit 70 is vertical, the actual longitudinal direction of the core unit 70 tends to shift away from the vertical direction. It is similar when the player standing on the load controller 36 is leaning backward, rightward, or leftward. As a result, the player may not be able to conduct the intended operation, and there is a possibility that the player may feel that the game system has an inferior operability. Therefore, in order to negate such possibilities, the detected inclination direction of the hand-held type controller may be compensated in response to the detected center of gravity of the player, and then utilized in the game process. For example, in the case in (b) of FIG. 27, the input intended by the player can be conducted by compensating the calculated attitude (inclination) of the core unit 70, which is an attitude obtained based on the detection result of the acceleration sensor 701 provided in the core unit 70, by an angle of θ7. The compensation amount can be determine by, for example, a look-up table that associates the center of gravity of the player standing on the board type controller, and the compensation amount. An input can be conducted as the player has intended, by compensating a detected inclination direction of the hand-held type controller in response to the degree of inclination of the player's inclination direction (this can be judged from the position of center of gravity).

Furthermore, in the above embodiment, the detected inclination direction of the hand-held type controller is compensated in the opposite direction of the player's inclination direction. For example, when the player's body is inclined in the forward direction of the player, the detected inclination direction of the hand-held type controller is compensated backward of the actual player's direction. However, in some cases the detected inclination direction of the hand-held type controller may be compensated in the same direction of the player's inclination direction (i.e. in cases in which such compensation allows conducting an input intended by the player better). For example, when the player inclines the core unit 70 in a direction that enlarges θ3 which is shown in FIG. 13 (i.e. when the player tilts the core unit 70 forward), the more the player tries to inclines the core unit 70 forward, the higher the chance that the player's whole body would unintentionally tip forward due to the player being obsessed in the operation of the game becomes. Therefore, in this case, it is preferable that θ3, which is the detected inclination direction of the core unit 70, is compensated to be a larger value than original, by understanding, a forward motion of the position of center of gravity of the player on the load controller 36 in the front-back direction, as an intention of the player desiring to incline forward the core unit further. With this, an input as intended by the player can be conducted.

Alternate Embodiment 2

In the above described alternate example 1, an example in which the detected inclination direction of the hand-held type controller is compensated in response to the center of gravity of the player standing on the board type controller. However, conversely, a case taken into consideration may be one in which the detected center of gravity of the player standing on the board type controller is compensated in response to the inclination direction of the hand-held type controller. For example, as described above, when the player inclines the core unit 70 in a direction that enlarges θ3 which is shown in FIG. 13 (i.e. when the player tilts the core unit 70 forward), the more the player tries to incline the core unit 70 forward, the chances that the player's whole body would unintentionally tip forward due to the player being obsessed in the operation of the game. As a result, the position of center of gravity of the player on the load controller 36 in the front-back direction shifts forward, and the character object's knee will extend without the user's intention. Therefore, in this case, it is preferable if the detected position of center of gravity is compensated further backward, presuming, based on θ3 the inclination direction of the core unit 70 becoming larger, that the player on the load controller 36 has unintentionally tipped forward. With this, an input as intended by the player can be conducted.

While the embodiments herein have been described in detail, the foregoing description is in all aspects illustrative and not restrictive. It is understood that numerous other modifications and variations can be devised without departing from the scope of the invention.

What is claimed is:

1. An information processing apparatus comprising:
    a display apparatus;
    a first input device;
    a second input device;
    a third input device;
    a load detector that includes at least three load sensors, the load detector configured to detect a load applied to the third input device;
    a processing system that includes at least one processor, the processing system configured to:
        output a character object to the display apparatus;
        calculate a first attitude of the first input device;
        calculate a second attitude of the second input device;
        cause the character object to conduct at least one first motion among a plurality of motions, in response to the calculated first attitude;
        cause the character object to conduct at least one second motion among a plurality of motions, in response to the calculated second attitude;
        select at least one group that includes at least one load sensor from among the at least three load sensors;
        calculate a sum of load values detected by the load sensors included within each of the at least one group; and
        control a third motion of the character object based on the calculated sum of load values of the selected at least one group.

2. The information processing apparatus according to claim 1, wherein the first and second input devices respectively include at least one acceleration sensor and the processing system is further configured to:
    calculate a first inclination direction based on a value obtained by the at least one acceleration sensor of the first input device;
    calculate a second inclination direction based on a value obtained by the at least one acceleration sensor of the second input device;
    cause the character object to conduct different motions in cases when the first inclination direction about a first axis as opposed to being about a second axis which is different from the first axis; and
    cause the character object to conduct different motions in cases when the second inclination direction is an inclination direction about the third axis as opposed to being about a fourth axis which is different from the third axis.

3. The information processing apparatus according to claim 1, wherein the processing system is further configured to cause the character object to conduct another additional motion based on the first attitude, second attitude, and/or the load applied to the third input device in combination with operation buttons.

4. The information processing apparatus according to claim 1, wherein
    the at least one first motion is a motion associated with a first part of the character object;
    the at least one second motion is a motion associated with a second part of the character object; and
    the third motion is a motion associated with a third part of the character object.

5. The information processing apparatus according to claim 4, wherein
    the first input device is configured to be operated by a right hand of a player,
    the second input device is configured to be operated by a left hand of the player,
    the third input device is configured to be operated by at least one foot of the player,
    the first part is a right hand of the character object,
    the second part is a motion of a left hand of the character object, and
    the third part is a motion of at least one foot of the character object.

6. The information processing apparatus according to claim 1, wherein the processing system is further configured to:
    compensate the first attitude in response to a load applied to the third input device; and
    compensate the second attitude in response to a load applied to the third input device.

7. The information processing apparatus according to claim 1, wherein the processing system is further configured to compensate the load applied to the third input device in response to calculation of the first and/or second attitude.

8. The apparatus of claim 1, wherein the processing system is further configured to cause the character object to conduct different motions in cases when load values detected by the at least three load sensors are in a first state, and when load values detected by the at least three load sensors are in a second state.

9. The apparatus of claim 1, wherein the processing system is further configured to:
    select, from among the at least three load sensors, a second group that is different from the at least one group;
    calculate each sum of load values detected by the load sensors included in each of the selected groups; and
    control a fourth motion of the character object, which is a motion different from the third motion, based on at least one sum of the selected groups.

10. A non-transitory computer readable storage medium that stores a computer program for use with an information processing apparatus that includes a processing system that includes at least one processor, the information processing apparatus configured to communicate with a display apparatus, a first input device, a second input device, and a third input device, as the stored instructions comprising instructions that are configured to:
    display a character object on the display apparatus;
    calculate a first attitude of the first input device;
    calculate a second attitude of the second input device;
    process a load value that is based on a load applied to the third input device, the third input device set to include at least three load sensors that detect the load applied the third input device;
    cause the character object to conduct at least a first motion among a plurality of motions based on the first attitude;

cause the character object to conduct at least a second motion among a plurality of motions based on the second attitude;

select a group that includes at least one load sensor from among the at least three load sensors;

calculate a sum of load values detected by the load sensors based on the at least one load sensor within the selected group; and control a third motion of the character object based on the calculated sum of load values of the selected group.

11. The medium of claim 10, wherein the first and second input devices are set to respectively include at least one acceleration sensor and the stored instructions further comprise instructions that are configured to:

calculate a first inclination direction based on a value obtained by the at least one acceleration sensor of the first input device;

calculate a second inclination direction based on a value obtained by the at least one acceleration sensor of the second input device;

cause the character object to conduct a first motion when the first inclination direction is about a first axis and conduct a second motion, which is different from the first motion, when the first inclination direction is about a second axis that is different from the first axis; and cause the character object to conduct a third motion when the second inclination direction is about a third axis and conduct a fourth motion, which is different from the third motion, when the second inclination direction is about a fourth axis that is different from the third axis.

12. The medium of claim 10, wherein the stored instructions further comprise instructions that are configured to cause the character object to conduct another additional motion based on the first attitude, second attitude, and/or the load applied to the third input device in combination with operation buttons.

13. The medium of claim 10, wherein:

the first motion is a motion associated with a first part of the character object;

the second motion is a motion associated with a second part of the character object; and the third motion is a motion associated with a third part of the character object.

14. The medium of claim 10, wherein the stored instructions further comprise instructions that are configured to:

compensate the first attitude in response to a load applied to the third input device; and compensate the second attitude in response to a load applied to the third input device.

15. The medium of claim 10, wherein the stored instructions further comprise instructions that are configured to compensate the load applied to the third input device in response to calculation of the first and/or second attitude.

16. A computer implemented method implemented on a processing system that includes at least one processor, the processing system set to communicate with a display device, a first input device, a second input device, and a third input device that is configured to detect a load applied to the third input device, the third input device including at least three load sensors, the method comprising:

outputting a character object to be displayed on the display device;

calculating a first attitude of the first input device;

calculating a second attitude of the second input device;

processing a load value that is based on a load applied to the third input device, the third input device including at least three load sensors that detect the load applied the third input device;

causing the character object to conduct at least a first motion among a plurality of motions based on the first attitude;

causing the character object to conduct at least a second motion among a plurality of motions based on the second attitude;

selecting a group that includes at least one load sensor from among the at least three load sensors;

calculating a sum of load values detected by the load sensors based on the at least one load sensor within the selected group; and controlling a third motion of the character object based on the calculated sum of load values of the selected group.

17. A computing apparatus that is configured to communicate with a display device, a first input device, a second input device, and a third input device that includes at least three load sensors, the third input device set to detect a load applied to the third input device, the computing apparatus comprising:

a processing system that includes at least one processor, the processing system configured to:

generate a character object to be displayed on the display device;

calculate a first attitude of the first input device;

calculate a second attitude of the second input device;

process a load value that is based on the load detected by the third input device;

cause the character object to conduct at least a first motion among a plurality of motions based on the first attitude;

cause the character object to conduct at least a second motion among a plurality of motions based on the second attitude;

select a group that includes at least one load sensor from among the at least three load sensors;

calculate a sum of load values based on the at least one load sensor within the selected group; and control a third motion of the character object based on the calculated sum of load values of the selected group.

* * * * *